US012756842B2

(12) United States Patent
Phillips et al.

(10) Patent No.: US 12,756,842 B2
(45) Date of Patent: Oct. 6, 2026

(54) SYSTEMS AND METHODS FOR ENCODING SPHERICAL MEDIA CONTENT

(71) Applicant: Adeia Guides Inc., San Jose, CA (US)

(72) Inventors: Christopher Phillips, Hartwell, GA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 75 days.

(21) Appl. No.: 18/819,060

(22) Filed: Aug. 29, 2024

(65) Prior Publication Data

US 2026/0067470 A1 Mar. 5, 2026

(51) Int. Cl.
*H04N 19/167* (2014.01)
*H04N 19/159* (2014.01)
*H04N 19/177* (2014.01)

(52) U.S. Cl.
CPC ......... *H04N 19/167* (2014.11); *H04N 19/159* (2014.11); *H04N 19/177* (2014.11)

(58) Field of Classification Search
None
See application file for complete search history.

(56) References Cited

U.S. PATENT DOCUMENTS 10,432,970 B1 10/2019 Phillips et al.
11,716,454 B2 8/2023 Bhadula et al.
2019/0246126 A1* 8/2019 Abbas .................... H04N 19/59
2019/0387224 A1* 12/2019 Phillips ................ H04N 19/177
2019/0387237 A1 12/2019 Phillips et al.
2021/0160523 A1* 5/2021 Rapaka ................ H04N 19/109

OTHER PUBLICATIONS

Van Wallendael, G.; Mareen, H.; Vounckx, J.; Lambert, P. Keyframe Insertion: Enabling Low-Latency Random Access and Packet Loss Repair. Electronics 2021, 10, 748. https://doi.org/10.3390/electronics10060748 (Year: 2021).*
Tao Chen, et al., "Systems and Methods for Encoding Companion Streams in HESP", (U.S. Appl. No. 18/821,315, filed Aug. 30, 2024).

* cited by examiner

*Primary Examiner* — Kaitlin A Retallick
(74) *Attorney, Agent, or Firm* — HG LAW LLP

(57) ABSTRACT

Systems and methods are described for identifying a plurality of versions of a plurality of frames of a spherical media content item, wherein each version of the plurality of versions is associated with one of a plurality of resolutions and one of a plurality of video qualities. The plurality of versions is encoded to obtain encoding data comprising a group of pictures (GOP) comprising intra-tiles, predictive tiles, bidirectional predictive tiles, and/or residual data. A first frame is provided to a computing device based on a region of interest in a viewport of the computing device. Based on a change in the ROI, a second frame is provided to the computing device, the second frame comprising at least a portion of the residual data, used to enable an upgrade of video quality at the changed ROI.

20 Claims, 34 Drawing Sheets

300

8K – 32x16 Tiles

320

2K 8x4 Tiles

0 T3 P Slice 4K QP 12 Tile 0 |
1 T3 P Slice 4K QP 12 Tile 1 |
2 T3 P Slice 4K QP 12 Tile 2 |
3 T3 P Slice 4K QP 12 Tile 3 |
4 T3 P Slice 4K QP 12 Tile 4 |
5 T3 P Slice 4K QP 12 Tile 5 |
6 T3 P Slice 4K QP 12 Tile 6 |
7 T3 P Slice 4K QP 12 Tile 7 |
8 T3 P Slice 4K QP 12 Tile 8 |
9 T3 P Slice 4K QP 12 Tile 9 |
10 T3 P Slice 4K QP 12 Tile 10 |
11 T3 P Slice 4K QP 12 Tile 11 |
12 T3 P Slice 4K QP 12 Tile 12 |
13 T3 P Slice 4K QP 12 Tile 13 |
14 T3 P Slice 4K QP 12 Tile 14 |
15 T3 P Slice 4K QP 12 Tile 15 |
16 T3 P Slice 4K QP 12 Tile 16 |
17 T3 P Slice 4K QP 12 Tile 17 |
18 T3 P Slice 4K QP 12 Tile 18 |
19 T3 P Slice 4K QP 12 Tile 19 |
20 T3 P Slice 4K QP 12 Tile 20 |
21 T3 P Slice 4K QP 12 Tile 21 |
22 T3 P Slice 4K QP 12 Tile 22 |
23 T3 P Slice 4K QP 12 Tile 23 |
24 T3 P Slice 4K QP 12 Tile 24 |
25 T3 P Slice 4K QP 12 Tile 25 |
26 T3 P Slice 4K QP 12 Tile 26 |
27 T3 P Slice 4K QP 12 Tile 27 |
28 T3 P Slice 4K QP 12 Tile 28 |
29 T3 P Slice 4K QP 12 Tile 29 |
30 T3 P Slice 4K QP 12 Tile 30 |
31 T3 P Slice 4K QP 12 Tile 31 |
32 T3 P Slice 4K QP 12 Tile 32 |
33 T3 P Slice 4K QP 12 Tile 33 |
34 T3 P Slice 4K QP 12 Tile 34 |
35 T3 P Slice 4K QP 12 Tile 35 |
36 T3 P Slice 4K QP 12 Tile 36 |
37 T3 P Slice 4K QP 12 Tile 37 |
38 T3 P Slice 4K QP 12 Tile 38 |
39 T3 P Slice 4K QP 12 Tile 39 |
40 T3 P Slice 8K QP 12 tile 144 |
41 T3 P Slice 8K QP 12 tile 145 |
42 T3 P Slice 8K QP 12 tile 146 |
43 T3 P Slice 8K QP 12 tile 147 |
44 T3 P Slice 8K QP 12 tile 148 |
45 T3 P Slice 8K QP 12 tile 149 |
46 T3 P Slice 8K QP 12 tile 150 |
47 T3 P Slice 8K QP 12 tile 151 |
48 T3 P Slice 8K QP 12 tile 152 |
49 T3 P Slice 8K QP 12 tile 153 |
50 T3 P Slice 8K QP 12 tile 176 |
51 T3 P Slice 8K QP 12 tile 177 |
52 T3 P Slice 8K QP 12 tile 178 |
53 T3 P Slice 8K QP 12 tile 179 |
54 T3 P Slice 8K QP 12 tile 180 |
55 T3 P Slice 8K QP 12 tile 181 |
56 T3 P Slice 8K QP 12 tile 182 |
57 T3 P Slice 8K QP 12 tile 183 |
58 T3 P Slice 8K QP 12 tile 184 |
59 T3 P Slice 8K QP 12 tile 185 |
60 T3 P Slice 4K QP 12 Tile 45 |
61 T3 P Slice 4K QP 12 Tile 46 |
62 T3 P Slice 4K QP 12 Tile 47 |
63 T3 P Slice 4K QP 12 Tile 48 |
64 T3 P Slice 4K QP 12 Tile 49 |
65 T3 P Slice 4K QP 12 Tile 50 |
66 T3 P Slice 4K QP 12 Tile 51 |
67 T3 P Slice 4K QP 12 Tile 52 |
68 T3 P Slice 4K QP 12 Tile 53 |
69 T3 P Slice 4K QP 12 Tile 54 |
70 T3 P Slice 4K QP 12 Tile 55 |
71 T3 P Slice 8K QP 12 tile 176 |
72 T3 P Slice 8K QP 12 tile 177 |
73 T3 P Slice 8K QP 12 tile 178 |
74 T3 P Slice 8K QP 12 tile 179 |
75 T3 P Slice 8K QP 12 tile 180 |
76 T3 P Slice 8K QP 12 tile 181 |
77 T3 P Slice 8K QP 12 tile 182 |
78 T3 P Slice 8K QP 12 tile 183 |
79 T3 P Slice 8K QP 12 tile 184 |
80 T3 P Slice 8K QP 12 tile 185 |
81 T3 P Slice 8K QP 12 tile 208 |
82 T3 P Slice 8K QP 12 tile 209 |
83 T3 P Slice 8K QP 12 tile 210 |
84 T3 P Slice 8K QP 12 tile 211 |
85 T3 P Slice 8K QP 12 tile 212 |
86 T3 P Slice 8K QP 12 tile 213 |
87 T3 P Slice 8K QP 12 tile 214 |
88 T3 P Slice 8K QP 12 tile 215 |
89 T3 P Slice 8K QP 12 tile 216 |
90 T3 P Slice 8K QP 12 tile 217 |
91 T3 P Slice 8K QP 12 tile 61 |
92 T3 P Slice 8K QP 12 tile 62 |
93 T3 P Slice 8K QP 12 tile 63 |
94 T3 P Slice 2K QP 12 tile 16 |
95 T3 P Slice 2K QP 12 tile 17 |
96 T3 P Slice 2K QP 12 tile 18 |
97 T3 P Slice 4K QP 12 Tile 70 |
98 T3 P Slice 4K QP 12 Tile 71 |
99 T3 P Slice 4K QP 12 Tile 72 |
100 T3 P Slice 4K QP 12 Tile 73 |
101 T3 P Slice 4K QP 12 Tile 74 |
102 T3 P Slice 4K QP 12 Tile 75 |
103 T3 P Slice 4K QP 12 Tile 76 |
104 T3 P Slice 4K QP 12 Tile 77 |
105 T3 P Slice 4K QP 12 Tile 78 |
106 T3 P Slice 4K QP 12 Tile 79 |
107 T3 P Slice 4K QP 12 Tile 86 |
108 T3 P Slice 4K QP 12 Tile 87 |
109 T3 P Slice 4K QP 12 Tile 88 |
110 T3 P Slice 4K QP 12 Tile 89 |
111 T3 P Slice 4K QP 12 Tile 90 |
112 T3 P Slice 4K QP 12 Tile 91 |
113 T3 P Slice 4K QP 12 Tile 92 |
114 T3 P Slice 4K QP 12 Tile 93 |
115 T3 P Slice 4K QP 12 Tile 94 |
116 T3 P Slice 4K QP 12 Tile 95 |
117 T3 P Slice 2K QP 12 tile 24 |
118 T3 P Slice 2K QP 12 tile 25 |
119 T3 P Slice 2K QP 12 tile 26 |
120 T3 P Slice 4K QP 12 Tile 102 |
121 T3 P Slice 4K QP 12 Tile 103 |
122 T3 P Slice 4K QP 12 Tile 104 |
123 T3 P Slice 4K QP 12 Tile 105 |
124 T3 P Slice 4K QP 12 Tile 106 |
125 T3 P Slice 4K QP 12 Tile 107 |
126 T3 P Slice 4K QP 12 Tile 108 |
127 T3 P Slice 4K QP 12 Tile 109 |
128 T3 P Slice 4K QP 12 Tile 110 |
129 T3 P Slice 4K QP 12 Tile 111 |
130 T3 P Slice 4K QP 12 Tile 118 |
131 T3 P Slice 4K QP 12 Tile 119 |
132 T3 P Slice 4K QP 12 Tile 120 |
133 T3 P Slice 4K QP 12 Tile 121 |
134 T3 P Slice 4K QP 12 Tile 122 |
135 T3 P Slice 4K QP 12 Tile 123 |
136 T3 P Slice 4K QP 12 Tile 124 |
136 T3 P Slice 4K QP 12 Tile 125 |
137 T3 P Slice 4K QP 12 Tile 126 |
138 T3 P Slice 4K QP 12 Tile 127 |
139 T3 P Slice 4K QP 12 Tile 128 |

FIG. 10B

0 T4 P Slice 4K QP 12 Tile 0 P
1 T4 P Slice 4K QP 12 Tile 1 P
2 T4 P Slice 4K QP 12 Tile 2 P
3 T4 P Slice 4K QP 12 Tile 3 P
4 T4 P Slice 4K QP 12 Tile 4 P
5 T4 P Slice 4K QP 12 Tile 5 P
6 T4 P Slice 4K QP 12 Tile 6 P
7 T4 P Slice 4K QP 12 Tile 7 P + T4 P Slice 4K QP 8 Tile 7 R
8 T4 P Slice 4K QP 12 Tile 8 P + T4 P Slice 4K QP 8 Tile 8 R
9 T4 P Slice 4K QP 12 Tile 9 P +T 6 P Slice 4K QP 8 Tile 9 R
10 T4 P Slice 4K QP 12 Tile 10 P + T4 P Slice 4K QP 8 Tile 10 R
11 T4 P Slice 4K QP 12 Tile 11 P + T4 P Slice 4K QP 8 Tile 11 R
12 T4 P Slice 4K QP 12 Tile 12 P + T4 P Slice 4K QP 8 Tile 12 R
13 T4 P Slice 4K QP 12 Tile 13 P + T4 P Slice 4K QP 8 Tile 13 R
14 T4 P Slice 4K QP 12 Tile 14 P + T4 P Slice 4K QP 8 Tile 14 P
15 T4 P Slice 4K QP 12 Tile 15 P
16 T4 P Slice 4K QP 12 Tile 16 P
17 T4 P Slice 4K QP 12 Tile 17 P
18 T4 P Slice 4K QP 12 Tile 18 P
19 T4 P Slice 4K QP 12 Tile 19 P
20 T4 P Slice 4K QP 12 Tile 20 P
21 T4 P Slice 4K QP 12 Tile 21 P
22 T4 P Slice 4K QP 12 Tile 22 P
23 T4 P Slice 4K QP 12 Tile 23 P + T4 P Slice 4K QP 8 Tile 23 R
24 T4 P Slice 4K QP 12 Tile 24 P + T4 P Slice 4K QP 8 Tile 24 R
25 T4 P Slice 4K QP 12 Tile 25 P + T4 P Slice 4K QP 8 Tile 25 R
26 T4 P Slice 4K QP 12 Tile 26 P + T4 P Slice 4K QP 8 Tile 26 R
27 T4 P Slice 4K QP 12 Tile 27 P + T4 P Slice 4K QP 8 Tile 27 R
28 T4 P Slice 4K QP 12 Tile 28 P + T4 P Slice 4K QP 8 Tile 28 R
29 T4 P Slice 4K QP 12 Tile 29 P + T4 P Slice 4K QP 8 Tile 29 R
30 T4 P Slice 4K QP 12 Tile 30 P + T4 P Slice 4K QP 8 Tile 30 R
31 T4 P Slice 4K QP 12 Tile 31 P
32 T4 P Slice 4K QP 12 Tile 32 P
33 T4 P Slice 4K QP 12 Tile 33 P
34 T4 P Slice 4K QP 12 Tile 34 P
35 T4 P Slice 4K QP 12 Tile 35 P
36 T4 P Slice 4K QP 12 Tile 36 P
37 T4 P Slice 4K QP 12 Tile 37 P
38 T4 P Slice 4K QP 12 Tile 38 P
39 T4 P Slice 4K QP 12 Tile 39 P + T4 P Slice 4K QP 8 Tile 38 R
40 T4 P Slice 8K QP 12 tile 144 P
41 T4 P Slice 8K QP 12 tile 145 P
42 T4 P Slice 8K QP 12 tile 146 P + T4 P Slice 8K QP 8 tile 146 R
43 T4 P Slice 8K QP 12 tile 147 P + T4 P Slice 8K QP 8 tile 147 R
44 T4 P Slice 8K QP 12 tile 148 P + T4 P Slice 8K QP 8 tile 148 R
45 T4 P Slice 8K QP 12 tile 149 P + T4 P Slice 8K QP 8 tile 149 R
46 T4 P Slice 8K QP 12 tile 150 P + T4 P Slice 8K QP 8 tile 150 R
47 T4 P Slice 8K QP 12 tile 151 P + T4 P Slice 8K QP 8 tile 151 R
48 T4 P Slice 8K QP 12 tile 152 P
49 T4 P Slice 8K QP 12 tile 153 P
50 T4 P Slice 8K QP 12 tile 176 P
51 T4 P Slice 8K QP 12 tile 177 P
52 T4 P Slice 8K QP 12 tile 178 P + T4 P Slice 8K QP 8 tile 178 R
53 T4 P Slice 8K QP 12 tile 179 P + T4 P Slice 8K QP 8 tile 179 R
54 T4 P Slice 8K QP 12 tile 180 P + T4 P Slice 8K QP 8 tile 180 R
55 T4 P Slice 8K QP 12 tile 181 P + T4 P Slice 8K QP 8 tile 181 R
56 T4 P Slice 8K QP 12 tile 182 P + T4 P Slice 8K QP 8 tile 182 R
57 T4 P Slice 8K QP 12 tile 183 P + T4 P Slice 8K QP 8 tile 183 R
58 T4 P Slice 8K QP 12 tile 184 P
59 T4 P Slice 8K QP 12 tile 185 P
60 T4 P Slice 4K QP 12 Tile 45 P + T4 P Slice 4K QP 8 Tile 45 R
61 T4 P Slice 4K QP 12 Tile 46 P
62 T4 P Slice 4K QP 12 Tile 47 P
63 T4 P Slice 4K QP 12 Tile 48 P
64 T4 P Slice 4K QP 12 Tile 49 P
65 T4 P Slice 4K QP 12 Tile 50 P
66 T4 P Slice 4K QP 12 Tile 51 P
67 T4 P Slice 4K QP 12 Tile 52 P
68 T4 P Slice 4K QP 12 Tile 53 P
69 T4 P Slice 4K QP 12 Tile 54 P
70 T4 P Slice 4K QP 12 Tile 55 P + T4 P Slice 4K QP 8 Tile 54 R
71 T4 P Slice 8K QP 12 tile 176 P
72 T4 P Slice 8K QP 12 tile 177 P
73 T4 P Slice 8K QP 12 tile 178 P + T4 P Slice 8K QP 8 tile 178 R
74 T4 P Slice 8K QP 12 tile 179 P + T4 P Slice 8K QP 8 tile 179 R
75 T4 P Slice 8K QP 12 tile 180 P + T4 P Slice 8K QP 8 tile 180 R
76 T4 P Slice 8K QP 12 tile 181 P + T4 P Slice 8K QP 8 tile 181 R
77 T4 P Slice 8K QP 12 tile 182 P + T4 P Slice 8K QP 8 tile 182 R
78 T4 P Slice 8K QP 12 tile 183 P + T4 P Slice 8K QP 8 tile 183 R
79 T4 P Slice 8K QP 12 tile 184 P
80 T4 P Slice 8K QP 12 tile 185 P
81 T4 P Slice 8K QP 12 tile 208 P
82 T4 P Slice 8K QP 12 tile 209 P
83 T4 P Slice 8K QP 12 tile 210 P + T4 P Slice 8K QP 8 tile 210 R
84 T4 P Slice 8K QP 12 tile 211 P + T4 P Slice 8K QP 8 tile 211 R
85 T4 P Slice 8K QP 12 tile 212 P + T4 P Slice 8K QP 8 tile 212 R
86 T4 P Slice 8K QP 12 tile 213 P + T4 P Slice 8K QP 8 tile 213 R
87 T4 P Slice 8K QP 12 tile 214 P + T4 P Slice 8K QP 8 tile 214 R
88 T4 P Slice 8K QP 12 tile 215 P + (T4 P Slice 8K QP 8 tile 215 R
89 T4 P Slice 8K QP 12 tile 216 P
90 T4 P Slice 8K QP 12 tile 217 P
91 T4 P Slice 8K QP 12 tile 61 P + ( T4 P Slice 8K QP 8 tile 61 R
92 T4 P Slice 8K QP 12 tile 62 P
93 T4 P Slice 8K QP 12 tile 63 P
94 T4 P Slice 2K QP 12 tile 16 P + T4 P Slice 2K QP 8 tile 16 R
95 T4 P Slice 2K QP 12 tile 17 P
96 T4 P Slice 2K QP 12 tile 18 P + T4 P Slice 2K QP 8 tile 18 R
97 T4 P Slice 4K QP 12 Tile 70 P
98 T4 P Slice 4K QP 12 Tile 71 P + T4 P Slice 4K QP 8 Tile 71 R
99 T4 P Slice 4K QP 12 Tile 72 P + T4 P Slice 4K QP 8 Tile 72 R
100 T4 P Slice 4K QP 12 Tile 73 P + T4 P Slice 4K QP 8 Tile 73 R
101 T4 P Slice 4K QP 12 Tile 74 P + T4 P Slice 4K QP 8 Tile 74 R
102 T4 P Slice 4K QP 12 Tile 75 P + T4 P Slice 4K QP 8 Tile 75 R
103 T4 P Slice 4K QP 12 Tile 76 P + T4 P Slice 4K QP 8 Tile 76 R
104 T4 P Slice 4K QP 12 Tile 77 P + T4 P Slice 4K QP 8 Tile 77 R
105 T4 P Slice 4K QP 12 Tile 78 P
106 T4 P Slice 4K QP 12 Tile 79 P
107 T4 P Slice 4K QP 12 Tile 86 P
108 T4 P Slice 4K QP 12 Tile 87 P
109 T4 P Slice 4K QP 12 Tile 88 P
110 T4 P Slice 4K QP 12 Tile 89 P
111 T4 P Slice 4K QP 12 Tile 90 P
112 T4 P Slice 4K QP 12 Tile 91 P
113 T4 P Slice 4K QP 12 Tile 92 P
114 T4 P Slice 4K QP 12 Tile 93 P
115 T4 P Slice 4K QP 12 Tile 94 P
116 T4 P Slice 4K QP 12 Tile 95 P
117 T4 P Slice 2K QP 12 tile 24 P + T4 P Slice 2K QP 8 tile 24 R
118 T4 P Slice 2K QP 12 tile 25 P
119 T4 P Slice 2K QP 12 tile 26 P + T4 P Slice 2K QP 8 tile 26 R
120 T4 P Slice 4K QP 12 Tile 102 P
121 T4 P Slice 4K QP 12 Tile 103 P
122 T4 P Slice 4K QP 12 Tile 104 P
123 T4 P Slice 4K QP 12 Tile 105 P
124 T4 P Slice 4K QP 12 Tile 106 P
125 T4 P Slice 4K QP 12 Tile 107 P
126 T4 P Slice 4K QP 12 Tile 108 P
127 T4 P Slice 4K QP 12 Tile 109 P
128 T4 P Slice 4K QP 12 Tile 110 P
129 T4 P Slice 4K QP 12 Tile 111 P
130 T4 P Slice 4K QP 12 Tile 118 P
131 T4 P Slice 4K QP 12 Tile 119 P
132 T4 P Slice 4K QP 12 Tile 120 P
133 T4 P Slice 4K QP 12 Tile 121 P
134 T4 P Slice 4K QP 12 Tile 122 P
135 T4 P Slice 4K QP 12 Tile 123 P
135 T4 P Slice 4K QP 12 Tile 124 P
136 T4 P Slice 4K QP 12 Tile 125 P
137 T4 P Slice 4K QP 12 Tile 126 P
138 T4 P Slice 4K QP 12 Tile 127 P
139 T4 P Slice 4K QP 12 Tile 128 P

FIG. 10C

0 T5 P Slice 4K QP 12 Tile 0 P
1 T5 P Slice 4K QP 12 Tile 1 P
2 T5 P Slice 4K QP 12 Tile 2 P
3 T5 P Slice 4K QP 12 Tile 3 P
4 T5 P Slice 4K QP 12 Tile 4 P
5 T5 P Slice 4K QP 12 Tile 5 P
6 T5 P Slice 4K QP 12 Tile 6 P
7 T5 P Slice 4K QP 8 Tile 7 P
8 T5 P Slice 4K QP 8 Tile 8 P
9 T5 P Slice 4K QP 8 Tile 9 P
10 T5 P Slice 4K QP 8 Tile 10 P
11 T5 P Slice 4K QP 8 Tile 11 P
12 T5 P Slice 4K QP 8 Tile 12 P
13 T5 P Slice 4K QP 8 Tile 13 P
14 T5 P Slice 4K QP 8 Tile 14 P
15 T5 P Slice 4K QP 12 Tile 15 P
16 T5 P Slice 4K QP 12 Tile 16 P
17 T5 P Slice 4K QP 12 Tile 17 P
18 T5 P Slice 4K QP 12 Tile 18 P
19 T5 P Slice 4K QP 12 Tile 19 P
20 T5 P Slice 4K QP 12 Tile 20 P
21 T5 P Slice 4K QP 12 Tile 21 P
22 T5 P Slice 4K QP 12 Tile 22 P
23 T5 P Slice 4K QP 8 Tile 23 P
24 T5 P Slice 4K QP 8 Tile 24 P
25 T5 P Slice 4K QP 8 Tile 25 P
26 T5 P Slice 4K QP 8 Tile 26 P
27 T5 P Slice 4K QP 8 Tile 27 P
28 T5 P Slice 4K QP 8 Tile 28 P
29 T5 P Slice 4K QP 8 Tile 29 P
30 T5 P Slice 4K QP 8 Tile 30 P
31 T5 P Slice 4K QP 12 Tile 31 P
32 T5 P Slice 4K QP 12 Tile 32 P
33 T5 P Slice 4K QP 12 Tile 33 P
34 T5 P Slice 4K QP 12 Tile 34 P
35 T5 P Slice 4K QP 12 Tile 35 P
36 T5 P Slice 4K QP 12 Tile 36 P
37 T5 P Slice 4K QP 12 Tile 37 P
38 T5 P Slice 4K QP 12 Tile 38 P
39 T5 P Slice 4K QP 8 Tile 39 P
40 T5 P Slice 8K QP 12 tile 144 P
41 T5 P Slice 8K QP 12 tile 145 P
42 T5 P Slice 8K QP 8 tile 146 P
43 T5 P Slice 8K QP 8 tile 147 P
44 T5 P Slice 8K QP 8 tile 148 P
45 T5 P Slice 8K QP 8 tile 149 P
46 T5 P Slice 8K QP 8 tile 150 P
47 T5 P Slice 8K QP 8 tile 151 P
48 T5 P Slice 8K QP 12 tile 152 P
49 T5 P Slice 8K QP 12 tile 153 P
50 T5 P Slice 8K QP 12 tile 176 P
51 T5 P Slice 8K QP 12 tile 177 P
52 T5 P Slice 8K QP 8 tile 178 P
53 T5 P Slice 8K QP 8 tile 179 P
54 T5 P Slice 8K QP 8 tile 180 P
55 T5 P Slice 8K QP 8 tile 181 P
56 T5 P Slice 8K QP 8 tile 182 P
57 T5 P Slice 8K QP 8 tile 183 P
58 T5 P Slice 8K QP 12 tile 184 P
59 T5 P Slice 8K QP 12 tile 185 P
60 T5 P Slice 4K QP 8 Tile 45 P
61 T5 P Slice 4K QP 12 Tile 46 P
62 T5 P Slice 4K QP 12 Tile 47 P
63 T5 P Slice 4K QP 12 Tile 48 P
64 T5 P Slice 4K QP 12 Tile 49 P
65 T5 P Slice 4K QP 12 Tile 50 P
66 T5 P Slice 4K QP 12 Tile 51 P
67 T5 P Slice 4K QP 12 Tile 52 P
68 T5 P Slice 4K QP 12 Tile 53 P
69 T5 P Slice 4K QP 12 Tile 54 P
70 T5 P Slice 4K QP 8 Tile 55 P
71 T5 P Slice 8K QP 12 tile 176 P
72 T5 P Slice 8K QP 12 tile 177 P
73 T5 P Slice 8K QP 8 tile 178 P
74 T5 P Slice 8K QP 8 tile 179 P
75 T5 P Slice 8K QP 8 tile 180 P
76 T5 P Slice 8K QP 8 tile 181 P
77 T5 P Slice 8K QP 8 tile 182 P
78 T5 P Slice 8K QP 8 tile 183 P
79 T5 P Slice 8K QP 12 tile 184 P
80 T5 P Slice 8K QP 12 tile 185 P
81 T5 P Slice 8K QP 12 tile 208 P
82 T5 P Slice 8K QP 12 tile 209 P
83 T5 P Slice 8K QP 8 tile 210 P
84 T5 P Slice 8K QP 8 tile 211 P
85 T5 P Slice 8K QP 8 tile 212 P
86 T5 P Slice 8K QP 8 tile 213 P
87 T5 P Slice 8K QP 8 tile 214 P
88 T5 P Slice 8K QP 8 tile 215 P
89 T5 P Slice 8K QP 12 tile 216 P
90 T5 P Slice 8K QP 12 tile 217 P
91 T5 P Slice 8K QP 8 tile 61 P +
92 T5 P Slice 8K QP 12 tile 62 P
93 T5 P Slice 8K QP 12 tile 63 P
94 T5 P Slice 2K QP 8 tile 16 P
95 T5 P Slice 2K QP 12 tile 17 P
96 T5 P Slice 2K QP 8 tile 18 P
97 T5 P Slice 4K QP 12 Tile 70 P
98 T5 P Slice 4K QP 8 Tile 71 P
99 T5 P Slice 4K QP 8 Tile 72 P
100 T5 P Slice 4K QP 8 Tile 73 P
101 T5 P Slice 4K QP 8 Tile 74 P
102 T5 P Slice 4K QP 8 Tile 75 P
103 T5 P Slice 4K QP 8 Tile 76 P
104 T5 P Slice 4K QP 8 Tile 77 P
105 T5 P Slice 4K QP 12 Tile 78 P
106 T5 P Slice 4K QP 12 Tile 79 P
107 T5 P Slice 4K QP 12 Tile 86 P
108 T5 P Slice 4K QP 12 Tile 87 P
109 T5 P Slice 4K QP 12 Tile 88 P
110 T5 P Slice 4K QP 12 Tile 89 P
111 T5 P Slice 4K QP 12 Tile 90 P
112 T5 P Slice 4K QP 12 Tile 91 P
113 T5 P Slice 4K QP 12 Tile 92 P
114 T5 P Slice 4K QP 12 Tile 93 P
115 T5 P Slice 4K QP 12 Tile 94 P
116 T5 P Slice 4K QP 12 Tile 95 P
117 T5 P Slice 2K QP 8 tile 24 P
118 T5 P Slice 2K QP 12 tile 25 P
119 T5 P Slice 2K QP 8 tile 26 P
120 T5 P Slice 4K QP 12 Tile 102 P
121 T5 P Slice 4K QP 12 Tile 103 P
122 T5 P Slice 4K QP 12 Tile 104 P
123 T5 P Slice 4K QP 12 Tile 105 P
124 T5 P Slice 4K QP 12 Tile 106 P
125 T5 P Slice 4K QP 12 Tile 107 P
126 T5 P Slice 4K QP 12 Tile 108 P
127 T5 P Slice 4K QP 12 Tile 109 P
128 T5 P Slice 4K QP 12 Tile 110 P
129 T5 P Slice 4K QP 12 Tile 111 P
130 T5 P Slice 4K QP 12 Tile 118 P
131 T5 P Slice 4K QP 12 Tile 119 P
132 T5 P Slice 4K QP 12 Tile 120 P
133 T5 P Slice 4K QP 12 Tile 121 P
134 T5 P Slice 4K QP 12 Tile 122 P
135 T5 P Slice 4K QP 12 Tile 123 P
135 T5 P Slice 4K QP 12 Tile 124 P
136 T5 P Slice 4K QP 12 Tile 125 P
137 T5 P Slice 4K QP 12 Tile 126 P
138 T5 P Slice 4K QP 12 Tile 127 P
139 T5 P Slice 4K QP 12 Tile 128 P

FIG. 10D

0 T3 P Slice 4K QP 12 Tile 0
1 T3 P Slice 4K QP 12 Tile 1
2 T3 P Slice 4K QP 12 Tile 2
3 T3 P Slice 4K QP 12 Tile 3
4 T3 P Slice 4K QP 12 Tile 4
5 T3 P Slice 4K QP 12 Tile 5
6 T3 P Slice 4K QP 12 Tile 6
7 T3 P Slice 4K QP 12 Tile 7
8 T3 P Slice 4K QP 12 Tile 8
9 T3 P Slice 4K QP 12 Tile 9
10 T3 P Slice 4K QP 12 Tile 10
11 T3 P Slice 4K QP 12 Tile 11
12 T3 P Slice 4K QP 12 Tile 12
13 T3 P Slice 4K QP 12 Tile 13
14 T3 P Slice 4K QP 12 Tile 14
15 T3 P Slice 4K QP 12 Tile 15
16 T3 P Slice 4K QP 12 Tile 16
17 T3 P Slice 4K QP 12 Tile 17
18 T3 P Slice 4K QP 12 Tile 18
19 T3 P Slice 4K QP 12 Tile 19
20 T3 P Slice 4K QP 12 Tile 20
21 T3 P Slice 4K QP 12 Tile 21
22 T3 P Slice 4K QP 12 Tile 22
23 T3 P Slice 4K QP 12 Tile 23
24 T3 P Slice 4K QP 12 Tile 24
25 T3 P Slice 4K QP 12 Tile 25
26 T3 P Slice 4K QP 12 Tile 26
27 T3 P Slice 4K QP 12 Tile 27
28 T3 P Slice 4K QP 12 Tile 28
29 T3 P Slice 4K QP 12 Tile 29
30 T3 P Slice 4K QP 12 Tile 30
31 T3 P Slice 4K QP 12 Tile 31
32 T3 P Slice 4K QP 12 Tile 32
33 T3 P Slice 4K QP 12 Tile 33
34 T3 P Slice 4K QP 12 Tile 34
35 T3 P Slice 4K QP 12 Tile 35
36 T3 P Slice 4K QP 12 Tile 36
37 T3 P Slice 4K QP 12 Tile 37
38 T3 P Slice 4K QP 12 Tile 38
39 T3 P Slice 4K QP 12 Tile 39
40 T3 P Slice 8K QP 12 tile 144
41 T3 P Slice 8K QP 12 tile 145
42 T3 P Slice 8K QP 12 tile 146
43 T3 P Slice 8K QP 12 tile 147
44 T3 P Slice 8K QP 12 tile 148
45 T3 P Slice 8K QP 12 tile 149
46 T3 P Slice 8K QP 12 tile 150
47 T3 P Slice 8K QP 12 tile 151
48 T3 P Slice 8K QP 12 tile 152
49 T3 P Slice 8K QP 12 tile 153
50 T3 P Slice 8K QP 12 tile 176
51 T3 P Slice 8K QP 12 tile 177
52 T3 P Slice 8K QP 12 tile 178
53 T3 P Slice 8K QP 12 tile 179
54 T3 P Slice 8K QP 12 tile 180
55 T3 P Slice 8K QP 12 tile 181
56 T3 P Slice 8K QP 12 tile 182
57 T3 P Slice 8K QP 12 tile 183
58 T3 P Slice 8K QP 12 tile 184
59 T3 P Slice 8K QP 12 tile 185
60 T3 P Slice 4K QP 12 Tile 45
61 T3 P Slice 4K QP 12 Tile 46
62 T3 P Slice 4K QP 12 Tile 47
63 T3 P Slice 4K QP 12 Tile 48
64 T3 P Slice 4K QP 12 Tile 49
65 T3 P Slice 4K QP 12 Tile 50
66 T3 P Slice 4K QP 12 Tile 51
67 T3 P Slice 4K QP 12 Tile 52
68 T3 P Slice 4K QP 12 Tile 53
69 T3 P Slice 4K QP 12 Tile 54
70 T3 P Slice 4K QP 12 Tile 55
71 T3 P Slice 8K QP 12 tile 176
72 T3 P Slice 8K QP 12 tile 177
73 T3 P Slice 8K QP 12 tile 178
74 T3 P Slice 8K QP 12 tile 179
75 T3 P Slice 8K QP 12 tile 180
76 T3 P Slice 8K QP 12 tile 181
77 T3 P Slice 8K QP 12 tile 182
78 T3 P Slice 8K QP 12 tile 183
79 T3 P Slice 8K QP 12 tile 184
80 T3 P Slice 8K QP 12 tile 185
81 T3 P Slice 8K QP 12 tile 208
82 T3 P Slice 8K QP 12 tile 209
83 T3 P Slice 8K QP 12 tile 210
84 T3 P Slice 8K QP 12 tile 211
85 T3 P Slice 8K QP 12 tile 212
86 T3 P Slice 8K QP 12 tile 213
87 T3 P Slice 8K QP 12 tile 214
88 T3 P Slice 8K QP 12 tile 215
89 T3 P Slice 8K QP 12 tile 216
90 T3 P Slice 8K QP 12 tile 217
91 T3 P Slice 8K QP 12 tile 61
92 T3 P Slice 8K QP 12 tile 62
93 T3 P Slice 8K QP 12 tile 63
94 T3 P Slice 2K QP 12 tile 16
95 T3 P Slice 2K QP 12 tile 17
96 T3 P Slice 2K QP 12 tile 18
97 T3 P Slice 4K QP 12 Tile 70
98 T3 P Slice 4K QP 12 Tile 71
99 T3 P Slice 4K QP 12 Tile 72
100 T3 P Slice 4K QP 12 Tile 73
101 T3 P Slice 4K QP 12 Tile 74
102 T3 P Slice 4K QP 12 Tile 75
103 T3 P Slice 4K QP 12 Tile 76
104 T3 P Slice 4K QP 12 Tile 77
105 T3 P Slice 4K QP 12 Tile 78
106 T3 P Slice 4K QP 12 Tile 79
107 T3 P Slice 4K QP 12 Tile 86
108 T3 P Slice 4K QP 12 Tile 87
109 T3 P Slice 4K QP 12 Tile 88
110 T3 P Slice 4K QP 12 Tile 89
111 T3 P Slice 4K QP 12 Tile 90
112 T3 P Slice 4K QP 12 Tile 91
113 T3 P Slice 4K QP 12 Tile 92
114 T3 P Slice 4K QP 12 Tile 93
115 T3 P Slice 4K QP 12 Tile 94
116 T3 P Slice 4K QP 12 Tile 95
117 T3 P Slice 2K QP 12 tile 24
118 T3 P Slice 2K QP 12 tile 25
119 T3 P Slice 2K QP 12 tile 26
120 T3 P Slice 4K QP 12 Tile 102
121 T3 P Slice 4K QP 12 Tile 103
122 T3 P Slice 4K QP 12 Tile 104
123 T3 P Slice 4K QP 12 Tile 105
124 T3 P Slice 4K QP 12 Tile 106
125 T3 P Slice 4K QP 12 Tile 107
126 T3 P Slice 4K QP 12 Tile 108
127 T3 P Slice 4K QP 12 Tile 109
128 T3 P Slice 4K QP 12 Tile 110
129 T3 P Slice 4K QP 12 Tile 111
130 T3 P Slice 4K QP 12 Tile 118
131 T3 P Slice 4K QP 12 Tile 119
132 T3 P Slice 4K QP 12 Tile 120
133 T3 P Slice 4K QP 12 Tile 121
134 T3 P Slice 4K QP 12 Tile 122
135 T3 P Slice 4K QP 12 Tile 123
135 T3 P Slice 4K QP 12 Tile 124
136 T3 P Slice 4K QP 12 Tile 125
137 T3 P Slice 4K QP 12 Tile 126
138 T3 P Slice 4K QP 12 Tile 127
139 T3 P Slice 4K QP 12 Tile 128

FIG. 11B

0 T6 P Slice 4K QP 12 Tile 0 P
1 T6 P Slice 4K QP 12 Tile 1 P
2 T6 P Slice 4K QP 12 Tile 2 P
3 T6 P Slice 4K QP 12 Tile 3 P
4 T6 P Slice 4K QP 12 Tile 4 P
5 T6 P Slice 4K QP 12 Tile 5 P
6 T6 P Slice 4K QP 12 Tile 6 P
7 T6 P Slice 4K QP 12 Tile 7 P + T6 P Slice 4K QP 8 Tile 7 R
8 T6 P Slice 4K QP 12 Tile 8 P + T6 P Slice 4K QP 8 Tile 8 R
9 T6 P Slice 4K QP 12 Tile 9 P + T6 P Slice 4K QP 8 Tile 9 R
10 T6 P Slice 4K QP 12 Tile 10 P + T6 P Slice 4K QP 8 Tile 10 R
11 T6 P Slice 4K QP 12 Tile 11 P + T6 P Slice 4K QP 8 Tile 11 R
12 T6 P Slice 4K QP 12 Tile 12 P + T6 P Slice 4K QP 8 Tile 12 R
13 T6 P Slice 4K QP 12 Tile 13 P + T6 P Slice 4K QP 8 Tile 13 R
14 T6 P Slice 4K QP 12 Tile 14 P + T6 P Slice 4K QP 8 Tile 14 P
15 T6 P Slice 4K QP 12 Tile 15 P
16 T6 P Slice 4K QP 12 Tile 16 P
17 T6 P Slice 4K QP 12 Tile 17 P
18 T6 P Slice 4K QP 12 Tile 18 P
19 T6 P Slice 4K QP 12 Tile 19 P
20 T6 P Slice 4K QP 12 Tile 20 P
21 T6 P Slice 4K QP 12 Tile 21 P
22 T6 P Slice 4K QP 12 Tile 22 P
23 T6 P Slice 4K QP 12 Tile 23 P + T6 P Slice 4K QP 8 Tile 23 R
24 T6 P Slice 4K QP 12 Tile 24 P + T6 P Slice 4K QP 8 Tile 24 R
25 T6 P Slice 4K QP 12 Tile 25 P + T6 P Slice 4K QP 8 Tile 25 R
26 T6 P Slice 4K QP 12 Tile 26 P + T6 P Slice 4K QP 8 Tile 26 R
27 T6 P Slice 4K QP 12 Tile 27 P + T6 P Slice 4K QP 8 Tile 27 R
28 T6 P Slice 4K QP 12 Tile 28 P + T6 P Slice 4K QP 8 Tile 28 R
29 T6 P Slice 4K QP 12 Tile 29 P + T6 P Slice 4K QP 8 Tile 29 R
30 T6 P Slice 4K QP 12 Tile 30 P + T6 P Slice 4K QP 8 Tile 30 P
31 T6 P Slice 4K QP 12 Tile 31 P
32 T6 P Slice 4K QP 12 Tile 32 P
33 T6 P Slice 4K QP 12 Tile 33 P
34 T6 P Slice 4K QP 12 Tile 34 P
35 T6 P Slice 4K QP 12 Tile 35 P
36 T6 P Slice 4K QP 12 Tile 36 P
37 T6 P Slice 4K QP 12 Tile 37 P
38 T6 P Slice 4K QP 12 Tile 38 P
39 T6 P Slice 4K QP 12 Tile 39 P + T6 P Slice 4K QP 8 Tile 38 R
40 T6 P Slice 8K QP 12 tile 144 P
41 T6 P Slice 8K QP 12 tile 145 P
42 T6 P Slice 8K QP 12 tile 146 P + T6 P Slice 8K QP 8 tile 146 R
43 T6 P Slice 8K QP 12 tile 147 P + T6 P Slice 8K QP 8 tile 147 R
44 T6 P Slice 8K QP 12 tile 148 P + T6 P Slice 8K QP 8 tile 148 R
45 T6 P Slice 8K QP 12 tile 149 P + T6 P Slice 8K QP 8 tile 149 R
46 T6 P Slice 8K QP 12 tile 150 P + T6 P Slice 8K QP 8 tile 150 R
47 T6 P Slice 8K QP 12 tile 151 P + T6 P Slice 8K QP 8 tile 151 R
48 T6 P Slice 8K QP 12 tile 152 P
49 T6 P Slice 8K QP 12 tile 153 P
50 T6 P Slice 8K QP 12 tile 176 P
51 T6 P Slice 8K QP 12 tile 177 P
52 T6 P Slice 8K QP 12 tile 178 P + T6 P Slice 8K QP 8 tile 178 R
53 T6 P Slice 8K QP 12 tile 179 P + T6 P Slice 8K QP 8 tile 179 R
54 T6 P Slice 8K QP 12 tile 180 P + T6 P Slice 8K QP 8 tile 180 R
55 T6 P Slice 8K QP 12 tile 181 P + T6 P Slice 8K QP 8 tile 181 R
56 T6 P Slice 8K QP 12 tile 182 P + T6 P Slice 8K QP 8 tile 182 R
57 T6 P Slice 8K QP 12 tile 183 P + T6 P Slice 8K QP 8 tile 183 R
58 T6 P Slice 8K QP 12 tile 184 P
59 T6 P Slice 8K QP 12 tile 185 P
60 T6 P Slice 4K QP 12 Tile 45 P + T6 P Slice 4K QP 8 Tile 45 R
61 T6 P Slice 4K QP 12 Tile 46 P
62 T6 P Slice 4K QP 12 Tile 47 P
63 T6 P Slice 4K QP 12 Tile 48 P
64 T6 P Slice 4K QP 12 Tile 49 P
65 T6 P Slice 4K QP 12 Tile 50 P
66 T6 P Slice 4K QP 12 Tile 51 P
67 T6 P Slice 4K QP 12 Tile 52 P
68 T6 P Slice 4K QP 12 Tile 53 P
69 T6 P Slice 4K QP 12 Tile 54 P
70 T6 P Slice 4K QP 12 Tile 55 P + T6 P Slice 4K QP 8 Tile 54 R
71 T6 P Slice 8K QP 12 tile 176 P
72 T6 P Slice 8K QP 12 tile 177 P
73 T6 P Slice 8K QP 12 tile 178 P + T6 P Slice 8K QP 8 tile 178 R
74 T6 P Slice 8K QP 12 tile 179 P + T6 P Slice 8K QP 8 tile 179 R
75 T6 P Slice 8K QP 12 tile 180 P + T6 P Slice 8K QP 8 tile 180 R
76 T6 P Slice 8K QP 12 tile 181 P + T6 P Slice 8K QP 8 tile 181 R
77 T6 P Slice 8K QP 12 tile 182 P + T6 P Slice 8K QP 8 tile 182 R
78 T6 P Slice 8K QP 12 tile 183 P + T6 P Slice 8K QP 8 tile 183 R
79 T6 P Slice 8K QP 12 tile 184 P
80 T6 P Slice 8K QP 12 tile 185 P
81 T6 P Slice 8K QP 12 tile 208 P
82 T6 P Slice 8K QP 12 tile 209 P
83 T6 P Slice 8K QP 12 tile 210 P + T6 P Slice 8K QP 8 tile 210 R
84 T6 P Slice 8K QP 12 tile 211 P + T6 P Slice 8K QP 8 tile 211 R
85 T6 P Slice 8K QP 12 tile 212 P + T6 P Slice 8K QP 8 tile 212 R
86 T6 P Slice 8K QP 12 tile 213 P + T6 P Slice 8K QP 8 tile 213 R
87 T6 P Slice 8K QP 12 tile 214 P + T6 P Slice 8K QP 8 tile 214 R
88 T6 P Slice 8K QP 12 tile 215 P + {T6 P Slice 8K QP 8 tile 215 R
89 T6 P Slice 8K QP 12 tile 216 P
90 T6 P Slice 8K QP 12 tile 217 P
91 T6 P Slice 8K QP 12 tile 61 P + { T6 P Slice 8K QP 8 tile 61 R
92 T6 P Slice 8K QP 12 tile 62 P
93 T6 P Slice 8K QP 12 tile 63 P
94 T6 P Slice 2K QP 12 tile 16 P + T6 P Slice 2K QP 8 tile 16 R
95 T6 P Slice 2K QP 12 tile 17 P
96 T6 P Slice 2K QP 12 tile 18 P + T6 P Slice 2K QP 8 tile 18 R
97 T6 P Slice 4K QP 12 Tile 70 P
98 T6 P Slice 4K QP 12 Tile 71 P + T6 P Slice 4K QP 8 Tile 71 R
99 T6 P Slice 4K QP 12 Tile 72 P + T6 P Slice 4K QP 8 Tile 72 R
100 T6 P Slice 4K QP 12 Tile 73 P + T6 P Slice 4K QP 8 Tile 73 R
101 T6 P Slice 4K QP 12 Tile 74 P + T6 P Slice 4K QP 8 Tile 74 R
102 T6 P Slice 4K QP 12 Tile 75 P + T6 P Slice 4K QP 8 Tile 75 R
103 T6 P Slice 4K QP 12 Tile 76 P + T6 P Slice 4K QP 8 Tile 76 R
104 T6 P Slice 4K QP 12 Tile 77 P + T6 P Slice 4K QP 8 Tile 77 R
105 T6 P Slice 4K QP 12 Tile 78 P
106 T6 P Slice 4K QP 12 Tile 79 P
107 T6 P Slice 4K QP 12 Tile 86 P
108 T6 P Slice 4K QP 12 Tile 87 P
109 T6 P Slice 4K QP 12 Tile 88 P
110 T6 P Slice 4K QP 12 Tile 89 P
111 T6 P Slice 4K QP 12 Tile 90 P
112 T6 P Slice 4K QP 12 Tile 91 P
113 T6 P Slice 4K QP 12 Tile 92 P
114 T6 P Slice 4K QP 12 Tile 93 P
115 T6 P Slice 4K QP 12 Tile 94 P
116 T6 P Slice 4K QP 12 Tile 95 P
117 T6 P Slice 2K QP 12 tile 24 P + T6 P Slice 2K QP 8 tile 24 R
118 T6 P Slice 2K QP 12 tile 25 P
119 T6 P Slice 2K QP 12 tile 26 P + T6 P Slice 2K QP 8 tile 26 R
120 T6 P Slice 4K QP 12 Tile 102 P
121 T6 P Slice 4K QP 12 Tile 103 P
122 T6 P Slice 4K QP 12 Tile 104 P
123 T6 P Slice 4K QP 12 Tile 105 P
124 T6 P Slice 4K QP 12 Tile 106 P
125 T6 P Slice 4K QP 12 Tile 107 P
126 T6 P Slice 4K QP 12 Tile 108 P
127 T6 P Slice 4K QP 12 Tile 109 P
128 T6 P Slice 4K QP 12 Tile 110 P
129 T6 P Slice 4K QP 12 Tile 111 P
130 T6 P Slice 4K QP 12 Tile 118 P
131 T6 P Slice 4K QP 12 Tile 119 P
132 T6 P Slice 4K QP 12 Tile 120 P
133 T6 P Slice 4K QP 12 Tile 121 P
134 T6 P Slice 4K QP 12 Tile 122 P
135 T6 P Slice 4K QP 12 Tile 123 P
136 T6 P Slice 4K QP 12 Tile 124 P
136 T6 P Slice 4K QP 12 Tile 125 P
137 T6 P Slice 4K QP 12 Tile 126 P
138 T6 P Slice 4K QP 12 Tile 127 P
139 T6 P Slice 4K QP 12 Tile 128 P

FIG. 11C

0 T7 B Slice 4K QP 12 Tile 0 B
1 T7 B Slice 4K QP 12 Tile 1 B
2 T7 B Slice 4K QP 12 Tile 2 B
3 T7 B Slice 4K QP 12 Tile 3 B
4 T7 B Slice 4K QP 12 Tile 4 B
5 T7 B Slice 4K QP 12 Tile 5 B
6 T7 B Slice 4K QP 12 Tile 6 B
7 T7 B Slice 4K QP 8 Tile 7 B
8 T7 B Slice 4K QP 8 Tile 8 B
9 T7 B Slice 4K QP 8 Tile 9 B
10 T7 B Slice 4K QP 8 Tile 10 B
11 T7 B Slice 4K QP 8 Tile 11 B
12 T7 B Slice 4K QP 8 Tile 12 B
13 T7 B Slice 4K QP 8 Tile 13 B
14 T7 B Slice 4K QP 8 Tile 14 B
15 T7 B Slice 4K QP 12 Tile 15 B
16 T7 B Slice 4K QP 12 Tile 16 B
17 T7 B Slice 4K QP 12 Tile 17 B
18 T7 B Slice 4K QP 12 Tile 18 B
19 T7 B Slice 4K QP 12 Tile 19 B
20 T7 B Slice 4K QP 12 Tile 20 B
21 T7 B Slice 4K QP 12 Tile 21 B
22 T7 B Slice 4K QP 12 Tile 22 B
23 T7 B Slice 4K QP 8 Tile 23 B
24 T7 B Slice 4K QP 8 Tile 24 B
25 T7 B Slice 4K QP 8 Tile 25 B
26 T7 B Slice 4K QP 8 Tile 26 B
27 T7 B Slice 4K QP 8 Tile 27 B
28 T7 B Slice 4K QP 8 Tile 28 B
29 T7 B Slice 4K QP 8 Tile 29 B
30 T7 B Slice 4K QP 8 Tile 30 B
31 T7 B Slice 4K QP 12 Tile 31 B
32 T7 B Slice 4K QP 12 Tile 32 B
33 T7 B Slice 4K QP 12 Tile 33 B
34 T7 B Slice 4K QP 12 Tile 34 B
35 T7 B Slice 4K QP 12 Tile 35 B
36 T7 B Slice 4K QP 12 Tile 36 B
37 T7 B Slice 4K QP 12 Tile 37 B
38 T7 B Slice 4K QP 12 Tile 38 B
39 T7 B Slice 4K QP 8 Tile 39 B
40 T7 B Slice 8K QP 12 tile 144 B
41 T7 B Slice 8K QP 12 tile 145 B
42 T7 B Slice 8K QP 8 tile 146 B
43 T7 B Slice 8K QP 8 tile 147 B
44 T7 B Slice 8K QP 8 tile 148 B
45 T7 B Slice 8K QP 8 tile 149 B
46 T7 B Slice 8K QP 8 tile 150 B
47 T7 B Slice 8K QP 8 tile 151 B
48 T7 B Slice 8K QP 12 tile 152 B
49 T7 B Slice 8K QP 12 tile 153 B
50 T7 B Slice 8K QP 12 tile 176 B
51 T7 B Slice 8K QP 12 tile 177 B
52 T7 B Slice 8K QP 8 tile 178 B
53 T7 B Slice 8K QP 8 tile 179 B
54 T7 B Slice 8K QP 8 tile 180 B
55 T7 B Slice 8K QP 8 tile 181 B
56 T7 B Slice 8K QP 8 tile 182 B
57 T7 B Slice 8K QP 8 tile 183 B
58 T7 B Slice 8K QP 12 tile 184 B
59 T7 B Slice 8K QP 12 tile 185 B
60 T7 B Slice 4K QP 8 Tile 45 B
61 T7 B Slice 4K QP 12 Tile 46 B
62 T7 B Slice 4K QP 12 Tile 47 B
63 T7 B Slice 4K QP 12 Tile 48 B
64 T7 B Slice 4K QP 12 Tile 49 B
65 T7 B Slice 4K QP 12 Tile 50 B
66 T7 B Slice 4K QP 12 Tile 51 B
67 T7 B Slice 4K QP 12 Tile 52 B
68 T7 B Slice 4K QP 12 Tile 53 B
69 T7 B Slice 4K QP 12 Tile 54 B
70 T7 B Slice 4K QP 8 Tile 55 B
71 T7 B Slice 8K QP 12 tile 176 B
72 T7 B Slice 8K QP 12 tile 177 B
73 T7 B Slice 8K QP 8 tile 178 B
74 T7 B Slice 8K QP 8 tile 179 B
75 T7 B Slice 8K QP 8 tile 180 B
76 T7 B Slice 8K QP 8 tile 181 B
77 T7 B Slice 8K QP 8 tile 182 B
78 T7 B Slice 8K QP 8 tile 183 B
79 T7 B Slice 8K QP 12 tile 184 B
80 T7 B Slice 8K QP 12 tile 185 B
81 T7 B Slice 8K QP 12 tile 208 B
82 T7 B Slice 8K QP 12 tile 209 B
83 T7 B Slice 8K QP 8 tile 210 B
84 T7 B Slice 8K QP 8 tile 211 B
85 T7 B Slice 8K QP 8 tile 212 B
86 T7 B Slice 8K QP 8 tile 213 B
87 T7 B Slice 8K QP 8 tile 214 B
88 T7 B Slice 8K QP 8 tile 215 B
89 T7 B Slice 8K QP 12 tile 216 B
90 T7 B Slice 8K QP 12 tile 217 B
91 T7 B Slice 8K QP 8 tile 61 B +
92 T7 B Slice 8K QP 12 tile 62 B
93 T7 B Slice 8K QP 12 tile 63 B
94 T7 B Slice 2K QP 8 tile 16 B
95 T7 B Slice 2K QP 12 tile 17 B
96 T7 B Slice 2K QP 8 tile 18 B
97 T7 B Slice 4K QP 12 Tile 70 B
98 T7 B Slice 4K QP 8 Tile 71 B
99 T7 B Slice 4K QP 8 Tile 72 B
100 T7 B Slice 4K QP 8 Tile 73 B
101 T7 B Slice 4K QP 8 Tile 74 B
102 T7 B Slice 4K QP 8 Tile 75 B
103 T7 B Slice 4K QP 8 Tile 76 B
104 T7 B Slice 4K QP 8 Tile 77 B
105 T7 B Slice 4K QP 12 Tile 78 B
106 T7 B Slice 4K QP 12 Tile 79 B
107 T7 B Slice 4K QP 12 Tile 86 B
108 T7 B Slice 4K QP 12 Tile 87 B
109 T7 B Slice 4K QP 12 Tile 88 B
110 T7 B Slice 4K QP 12 Tile 89 B
111 T7 B Slice 4K QP 12 Tile 90 B
112 T7 B Slice 4K QP 12 Tile 91 B
113 T7 B Slice 4K QP 12 Tile 92 B
114 T7 B Slice 4K QP 12 Tile 93 B
115 T7 B Slice 4K QP 12 Tile 94 B
116 T7 B Slice 4K QP 12 Tile 95 B
117 T7 B Slice 2K QP 8 tile 24 B
118 T7 B Slice 2K QP 12 tile 25 B
119 T7 B Slice 2K QP 8 tile 26 B
120 T7 B Slice 4K QP 12 Tile 102 B
121 T7 B Slice 4K QP 12 Tile 103 B
122 T7 B Slice 4K QP 12 Tile 104 B
123 T7 B Slice 4K QP 12 Tile 105 B
124 T7 B Slice 4K QP 12 Tile 106 B
125 T7 B Slice 4K QP 12 Tile 107 B
126 T7 B Slice 4K QP 12 Tile 108 B
127 T7 B Slice 4K QP 12 Tile 109 B
128 T7 B Slice 4K QP 12 Tile 110 B
129 T7 B Slice 4K QP 12 Tile 111 B
130 T7 B Slice 4K QP 12 Tile 118 B
131 T7 B Slice 4K QP 12 Tile 119 B
132 T7 B Slice 4K QP 12 Tile 120 B
133 T7 B Slice 4K QP 12 Tile 121 B
134 T7 B Slice 4K QP 12 Tile 122 B
135 T7 B Slice 4K QP 12 Tile 123 B
135 T7 B Slice 4K QP 12 Tile 124 B
136 T7 B Slice 4K QP 12 Tile 125 B
137 T7 B Slice 4K QP 12 Tile 126 B
138 T7 B Slice 4K QP 12 Tile 127 B
139 T7 B Slice 4K QP 12 Tile 128 B

FIG. 11D

SYSTEMS AND METHODS FOR ENCODING SPHERICAL MEDIA CONTENT

BACKGROUND

This disclosure is directed to systems and methods for encoding content. More particularly, techniques are disclosed for encoding a plurality of versions of portions of a spherical media content item.

SUMMARY 360-degree foveated rendering is a technique used in virtual reality (VR) and augmented reality (AR) to optimize the rendering process by prioritizing the highest quality visuals in the area where the user is directly looking (the fovea) and reducing the quality in peripheral areas. This approach leverages the natural structure of the human eye, which has a small region called the fovea that is responsible for sharp central vision, while the surrounding peripheral vision is less detailed. The term "foveated" refers to the fovea, a small central pit in the retina where visual acuity is highest. Foveated rendering takes advantage of this by rendering high-resolution graphics only in the area the user is focusing on, while the resolution decreases progressively in the peripheral areas. In the VR and AR environments, users can look in any direction, necessitating 360-degree rendering.

Foveated rendering in this context dynamically adjusts as the user moves their gaze around the environment. With the addition of eye-tracking technology, eye-tracking sensors detect where the user's gaze is directed. This data is used in real time to update the rendering focus area, ensuring that the highest resolution follows the user's point of attention. The benefits of foveated rendering include reduction in the computational load by not requiring the entire scene to be rendered in high resolution, as well as allowing for more complex scenes and higher frame rates, improving the overall VR or AR experience. Additionally, it provides for a more efficient use of GPU and CPU resources, leading to lower power consumption and potentially extending battery life in portable VR devices and enables higher-quality graphics within the same hardware constraints. The end result is an overall enhanced user experience can be achieved by focusing computational power and bandwidth for the 360° streaming on the area the user is looking.

The spatial representation description (SRD) feature, which was introduced in a later revision of the dynamic adaptive streaming over HTTP (DASH) specification, is used to describe the relationship between blocks in 360-degree space. The SRD feature is used in an adaptive 360° video VR streaming system based on MPEG-DASH. Tiles may be streamed to the computing device via the HTTP-based solution for adaptive bitrate streaming, such as via the DASH standard that responds to user device and network conditions. As the bandwidth changes and/or as the user's view or gaze changes, different tiles are selected from encoded qualities and/or resolutions of content, and foveated rendering systems may perform the tile selection for each frame based on the user's view and assemble them into a complete picture to deliver to the client device. The system uses a dynamic view-aware adaptation technique to address the high bandwidth demands of streaming 360° VR videos to VR headsets. Prior to the definition of SRD, there was no descriptor to associate spatial information with media assets. DASH now supports 360 video with the addition of SRD to the specification.

Given the high-bandwidth demands of foveated rendering, and the large amount of data associated with 360-degree content, encoding such content to minimize the amount of data that is stored or transmitted is desirable. In one approach to encoding content to be provided using foveated rendering, an encoding scheme known as all block Intra encoding is employed, where all qualities of each resolution for frames of the content require a corresponding block intra encoding. This encoding is limited to an intra- and predictive-tile (IP) group of pictures (GOP) structure only with only Intra-tile and Predicted tile encodings. In another approach to encoding content provided using foveated rendering, phased encoding is employed in which bitstreams of different qualities are encoded, each quality having several phases per quality (such as 15 phases per quality), where each phase within an encoding has a different offset of a picture composed of all intra-tiles. In such approach, the encoding structure has two parameters: period (which is the size of the GOP), and phase (which is a number in the range 0 to period-1). While this approach can be useful, it requires many encodings; as an example, a 15-phase encoding with 15 qualities would require 225 encodings, and does not utilize bi-directional tiles (e.g., due to how the combining of the tiles works and performing the upgrades and the downgrades based on changes in the user's field of view). Moreover, as headset resolutions continue to increase, to provide the optimal quality for the headset resolution, there is a need for efficiently encoding higher-resolution 360-degree video, such as moving up to 16K and 32K for 4K and 8K resolution per eye headsets.

To help address these problems, systems, methods, and apparatuses are disclosed herein for identifying a plurality of versions of a plurality of frames of a spherical media content item, wherein each version of the plurality of versions is associated with one of a plurality of resolutions and one of a plurality of video qualities. The disclosed techniques may encode the plurality of versions of the plurality of frames to obtain encoding data, wherein the encoding data comprises, for each resolution of the plurality of resolutions, a respective version comprising a group of pictures (GOP) comprising intra-tiles and predictive tiles and residual data. The disclosed techniques may provide, over a network, a first frame of the spherical media content item to a computing device, wherein the first frame comprises tiles of a first resolution of the plurality of resolutions of the encoding data and tiles of a second resolution of the plurality of resolutions of the encoding data, wherein the first resolution is higher than the second resolution, and wherein the tiles of the first frame of the first resolution are provided at a region of interest (ROI) in a viewport associated with the computing device. The disclosed techniques may determine a change in the region of interest (ROI), and based on the determining, provide, over the network, a second frame of the spherical media content item to the computing device, wherein the second frame comprises at least a portion of the residual data which is used to upgrade a video quality of tiles of the second frame that correspond to the changed ROI.

Such aspects enable an improved quality of service (QoS) for viewing 360-degree high resolution content in bandwidth constrained environments, to provide optimizations to achieve optimal quality in future higher-resolution extended reality (XR) headsets. In some embodiments, the techniques described herein may leverage residual scalable High Efficiency Video Coding (SHVC) encoding at the tile level along with the introduction of bidirectional (B)-tiles (also referred to as bidirectional predictive tiles of a B-frame). In some embodiments, the techniques described herein may encode tiles to leverage SHVC residual encodings allowing a combination of intra (I)-tiles, predictive (P)-tiles, B-tiles, and residual (R)-tiles to be sent to a client device accessing the spherical media content item. In some embodiments, the selection of tiles is performed either by the client device in a pull model (e.g., DASH) or the in the server and streamed to the client device via real-time transport protocol (RTP). In some embodiments, the disclosed techniques improve the efficiency and ease of decoding spherical media content associated with foveated rendering. For example, a decoder of the client device receives, decodes, and renders the tiles to generate a foveated display to the user where the highest-quality tiles are in the main field of view of the user.

In some embodiments, the techniques disclosed herein for encoding and decoding tiles for 360-degree video include utilizing base block intra (all I-tiles) encodings for the lowest quality for each resolution. The higher-quality normal tiled encodings within the same resolution may have a corresponding residual encoding allowing the bidirectional or predicted pictures to be upgraded or downgraded to the required quality in the next frame. In some embodiments, base layer and regular encodings may comprise frames having all B-tiles.

As another example, a base block intra (all I tiles) encoding along with a normal encoding at the lowest resolution and quality may be provided herein. The higher qualities across all resolutions may be encoded with residual tiles for that specific quality to be upgraded or downgraded using only the corresponding residual tile and not requiring an intra-tile. Such example may map pixels from a relatively large coverage area of a low-resolution tile and a smaller coverage area of the higher resolution tiles. In some embodiments, processing may be performed post-decode.

In some embodiments, the disclosed techniques enable, unlike the aforementioned all block Intra approach, avoiding delivery to the client device of intra-tiles for each specific quality, thereby saving bandwidth. Content delivery network (CDN) storage space may also be saved at least in part due to not having to store all intra-tiles for a block intra encoding, and multiple phases are not required within a specific quality, as in the aforementioned phased encoding approach, alleviating encoders of the requirement to generate 360-degree content along with a large amount of CDN edge storage space required to store the phased encodings. In some embodiments, B-tiles can be used, saving even more bandwidth and CDN storage space, and providing for a further improved QoS in bandwidth constrained conditions.

In some embodiments, the disclosed techniques further comprise, based on the determining, providing a third frame of the spherical media content item to the computing device, wherein the third frame is provided to the computing device prior to the second frame, wherein tiles of the third frame corresponding to the changed ROI are provided in a higher resolution, of the plurality of resolutions of the encoded data, than corresponding tiles of the first frame, and wherein the resolution of the tiles of the third frame corresponding to the changed ROI matches the resolution of the tiles of the second frame corresponding to the changed ROI. In some embodiments, the tiles of the third frame comprise only intra-tiles for a lowest video quality of the resolution of the tiles of the third frame. In some embodiments, the disclosed techniques further comprise assembling the second frame to comprise the at least a portion of the residual data for the tiles that correspond to the changed ROI, wherein the at least a portion of the residual data is combined with at least a portion of the GOP, wherein the GOP is included in a base layer, and wherein the residual data is included in an enhancement layer encoding differences between the base layer and its corresponding higher resolution, and tiles that are not provided with residual data based on not being included in the changed ROI.

In some embodiments, the encoding comprises causing a first portion of the GOP to comprise intra-tiles; causing a second portion of the GOP to comprise bidirectional predictive tiles; causing a third portion of the GOP to comprises predictive tiles; and causing the residual data to comprise companion streams for the first portion of the GOP comprising intra-tiles and the third portion of the GOP comprising predictive tiles, respectively, and to not comprise a companion stream for the second portion of the GOP comprising bidirectional predictive tiles. In some embodiments, the encoding data comprises the first portion of the GOP or the third portion of the GOP.

In some embodiments, determining that the bidirectional predictive tiles of the GOP are associated with the time within the spherical media content of the determined change of the ROI comprises identifying a predictive tile in the GOP that corresponds to the time of the determined change of the ROI and that immediately precedes a bidirectional tile in the GOP, and the disclosed techniques may further cause the encoding data to include an intra-tile from a companion stream corresponding to the GOP, instead of the predictive tile.

In some embodiments, determining that the bidirectional predictive tiles of the GOP are associated with the time within the spherical media content of the determined change of the ROI comprises identifying a predictive tile in the GOP that immediately precedes a bidirectional tile in the GOP and that immediately precedes the time of the determined change of the ROI, and the disclosed techniques may further cause the encoding data to include an intra-tile from a companion stream corresponding to the GOP, instead of the predictive tile.

In some embodiments, the encoding data is first encoding data, the method further comprising, for each respective resolution of the plurality of resolutions, identifying a lowest video quality version; and encoding each lowest video quality version to obtain, for each respective lowest video quality version, second encoding data comprising a GOP comprising intra-tiles and predictive tiles and a GOP comprising only intra-tiles. In some embodiments, for a respective resolution, each version other than the lowest video quality version is encoded to obtain a respective group of pictures (GOP) comprising intra-tiles and predictive tiles; and respective residual data. In some embodiments, the second encoding data does not comprise residual data. In some embodiments, the encoding further comprises causing the GOP of the second encoding data to comprise a first portion comprising intra-tiles, a second portion comprising bidirectional predictive tiles, and a third portion comprising predictive tiles. The disclosed techniques may cause the GOP of the second encoding data comprising only intra-tiles to be associated with a companion stream of intra-tiles for the first portion; and a companion stream of intra-tiles for the third portion; wherein the GOP of the second encoding data comprising only intra-tiles does not comprise a companion stream for at least one of the bidirectional predictive tiles of the second portion.

In some embodiments, the disclosed techniques further comprise identifying a first bidirectional predictive frame of the second portion that precedes a second bidirectional predictive frame of the second portion; determining that the second bidirectional predictive frame precedes a predictive frame; and causing the first bidirectional predictive frame not to be associated with a companion stream, and causing the second bidirectional predictive frame to be associated with a companion stream of intra-tiles.

In some embodiments, the disclosed techniques further comprise using an open GOP to compensate for delay at a beginning of the spherical media content item. In some embodiments, the plurality of video qualities comprises at least one of different bitrates or different quantization parameters (QPs).

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 10B shows an example of a set of tiles of the level of block intra-tiles selected based on the viewport change in FIG. 10A, in accordance with some embodiments of this disclosure.

FIG. 10C shows an example of a set of tiles selected from the tile encodings of FIG. 10A, for upgrading the next picture, after the previous all block intra set of tiles, to decode and render at T4, in accordance with some embodiments of this disclosure.

FIG. 10D shows an example of a set of tiles selected from the tile encodings of FIG. 10A, and the next picture to decode and render after T4 which is picture T5, in accordance with some embodiments of this disclosure.

FIG. 11B shows an illustrative set of selected tiles is an example of a lowest level of block intra-tiles, in accordance with some embodiments of this disclosure.

FIG. 11C shows an illustrative set of tiles is selected for upgrading the next picture, in accordance with some embodiments of this disclosure.

FIG. 11D shows an example of the next B-tiles being sent to the client device for decoding, in accordance with some embodiments of this disclosure.

DETAILED DESCRIPTION

The processes discussed above and below are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

Figure 1:
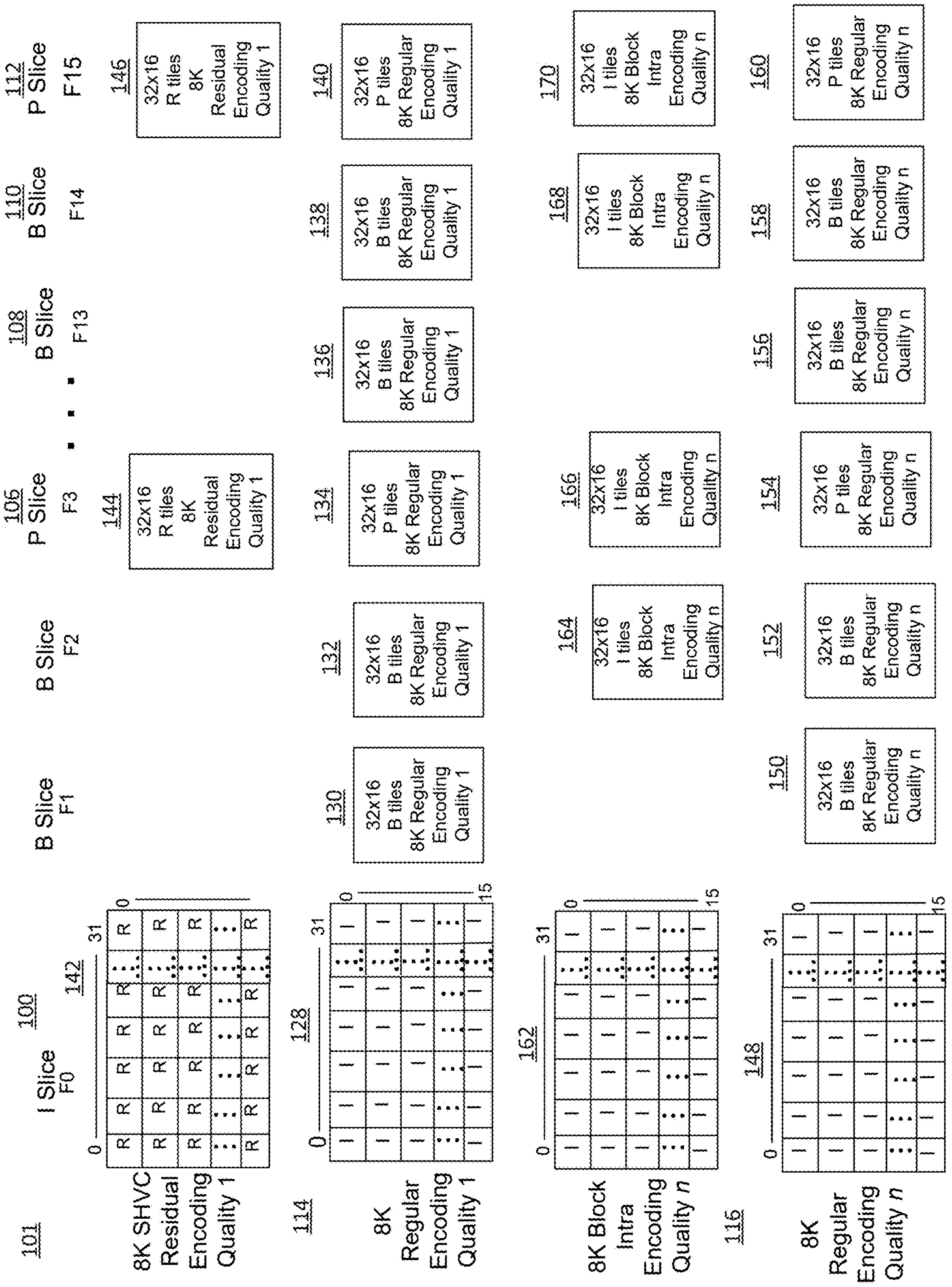
FIG. 1 shows illustrative encoding data for portions of a spherical media content item, in accordance with some embodiments of this disclosure.
Figure 1:
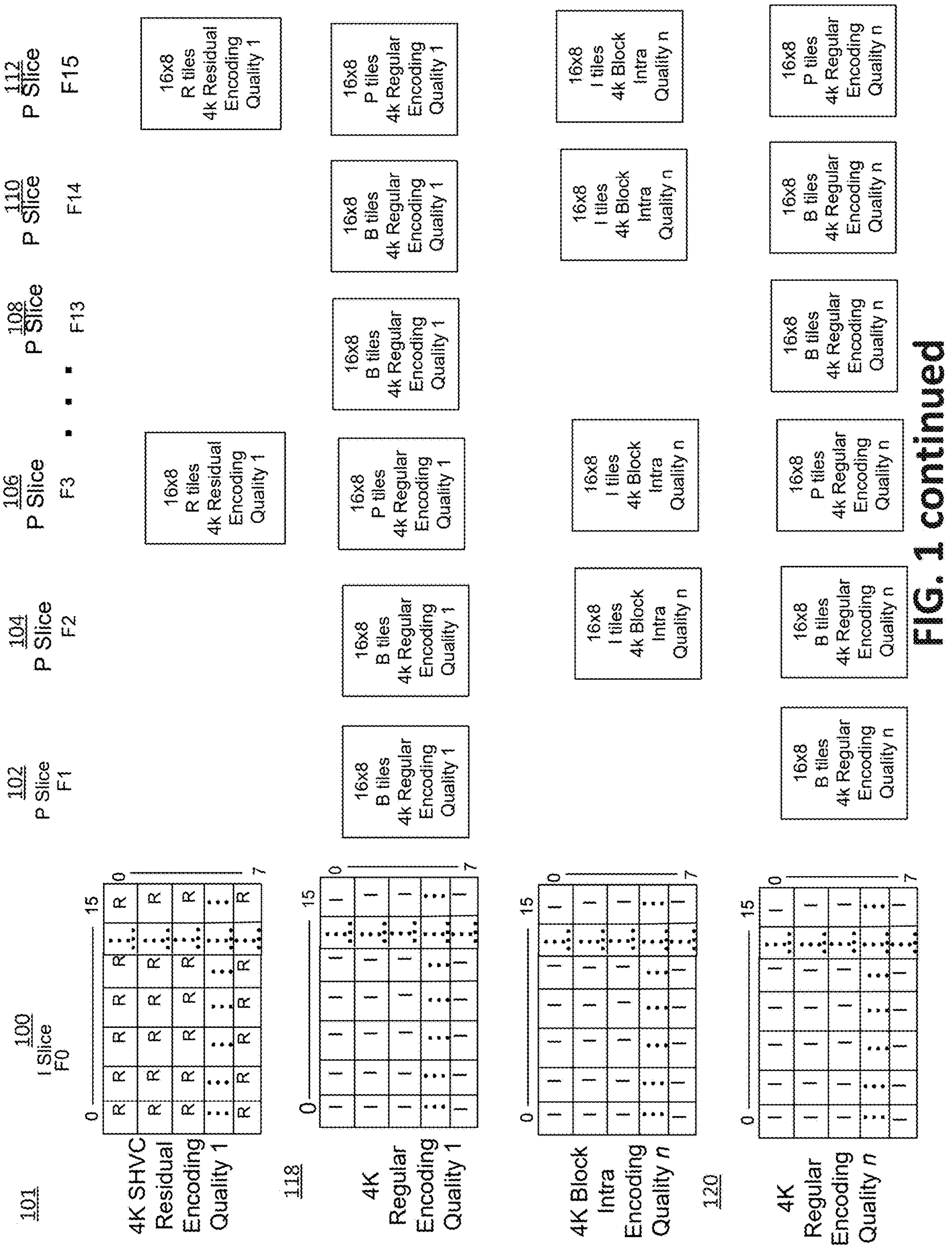
Figure 1:
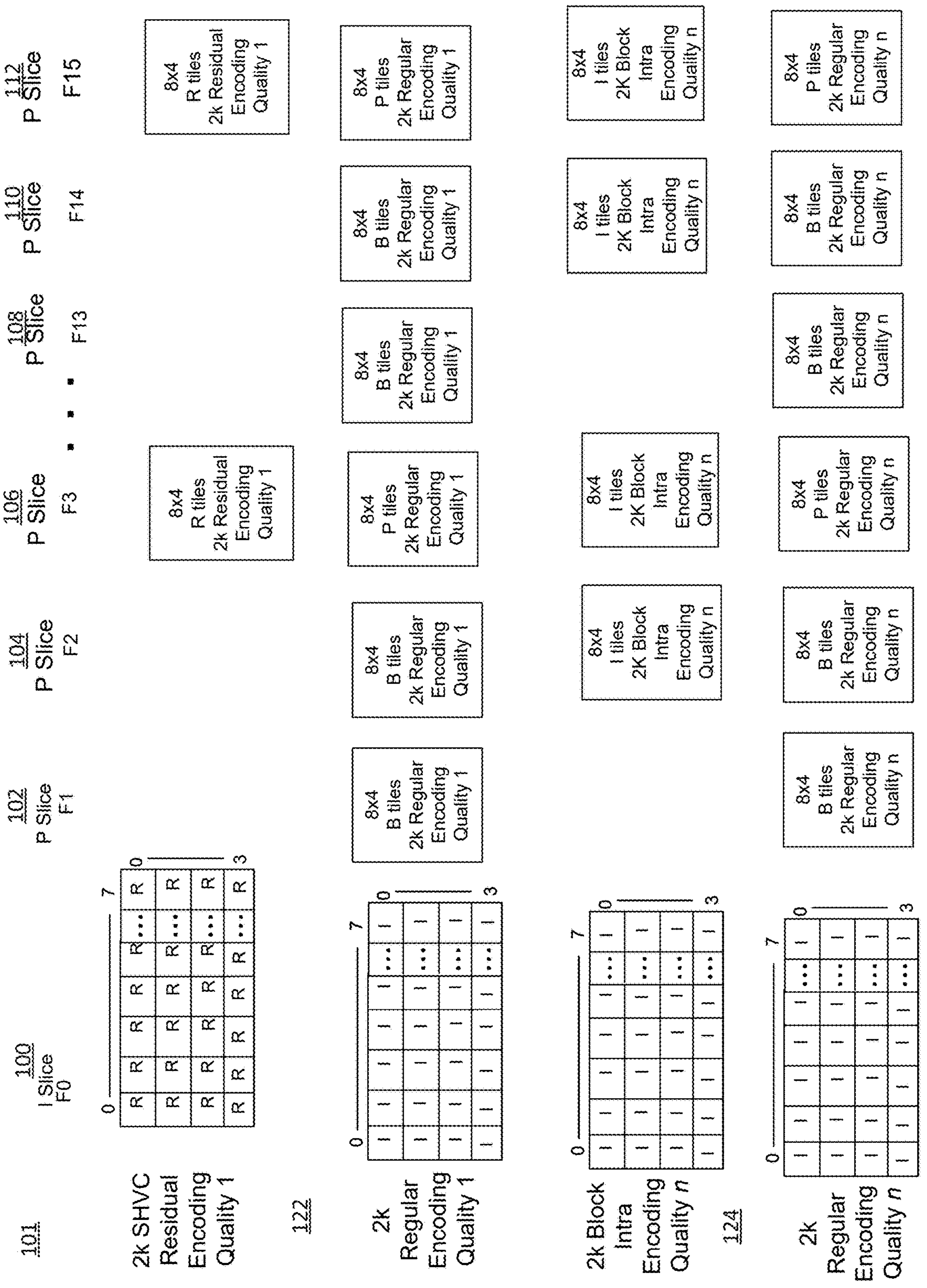

FIG. 1 shows illustrative encoding data 101 for portions of a spherical media content item, in accordance with some embodiments of this disclosure. FIG. 1 shows encoding data 101 for a plurality of frames 100, 102, 104, 106, . . . , 108, 110, and 112 of a spherical media content item. Each frame may be available in a plurality of versions 114, 116, 118, 120, 122, and 124 coded in one of a plurality of resolutions (e.g., 8K, 4K, 2K, and/or any other suitable set of resolutions) and in one of a plurality of video qualities (e.g., quality 1 in FIG. 1 being the highest, or relatively higher, of the video qualities, and quality n being the lowest of the video qualities, such as in terms of bitrate, and/or any other suitable measure of quality, such as, for example a quantization parameter (QP)). In some embodiments, the versions or renditions of the frames of the spherical media content item described herein may be obtained using any suitable technique, e.g., by transcoding a particular version into versions of varying formats or qualities. In some embodiments, the versions or renditions of the frames or segments or any other suitable portion of the spherical media content item may be indicated in a manifest, and requested by a client device (e.g., device 1311 of FIG. 13), e.g., an extended reality (XR) device, from one or more servers (e.g., an edge server or an origin server of a content delivery network (CDN) and/or any other suitable server). In some embodiments, the spherical media content (e.g., content 501 in FIG. 5) is provided, e.g., by a content server, a web server, and/or edge server(s) of a CDN, to a computing device using any suitable protocol. In some embodiments, the computing device may be, for example, a headset; a mobile device such as, for example, a smartphone or tablet; a laptop computer; a personal computer; a desktop computer; a smart television; a smart watch or wearable device; smart glasses; an XR head-mounted display (HMD); a stereoscopic display; a wearable camera; XR glasses; XR goggles; a near-eye display device; a robot; an autonomous cleaning device; or any other suitable user equipment or device capable of connecting to the Internet or other suitable network; or any combination thereof.

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

As referred to herein, compression and/or encoding of an image may be understood as performance (e.g., by the media application, using any suitable combination of hardware and/or software) of bit reduction techniques on digital bits of the image in order to reduce the amount of storage space required to store data. Such techniques may reduce the bandwidth or network resources required to transmit the image over a network or other suitable wireless or wired communication medium and/or enable bitrate savings with respect to downloading or uploading the image data. Such techniques may data such that the encoded image or encoded portion thereof may be represented with fewer digital bits than the original representation while minimizing the impact of the encoding or compression on the quality of the image data.

The spherical media content item may be, for example, XR content, 3D content, a live sports game, recorded or stored content, video-on-demand content, a video game, a website, an application, or any other suitable content, or any combination thereof. Spherical media content may comprise any suitable number of tiles, e.g., 32 tiles for 8K resolution frames, or 16 tiles for 4K resolution frames, as shown in FIG. 1, and as shown in more detail in FIG. 3. A representation of a viewport of an XR device providing spherical media content, with a grid of tiles overlaid, is shown in more detail in FIG. 3. In some embodiments, the viewport may not display the entirety of the spherical media content item; rather it may provide for display to the user, in the viewport display, a portion of interest of the spherical media content item.

In some embodiments, a viewport associated with the computing device may be generated for display. When recording using a camera with multiple lenses, an omnidirectional, panoramic or spherical media content item may be created by stitching together, via software, the content captured by each lens of the camera. The spherical media content item referred to herein encompasses omnidirectional and panoramic media content items. The spherical media content item may be a monoscopic or a stereoscopic 180-degree or 360-degree recording. In addition, the spherical media content may be in an equirectangular, cube map, pyramid projection, equiangular cube map, fisheye or dual fisheye format, or any other suitable format, or any suitable combination thereof. A stereoscopic media content item may comprise two equirectangular videos that are stitched together to form an image that is 360 degrees in the horizontal direction and 180 degrees in the vertical direction. The spherical media content item may comprise a plurality of frames, each frame comprising a plurality of tiles. A viewport is the portion of the spherical media content item that is generated for display at user equipment. The spherical media content may comprise tiles that are formed projecting an equirectangular frame and grid onto the spherical content item. Typically, a spherical media content item will be streamed to (or played at) a computing device such as a VR headset; however, a spherical media content item may also be streamed to (or played at) a computing device such as a laptop. In the case of a laptop, the video is flattened, and the user may use, for example, a mouse, touchscreen display or keyboard keys to move the output of the spherical content item. In the example of the VR headset, as a user moves their head, the VR headset may generate and display different portions of the spherical media content item to the user.

An encoding application may be configured to perform the functionalities (or one or more portions thereof) described herein. The encoding application may be executing at least in part at a computing device (e.g., computing device 1200 or 1201 of FIG. 12) and/or at one or more remote servers (e.g., media content source 1302 and/or server 1304 of FIG. 13) and/or at any other suitable computing device(s). The encoding application may correspond to or be included as part of an encoding system, which may be configured to perform the functionalities (or one or more portions thereof) described herein. In some embodiments, the encoding system may comprise or be incorporated as part of any suitable application or software. For example, the encoding system may comprise: a tile selection system; one or more extended reality (XR) applications; one or more content delivery applications; one or more video or image or electronic communication applications; one or more social networking applications; one or more image or video capturing and/or editing applications; one or more image, video and/or textual acquisition, recognition and/or processing applications; one or more content creation applications; one or more machine learning models or artificial intelligence models; one or more streaming media applications; or any other suitable application(s) or any combination thereof; and/or may comprise or employ any suitable number of displays; sensors or devices such as those described in FIGS. 1-14; or any other suitable software and/or hardware components; or any combination thereof.

In some embodiments, the encoding application may be installed at or otherwise provided to a particular computing device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

The encoding application may encode spherical media content items using any suitable technique, e.g., the media content may employ a hybrid video coder such as, for example, the high efficiency video coding (HEVC/H.265 standard, the versatile video coding (VVC) H.266 standard, scalable extensions of HEVC (SHVC), or any other suitable codec or standard capable of supporting the tiling and other encoding techniques described herein, or any suitable combination thereof.

As shown in FIG. 1, the encoding application may encode frames of the spherical media content item using an IBBP GOP structure for portions of encoding data 101, as well as residual data or block intra data. The IBBP GOP structure may include block intra-tiles for the lowest quality for each resolution and residual tile encoding for upgrades of quality within same resolution.

In some embodiments, encoding may be performed based at least on foveated rendering, e.g., to optimize delivery of the tiles based on the user's gaze within their field of view (FOV), and/or based on current network conditions (e.g., bandwidth). For example, depending on where a user is gazing and/or available bandwidth, a particular video quality and/or video resolution may be requested, e.g., higher quality and/or higher resolution at a portion of the viewport the user is gazing at, and lower quality and/or lower resolution at a portion of the viewport relatively far away from the portion of the viewport the user is gazing at. In some embodiments, in assigning likelihoods of viewing to portions of content, one or more of the techniques described in U.S. Pat. No. 11,716,454 issued in the name of Rovi Guides, Inc., the contents of which are hereby incorporated by reference herein in its entirety, may be implemented herein.

FIG. 1 shows GOPs for versions 114, 116, 120, 122, and 124 of frames 100, 102, 104, 106, . . . , 108, 110, and 112 of the spherical media content item. As shown in FIG. 1, the encoding application may encode frames of the spherical media content item using an IBBP GOP structure. The encoding for an IBBP GOP structure shown in FIG. 1 may include a block intra for the lowest quality for each resolution, and for the relatively higher resolution, residual tile encoding for upgrades of quality within the same resolution.

A GOP may be understood as a set of frames coded together, and including any suitable number of key and predictive frames, where a key frame may be an I-frame or intra-coded frame representing a fixed image that is independent of other views or pictures, and predictively coded frames may contain different information indicating distinctions from the reference I-frame. For example, the encoding application may predict or detect that frame(s) sequential in time and/or included in a particular frame, scene, or segment have significant redundancies and similarities across their respective pixel, voxel and/or color data. In some embodiments, the encoding application may employ compression and/or encoding techniques that only encodes a delta or change of the predictive frames with respect to the I-frame, and/or compression and/or encoding techniques may be employed to exploit redundancies within a particular frame. Such spatial similarities as between frames may be exploited to enable frames within a GOP to be represented with fewer bits than their original representations, to thereby conserve storage space needed to store the image data and/or network resources needed to transmit spherical media content. In some embodiments, each GOP may correspond to different time periods of the spherical media content item. The portions of a GOP may be encoded using any suitable technique, e.g., differentially or predictively encoded, or any other suitable technique or combination thereof.

Version 114 may be encoded as 8K spatial residual (R) encoding data of quality 1 (e.g., the highest quality amongst the 8K resolution versions for the spherical content item) and an 8K regular encoding data of quality 1. Such 8K regular encoding data of quality 1 of version 114 may comprise an IBBP GOP of intra (I)-frame 128 comprising intra-tiles and corresponding to frame 100; bidirectional (B)-frame 130 (also referred to as a bidirectional predictive frame) comprising B-tiles (also referred to as bidirectional predictive tiles) and corresponding to frame 102; B-frame 132 corresponding to frame 104; predictive (P)-frame 134 comprising P-tiles and corresponding to frame 106; B-frame 136 corresponding to frame 108; B-frame 138 corresponding to frame 110; and P-frame 140 corresponding to frame 112. In some embodiments, the I-frames, P-frames, and/or B-frames may be referred to herein as motion-constrained tiles. Generally, P-frames may be predicted from a frame that occurs before it in a presentation order, and B-frames may be predicted from frames that occur before and after it in the presentation order. In some embodiments, I-frames or tiles may be implemented as instantaneous decoder refresh (IDR) frames or tiles.

As shown in FIG. 1, 8K residual encoding data of quality 1 may comprise residual data 142 for I-frame 128, residual data 144 for P-frame 134, and residual data 146 for P-frame 140. In some embodiments, residual data 142, residual data 144, and residual data 146 may be considered companion streams for I-frame 128, P-frame 134, and P-frame 140, respectively.

It should be noted that certain frames and/or tiles that implemented in the same or similar manner have been represented differently in FIGS. 1, 2, 4, 10A, and 11A for ease of illustration. For example, in FIG. 1, residual data 144 is implemented in the same or similar manner as residual data 142, although residual data 144 is represented differently in FIG. 1 for ease of illustration. Similarly, I-frames 164, 166, 168, and 170 are implemented in the same or similar manner as I-frame 162. B-frames, e.g., 128, 130, and P-frames, e.g., 132, may also be represented similarly to the depiction of, e.g., I-frame 128, except having B-frames and P-frames, respectively, or any suitable combination of I-frames, B-frames, P-frames and/or any other suitable data.

In some embodiments, the residual data described herein may be implemented as part of an enhancement layer (EL) of SHVC. The implementation of SHVC includes a base layer which is a core layer that provides the lowest quality but fully decodable version of the video, and such base layer can be used independently. The implementation of SHVC further includes ELs that build upon the base layer to improve video quality. Each EL can provide spatial scalability to improve resolution, temporal scalability to improve frame rate, and quality scalability to improve overall visual quality (signal-to-noise ratio). When creating ELs, the differences (residuals) between the base layer and the higher quality version are encoded, and the ERL comprises this residual data. The ERL stores the difference between the base layer and the EL. When combined with the base layer, it reconstructs a higher quality version of the video. By encoding only the differences, the enhancement residual layer efficiently adds quality without duplicating the entire video content, and allows a scalable approach where different devices or networks can choose to decode just the base layer or additional ELs based on their capability and bandwidth availability. In some scenarios, different layers can be separated into different bitstreams, where all decoders can access the base stream, and more capable decoders can access the enhancement streams to improve the quality of video streaming. SHVC may be flexible and adaptable, e.g., used to encode a video once and the resulting bitstream can be decoded at multiple reduced rates and resolutions. SHVC is an extension of HEVC, also referred to as H.265. H.265 divides a video frame into independent rectangular regions, and each region can be encoded independently, and multiple video tiles may be decoded in parallel.

Version 116 may be encoded as 8K block intra encoding data of video quality n (e.g., the lowest quality amongst the 8K resolution versions for the spherical content item) and 8K regular encoding quality n. Such 8K regular encoding data of quality 1 of version 114 may comprise an IBBP GOP, e.g., I-frame 148, B-frame 150, B-frame 152, and P-frame 154, and B-frame 156, B-frame 158, and P-frame 160. The 8K block intra encoding data of video quality n comprises I-frames 162, 164, 166, 168, and 170. In some embodiments, I-frames 162, 164, 166, 168, and 170 may be considered companion streams for I-frame 148, B-frame 152, P-frame 154, B-frame 158, and P-frame 160, respectively.

In some embodiments, a P-frame or P-picture may be encoded to include B-tiles and P-tiles inside it. In some embodiments, a P-frame or P-picture may comprise intra and predicted tiles. In some embodiments, encoding data 101 may comprise an I slice followed by P slices, e.g., frame 128 may be an I slice, frame 130 may be a B slice, frame 132 may be a B slice, and frame 134 may be a P slice, and such slices may follow the tiles in the source streams. Within each of such slices, a combination of I-, B-, and P-tiles may be included. In some embodiments, frames 130 and 132 may be B slices, and frame 106 may be a P slice.

In some embodiments, the encoding application may leverage the fact that, since a B-picture tile cannot be upgraded (e.g., when requesting a higher video quality and/or higher resolution version of a frame) using the residual data and transition into the regular stream, the upgrades occur using an I-tile or P-tile. Thus, as shown in FIG. 1, no residual data is encoded for B-tiles, e.g., B-frames 130, 132, 136, and 138 of the 8K SHVC regular encoding data of quality 1 of version 114 are not provided with corresponding residual data, whereas residual data 142, 144, and 146 is provided for I-frame 128, P-frame 134, and P-frame 140 of 8K regular encoding data of quality 1. As another example, for each block intra encoded tile stream corresponding to the lowest quality for each resolution, e.g., I-frames 162, 164, 166, 168, and 170, I-frames or I-pictures are created (e.g., at I-frames 162, 166, and 170) at each position that corresponds to an I-frame or P-frame of 8K regular encoding data of quality n, and for B-tiles, I-frames may only be created (e.g., at 164 and 170) for a B-tile (e.g., B-tile 152 and B-tile 158) that immediately precedes a P-tile (e.g., 154 and 160), whereas no I-frames are created for B-tiles 150 and 156 that do not precede a P-tile. Thus, when, e.g., foveated rendering is employed, a picture can be created, right after a viewport change, of all block intra-tiles at a time slot with all B-picture tiles, and the next frame to render in the next time slot can include P- and R-tiles to perform the upgrade in qualities for each of the resolution tiles. In some embodiments, if a next frame to render is a B-frame of a GOP, an upgrade or downgrade may be performed with intra-tiles in the companion stream to the GOP.

Version 118 of FIG. 1 may be implemented in a similar manner to version 114, except version 118 may provide content in a 4K resolution instead of an 8K resolution. Version 120 may be implemented in a similar manner to version 116, except version 120 may provide content in a 4K resolution instead of an 8K resolution. Version 122 of FIG. 1 may be implemented in a similar manner to versions 114 and 118, except version 122 may provide content in a 2K resolution instead of an 8K or 4K resolution. Version 124 may be implemented in a similar manner to versions 116 and 120, except version 124 may provide content in a 2K resolution instead of an 8K or 4K resolution.

Figure 2:
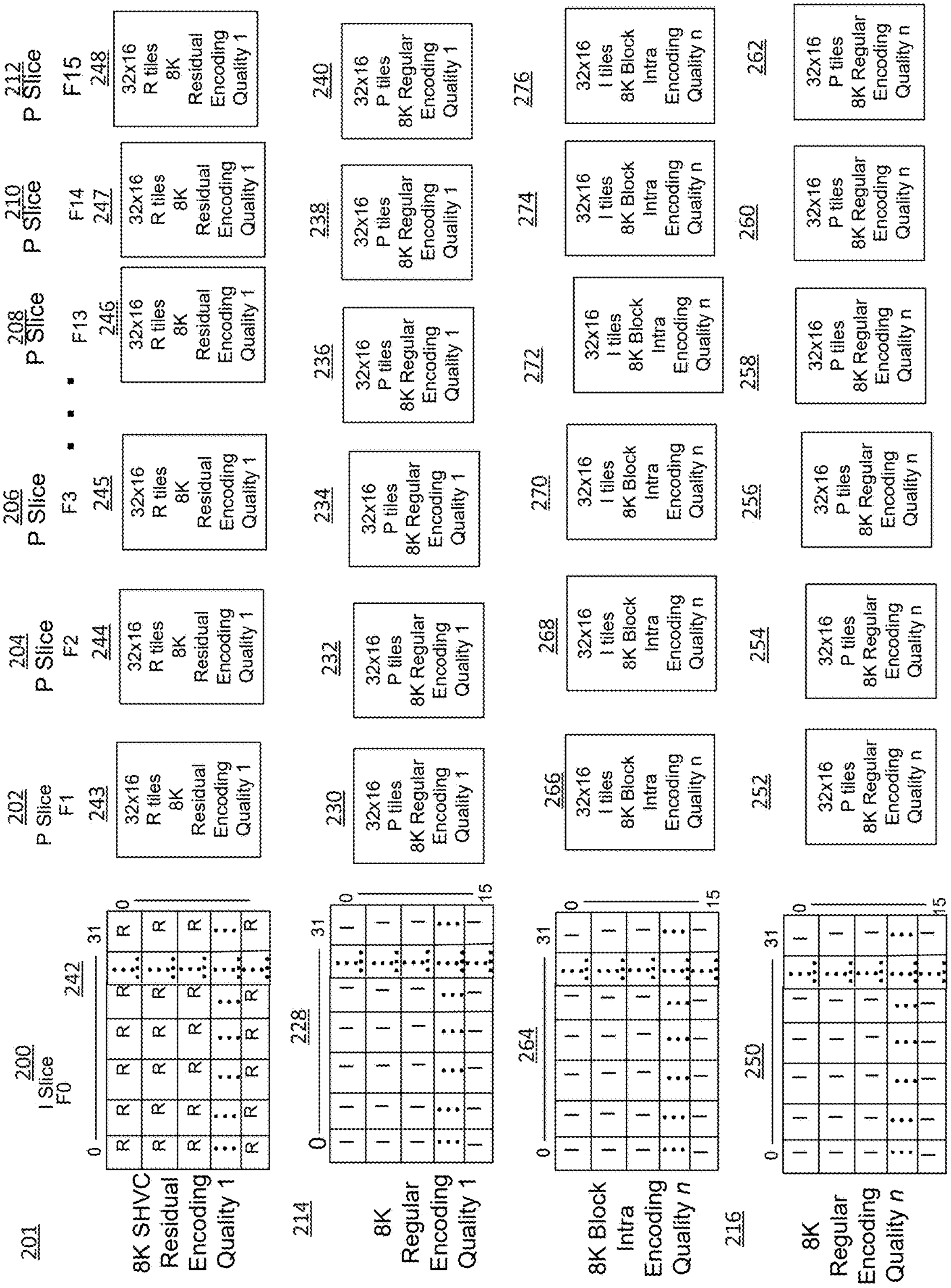
FIG. 2 shows illustrative encoding data for portions of a spherical media content item, in accordance with some embodiments of this disclosure.
Figure 2:
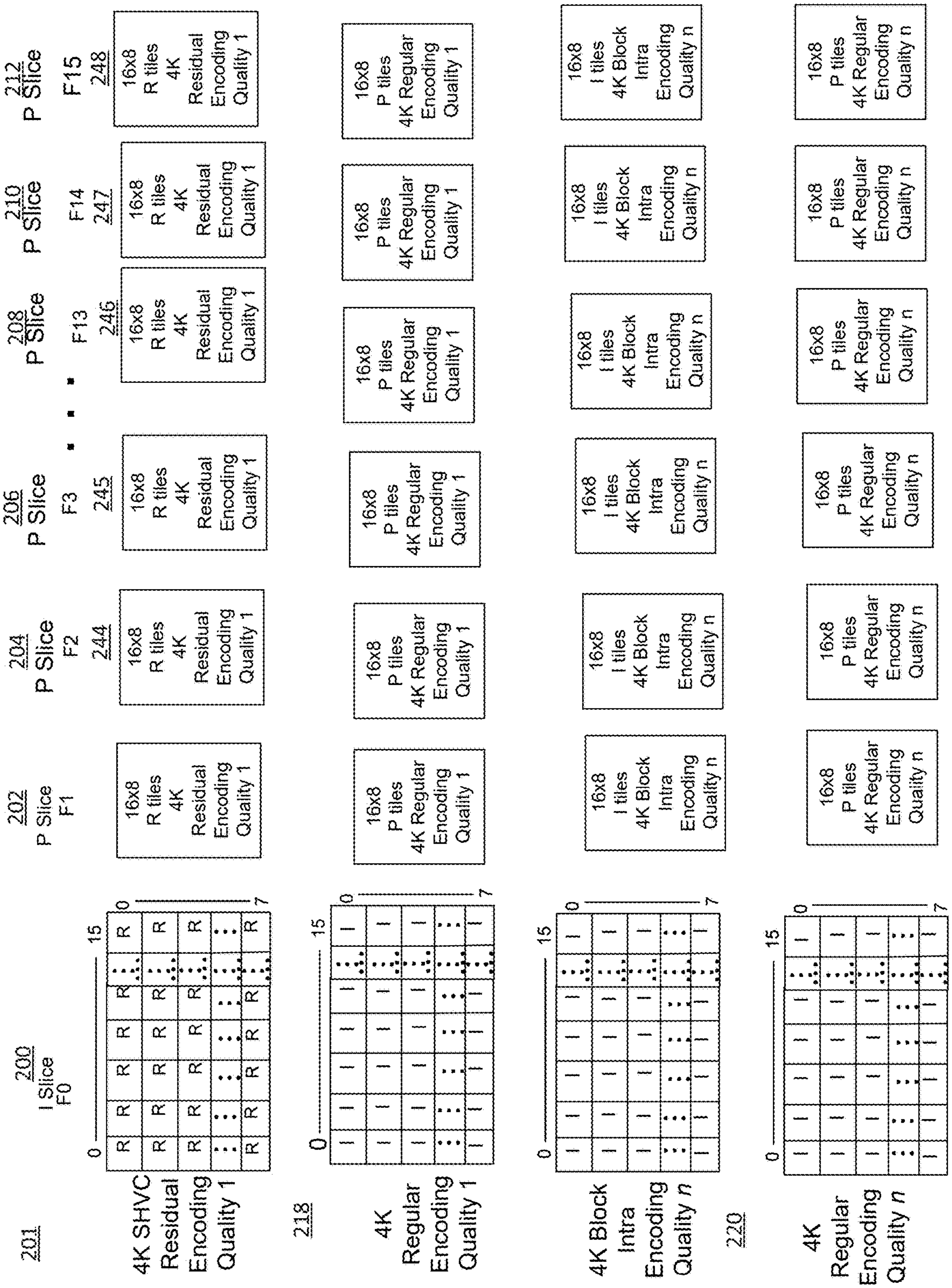
Figure 2:
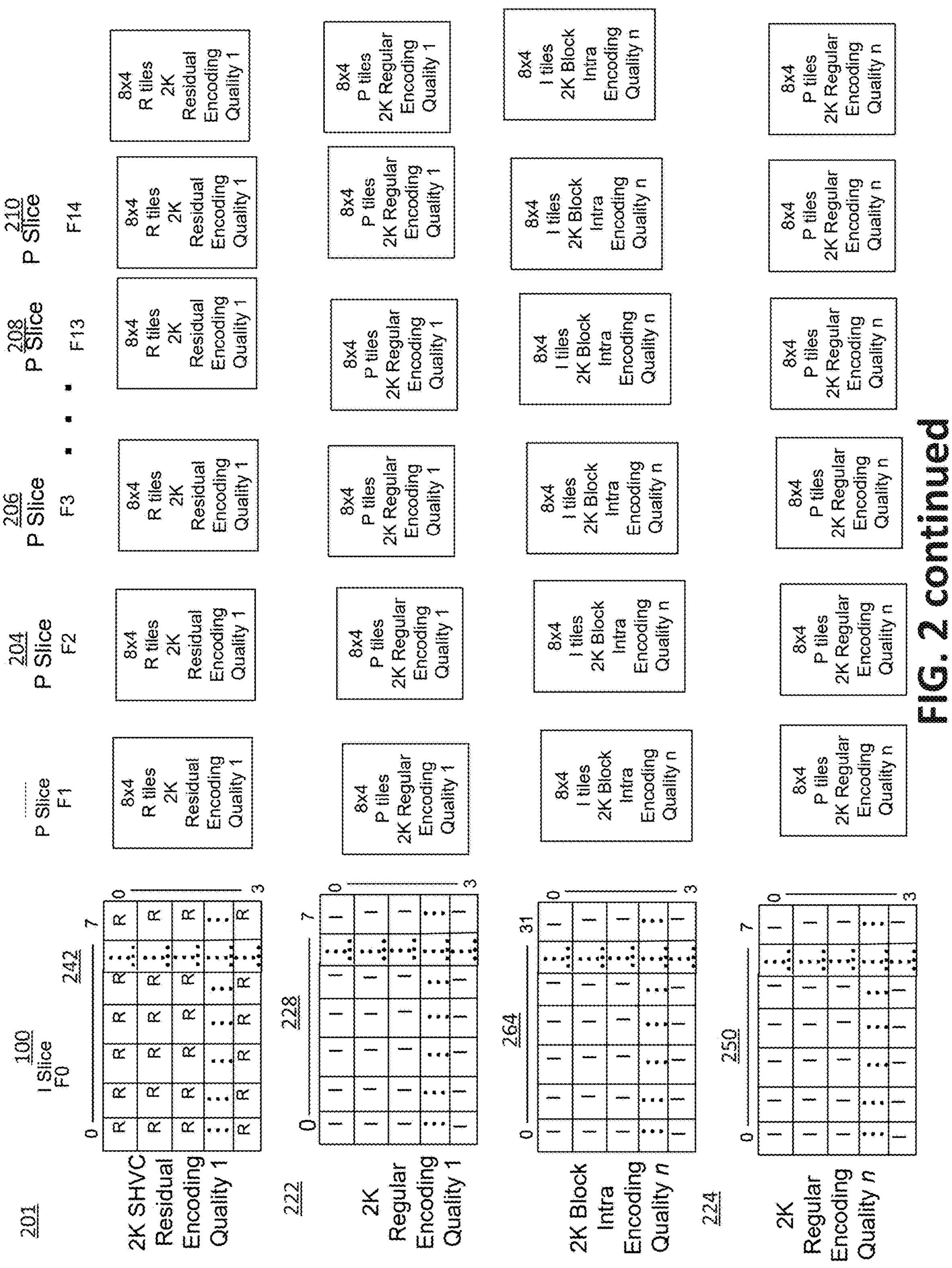

FIG. 2 shows illustrative encoding data 201 for portions of a spherical media content item, in accordance with some embodiments of this disclosure. For example, encoding data 201 may be arranged in an intra- and predictive-tile (IP) GOP structure with block intra encoding for lowest quality per resolution and a residual tile encoding for at least one higher quality per resolution. Residual encoding may be provided per tile. In some embodiments, for a particular resolution, all quality versions other than the lowest quality version may be provided with residual data.

FIG. 2 shows encoding data 201 for a plurality of frames 200, 202, 204, 206, . . . , 208, 210, and 212 of a spherical media content item. Each frame may be available in a plurality of versions 214, 216, 218, 220, 222, and 224 coded in one of a plurality of resolutions (e.g., 8 k, 4K, 2K, and/or any other suitable set of resolutions) and in one of a plurality of video qualities (e.g., quality 1 in FIG. 2 being the highest, or relatively higher, of the video qualities, and quality n being the lowest of the video qualities). In some embodiments, the versions or renditions of the frames or segments or any other suitable portion of the spherical media content item may be indicated in a manifest, and requested by a client device, e.g., an extended reality (XR) device, from one or more servers (e.g., an edge server or an origin server of a content delivery network (CDN) and/or any other suitable server).

Version 214 may be encoded as 8K residual (R) encoding data of quality 1 (e.g., the highest quality amongst the 8K resolution versions for the spherical content item) and an 8K regular encoding data of quality 1. Such 8K regular encoding data of quality 1 of version 214 may comprise an IP GOP of I-frame 228 corresponding to frame 200; P-frame 230 corresponding to frame 202; P-frame 232 corresponding to frame 204; P-frame 234 corresponding to frame 206; P-frame 236 corresponding to frame 208; P-frame 238 corresponding to frame 210; and P-frame 240 corresponding to frame 212. As shown in FIG. 2, the 8K residual encoding data of quality 1 of version 214 may comprise residual data 242 for I-frame 228, residual data 243 for P-frame 230, residual data 244 for P-frame 232, residual data 245 for P-frame 234, residual data 246 for P-frame 236, residual data 247 for P-frame 238, and residual data 248 for P-frame 240. In some embodiments, residual data 242, residual data 243, residual data 244, residual data 245, residual data 246, residual data 247, and residual data 248 may be considered companion streams for I-frame 228, P-frame 230, P-frame 232, P-frame 234, P-frame 236, P-frame 238, and P-frame 240, respectively.

Version 216 may be encoded as 8K block intra encoding data of quality n (e.g., the lowest quality amongst the 8K resolution versions for the spherical content item) and an 8K regular encoding data of quality n. Such 8K regular encoding data of quality n of version 216 may comprise I-frame 250, P-frame 252, P-frame 254, P-frame 256, P-frame 258, P-frame 260, and P-frame 262. The 8K block intra encoding data of quality n may comprise I-frame 264, I-frame 266, I-frame 268, I-frame 270, I-frame 272, I-frame 274, and I-frame 276. In some embodiments, I-frames 264, 266, 268, 270, 272, 274, and 276 may be considered companion streams for I-frame 250, P-frame 252, P-frame 254, P-frame 256, P-frame 258, P-frame 260, and P-frame 262, respectively.

In some embodiments, for each resolution (e.g., 8K associated with versions 214 and 216; 4K associated with versions 218 and 220; and 2K associated with versions 222 and 224), the lowest quality (quality n) may have two encodings that are 1 block intra encoding with an IP GOP structure with all intra-tiles for every frame (e.g., the 8K block intra encoding data of quality n of version 216) and a regular encoding with an IP GOP structure with P-tiles (e.g., 8K regular encoding of quality n of version 216). In some embodiments, for all other qualities within a resolution, the encoding application may provide a regular encoding for a quality and resolution (e.g., 8K regular encoding of quality 1 of version 214) and a residual SHVC encoding (e.g., 8K SVC residual encoding of quality 1 of version 214) for providing the upgrade or downgrade for tiles selected from that resolution and quality. For example, upon detecting a change in a user's gaze and/or a change in network conditions, an upgrade or downgrade with respect to a current version of a frame being provided may be performed, which may include using intra-tiles from block intra encoding to affect the upgrade or downgrade, and, from that block intra, the next tile that is provided and decoded is a P-tile of the regular encoding. In some embodiments, the encoding application may perform upgrades or downgrades within a particular resolution, or to a different resolution than a current resolution.

Version 218 of FIG. 2 may be implemented in a similar manner to version 214, except version 218 may provide content in a 4K resolution instead of an 8K resolution. Version 220 may be implemented in a similar manner to version 216, except version 220 may provide content in a 4K resolution instead of an 8K resolution. Version 222 of FIG. 1 may be implemented in a similar manner to versions 214 and 218, except version 222 may provide content in a 2K resolution instead of an 8K or 4K resolution. Version 224 may be implemented in a similar manner to versions 216 and 220, except version 224 may provide content in a 2K resolution instead of an 8K or 4K resolution.

Figure 3:
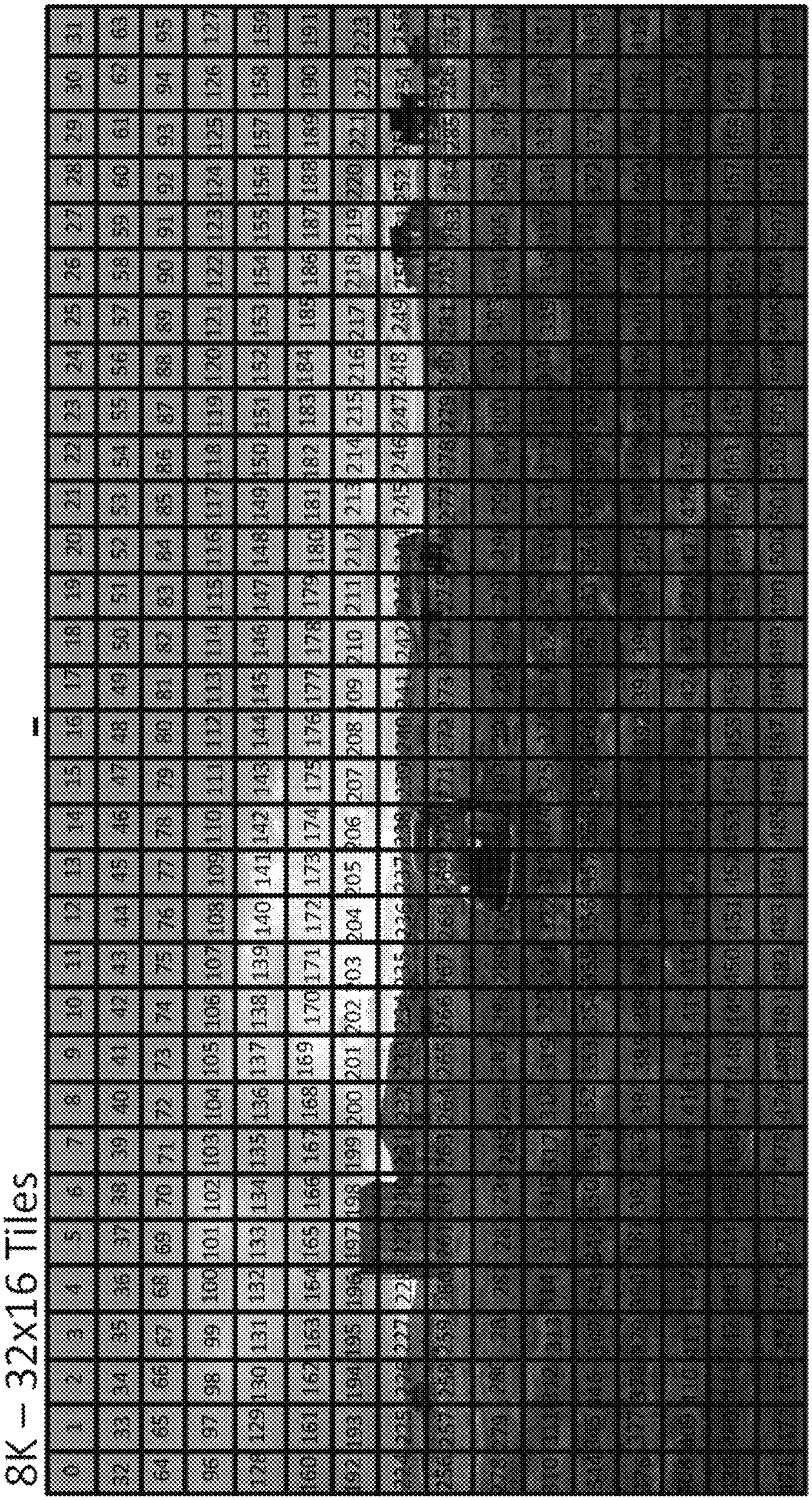
FIG. 3 is an example of encoded tiles of spherical media content in various resolutions, in accordance with some embodiments of this disclosure.
Figure 3:
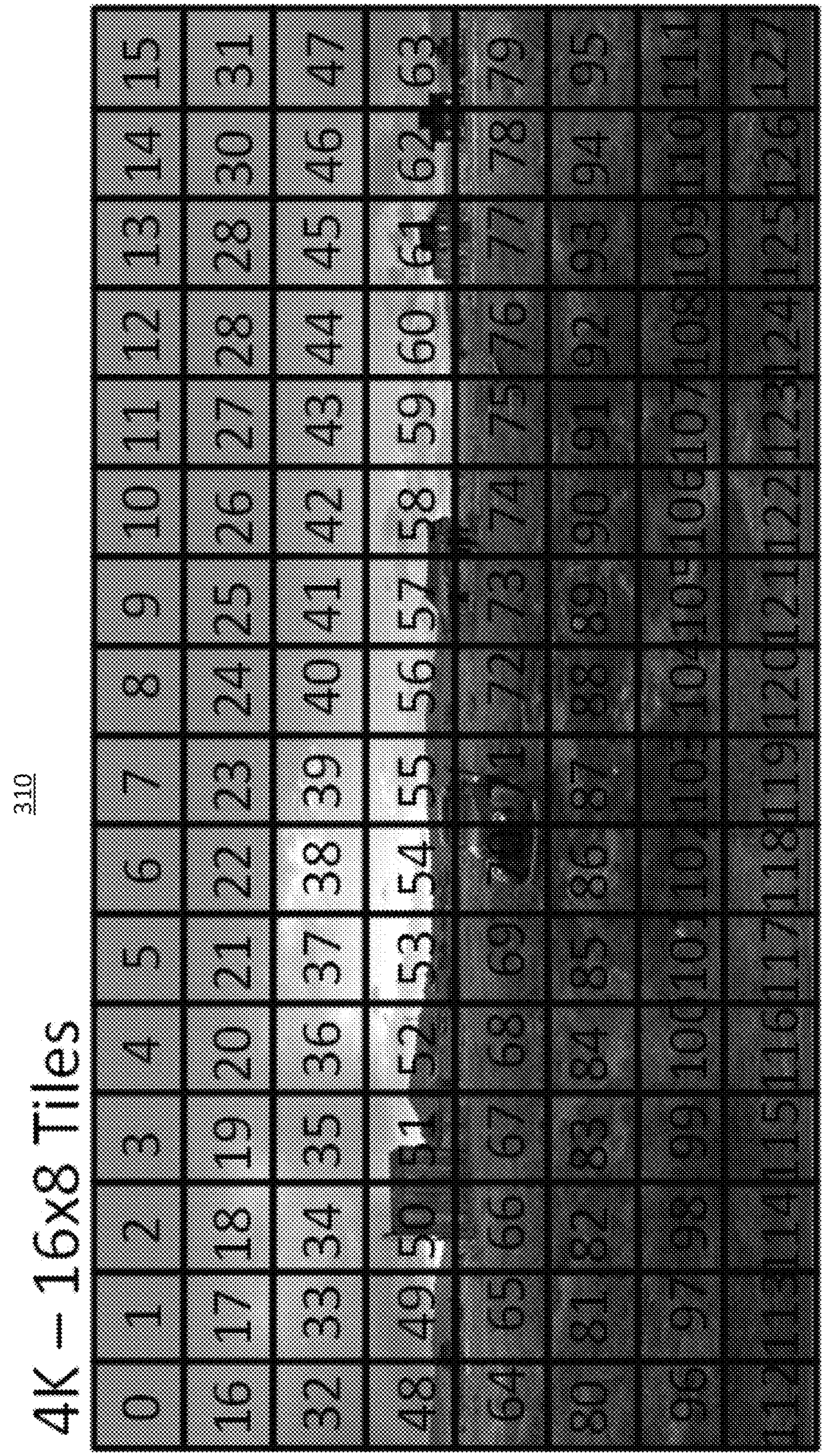
Figure 3:
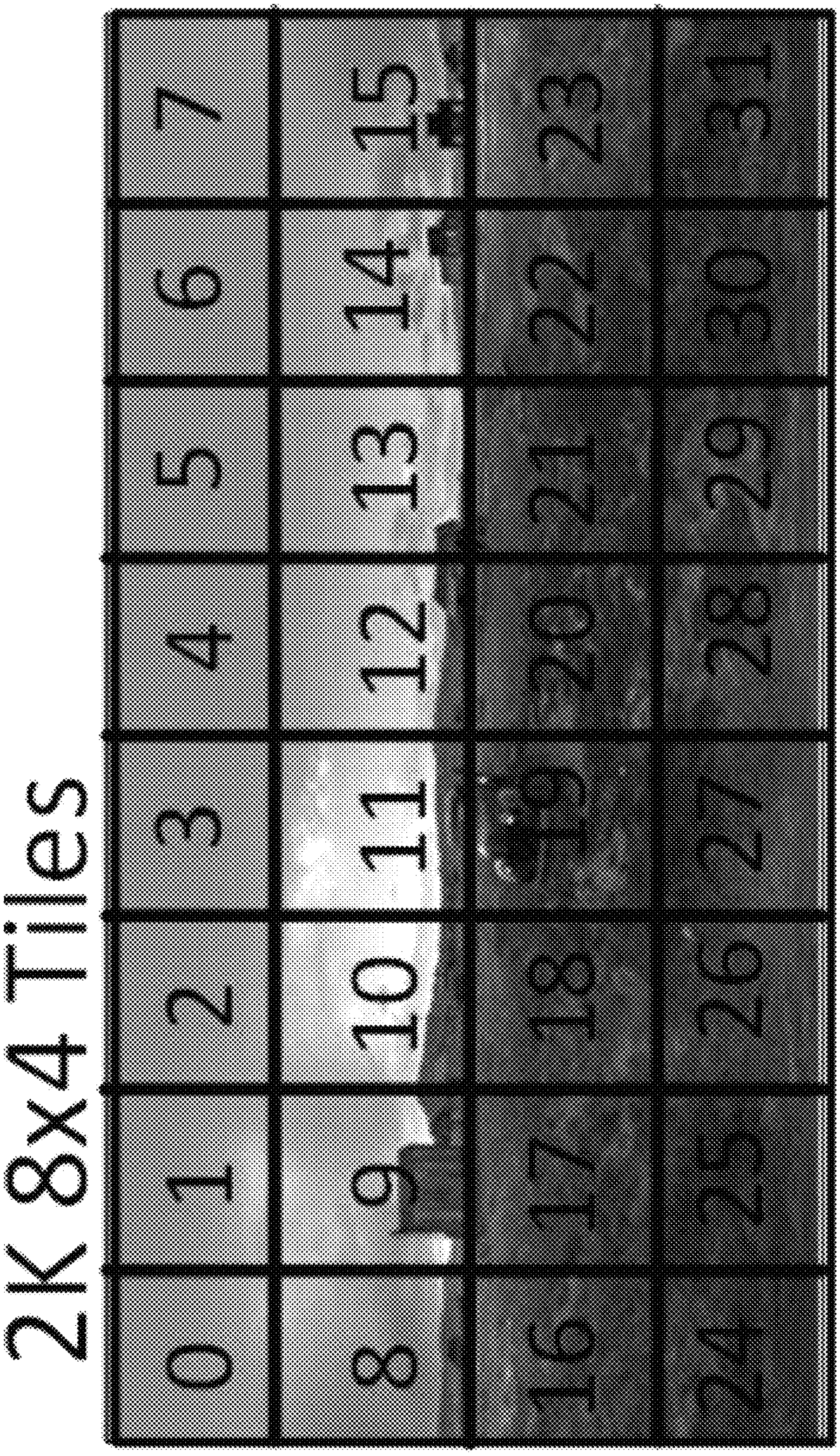

FIG. 3 is an example of encoded tiles of spherical media content in various resolutions (e.g., 8K, 4K, and 2K), in accordance with some embodiments of this disclosure. As shown at example 300 of tiled encoding, the 8K resolution version of a frame of a spherical content item comprises 32 columns and 16 rows for a total of 512 potential tiles. As shown at example 310 of tiled encoding, the 4K resolution version of a frame of a spherical content item comprises 16 columns and 8 rows for a total of 128 potential tiles. As shown at example 310 of tiled encoding, the 2K resolution version of a frame of a spherical content item comprises 8 columns and 4 rows for a total of 32 potential tiles. Such examples 300, 310, and 320 are examples of how these tiles may be encoded for foveated rendering on a 360-degree viewing device. In some embodiments, the encoding application utilizes an equirectangular projection map in examples 300, 310, and 320.

Figure 4:
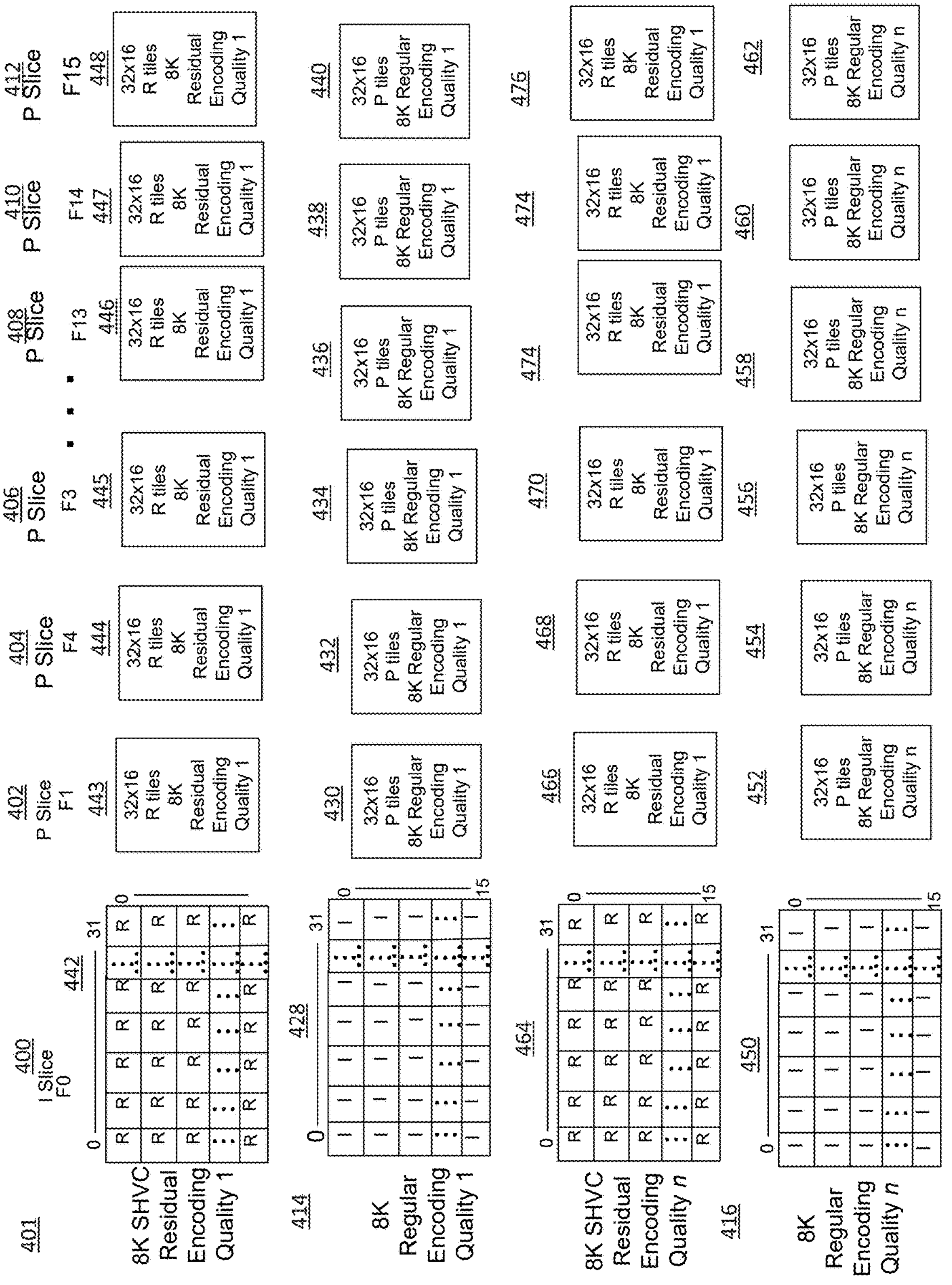
FIG. 4 shows illustrative encoding data for portions of a spherical media content item, in accordance with some embodiments of this disclosure.
Figure 4:
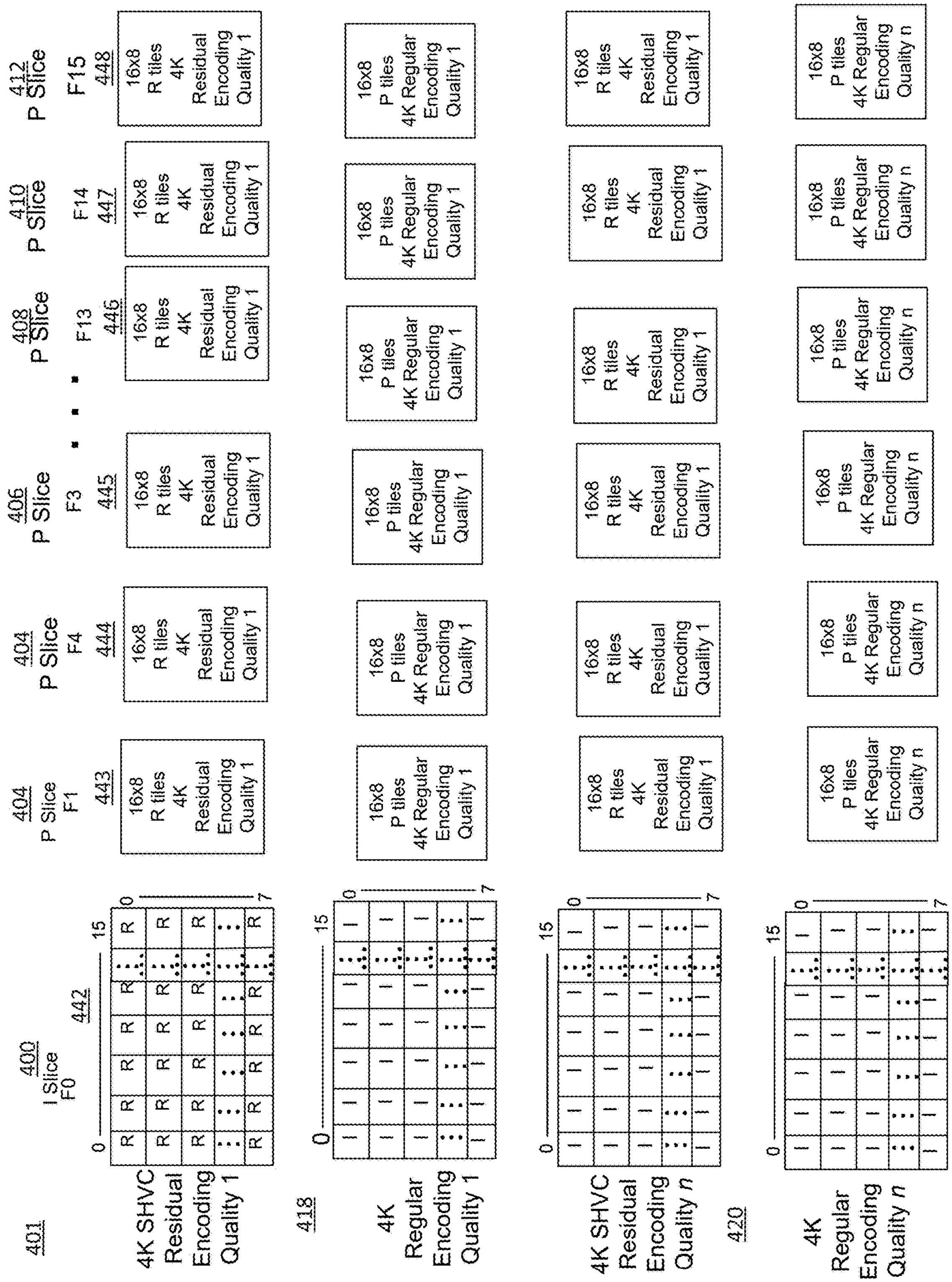
Figure 4:
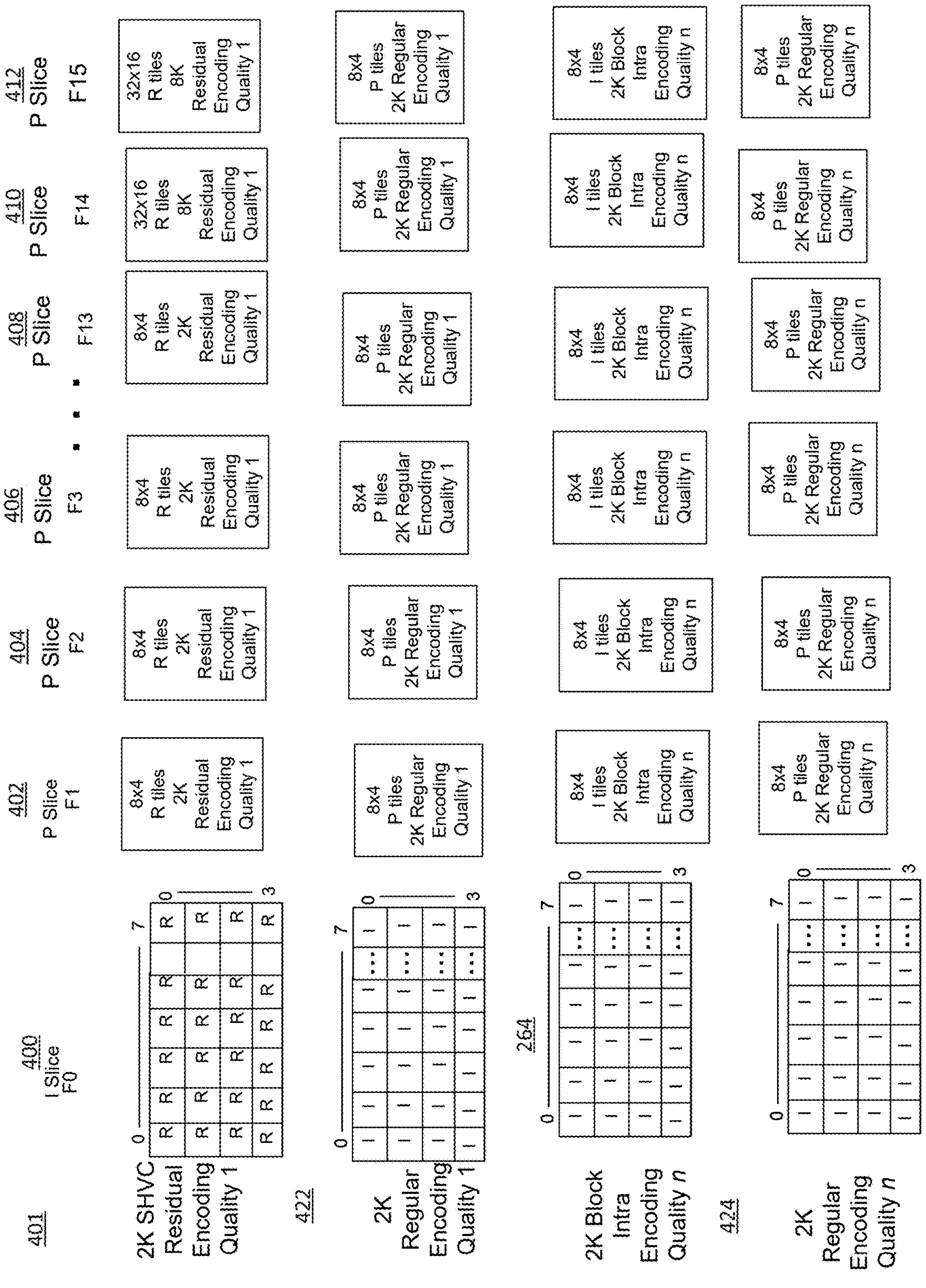

FIG. 4 shows illustrative encoding data 401 for portions of a spherical media content item, in accordance with some embodiments of this disclosure. For example, encoding data 401 may be arranged in an IP GOP structure with residual tile encoding for 360-degree foveated rendering. Residual encoding may be provided per tile.

FIG. 4 shows encoding data 401 for a plurality of frames 400, 402, 404, 406, . . . , 408, 410, and 412 of a spherical media content item. Each frame may be available in a plurality of versions 414, 416, 418, 420, 422, and 424 coded in one of a plurality of resolutions (e.g., 8K, 4 k, 2K, and/or any other suitable set of resolutions) and in one of a plurality of video qualities (e.g., quality 1 in FIG. 4 being the highest, or relatively higher, of the video qualities, and quality n being the lowest of the video qualities). In some embodiments, the versions or renditions of the frames or segments or any other suitable portion of the spherical media content item may be indicated in a manifest, and requested by a client device, e.g., an extended reality (XR) device, from one or more servers (e.g., an edge server or an origin server of a content delivery network (CDN) and/or any other suitable server).

Version 414 may be encoded as 8K residual (R) encoding data of quality 1 (e.g., the highest quality amongst the 8K resolution versions for the spherical content item) and an 8K regular encoding data of quality 1. Such 8K regular encoding data of quality 1 of version 414 may comprise an IP GOP of I-frame 428 corresponding to frame 400; P-frame 430 corresponding to frame 402; P-frame 432 corresponding to frame 404; P-frame 434 corresponding to frame 406; P-frame 436 corresponding to frame 408; P-frame 438 corresponding to frame 410; and P-frame 440 corresponding to frame 412. As shown in FIG. 4, the 8K residual encoding data of quality 1 of version 414 may comprise residual data 442 for I-frame 428, residual data 443 for P-frame 430, residual data 444 for P-frame 432, residual data 445 for P-frame 434, residual data 446 for P-frame 436, residual data 447 for P-frame 438, and residual data 448 for P-frame 440. In some embodiments, residual data 442, residual data 443, residual data 444, residual data 445, residual data 446, residual data 447, and residual data 448 may be considered companion streams for I-frame 428, P-frame 430, P-frame 432, P-frame 434, P-frame 436, P-frame 438, and P-frame 440, respectively.

Version 416 may be encoded as 8K residual (R) encoding data of quality n (e.g., the lowest quality amongst the 8K resolution versions for the spherical content item) and an 8K regular encoding data of quality n. Such 8K regular encoding data of quality n of version 416 may comprise an IP GOP of I-frame 450 corresponding to frame 400; P-frame 452 corresponding to frame 402; P-frame 454 corresponding to frame 404; P-frame 456 corresponding to frame 406; P-frame 458 corresponding to frame 408; P-frame 460 corresponding to frame 410; and P-frame 462 corresponding to frame 412. As shown in FIG. 4, the 8K residual encoding data of quality n of version 416 may comprise residual data 464 for I-frame 450, residual data 466 for P-frame 452, residual data 468 for P-frame 454, residual data 470 for P-frame 456, residual data 472 for P-frame 458, residual data 474 for P-frame 460, and residual data 476 for P-frame 462. In some embodiments, residual data 464, residual data 466, residual data 468, residual data 470, residual data 472, residual data 474, and residual data 476 may be considered companion streams for I-frame 450, P-frame 452, P-frame 454, P-frame 456, P-frame 458, P-frame 460, and P-frame 462, respectively.

Version 418 of FIG. 4 may be implemented in a similar manner to version 414, except version 418 may provide content in a 4K resolution instead of an 8K resolution. Version 420 may be implemented in a similar manner to version 416, except version 420 may provide content in a 4K resolution instead of an 8K resolution. Version 422 of FIG. 1 may be implemented in a similar manner to versions 414 and 418, except version 422 may provide content in a 2K resolution instead of an 8K or 4K resolution.

As shown in versions 414, 416, 418, 420, and 422, each of the higher qualities within the same resolution includes the regular tile encodings for that quality along with the residual encoding for upgrading or downgrading the tiles by combining those residual encoded tile layer. For all other qualities, there is a regular encoding for a quality and resolution and a residual encoding for providing the upgrade or downgrade for tiles selected from that resolution and quality. When moving to a higher resolution, like 4K, there may be four tiles which cover one tile at the 2K resolution. In some embodiments, any frame can be upgraded in the case of an IP GOP structure, therefore, a residual encoding may be provided for all the tiles. In some embodiments, as shown in version 424 of FIG. 4, the lowest quality, quality n, for the lowest resolution (e.g., 2K) has two encodings comprising a block intra encoding with an IP GOP structure with all intra-tiles for every frame and a regular encoding with an IP GOP structure with P-tiles. In some embodiments, post-processing may be performed in the example of FIG. 4, to account for differences in a number of tiles when a resolution is upgraded or downgraded.

Figure 5:
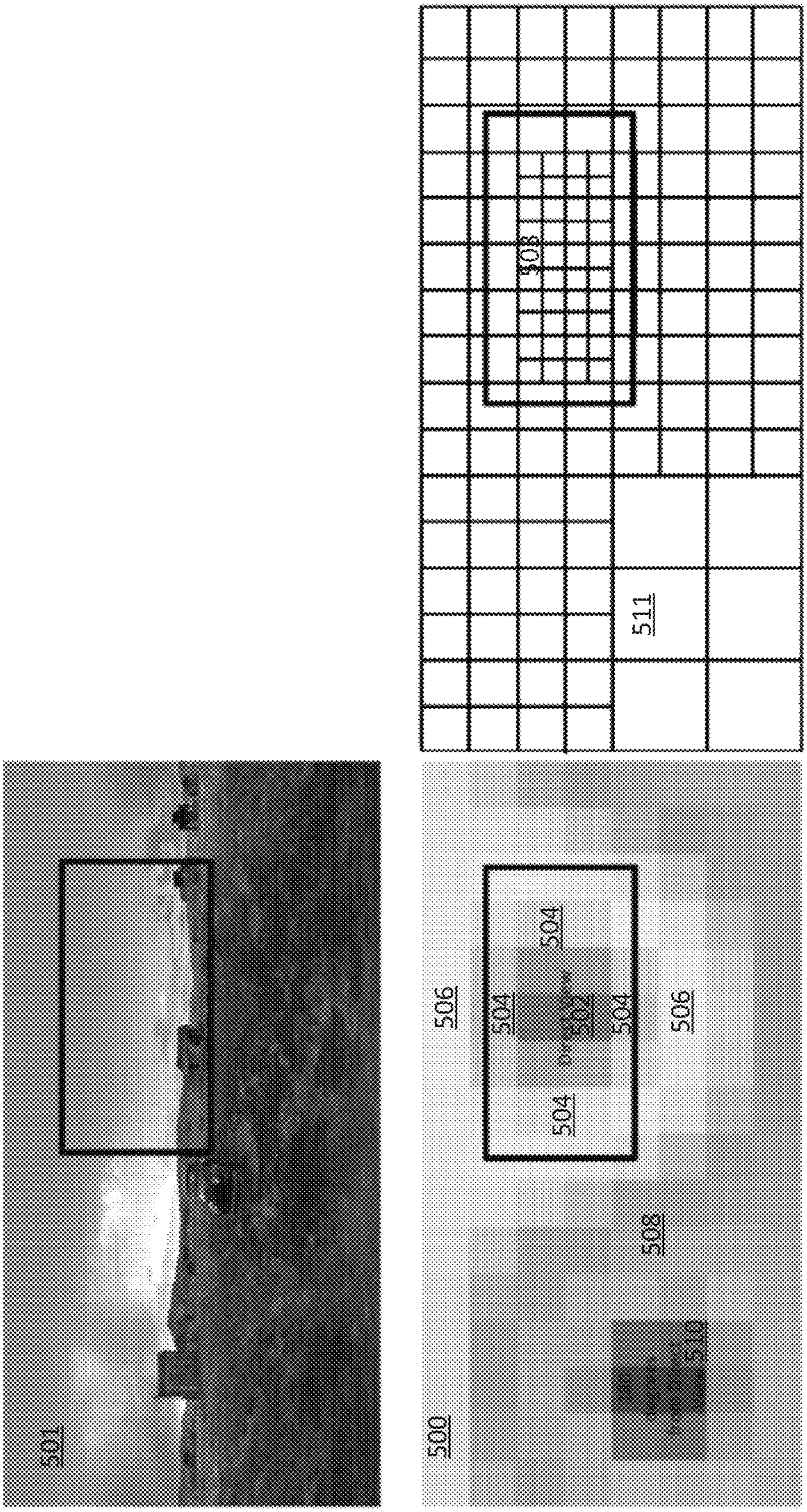
FIG. 5 shows an illustrative heat map for a viewport of an XR device, in accordance with some embodiments of this disclosure.

FIG. 5 shows an illustrative heat map for a viewport of an XR device, in accordance with some embodiments of this disclosure. Heat map 500 may be for a viewport associated with an equirectangular 360-degree projection along with various resolution tiles selected based on the viewport position. Heat map 500 may comprise a plurality of regions 502, 504, 506, 508, and 510. Direct view region 502 may be in the FOV of a user wearing or otherwise using or operating an XR device that may be providing a spherical media content item 501. Region 502 may correspond to an ROI in a viewport associated with the computing device being worn by or otherwise interacted with by the user. Regions moving out of the direct field of view may correspond to 504. In some embodiments, the encoding application may provide tiles in progressively lower quality as distance from direct view region 502 increases. For example, quality may continue to decrease from region 504 to 506, and from 506 to 508, and from 508 to 510. Region 510 is associated with the lowest quality tiles, and region 510 is 180 degrees from where the user is looking (direct view region 502). Heat map 500 demonstrates a distribution of the quality of the tiles across the 360-degree space in relation to where the user is looking.

Depending on the implementation, the client device and/or a server may decide which tiles to select for transport to the client device. Tile selection may be based on a current FOV and/or bandwidth. In some embodiments, the residual tiles may be accounted for in the bandwidth calculation for the picture. Tiles may be selected from an encoding and for decoding and rendering, e.g., after a viewport change. In some embodiments, heat map 500 may be leveraged as part of tile selection. In some embodiments, the direct view region 502 is the center of the XR device (e.g., a headset). In some embodiments, if the headset includes eye tracking, the heat map 500 may change inside the headset based on eye movement alone and no change in head pose. As shown at 503 of FIG. 5, for direct view region 502, as compared to the other regions of heat map 500, the largest number of tiles may be requested and/or provided to the client device for direct view region 502, to facilitate a higher resolution for a region a user is focused on. On the other hand, as shown at 511 of FIG. 5, for region 510, as compared to the other regions of heat map 500, the fewest number of tiles may be requested and/or provided to the client device for region 510, to facilitate a lower resolution for a region a user is not focused on.

Figure 6:
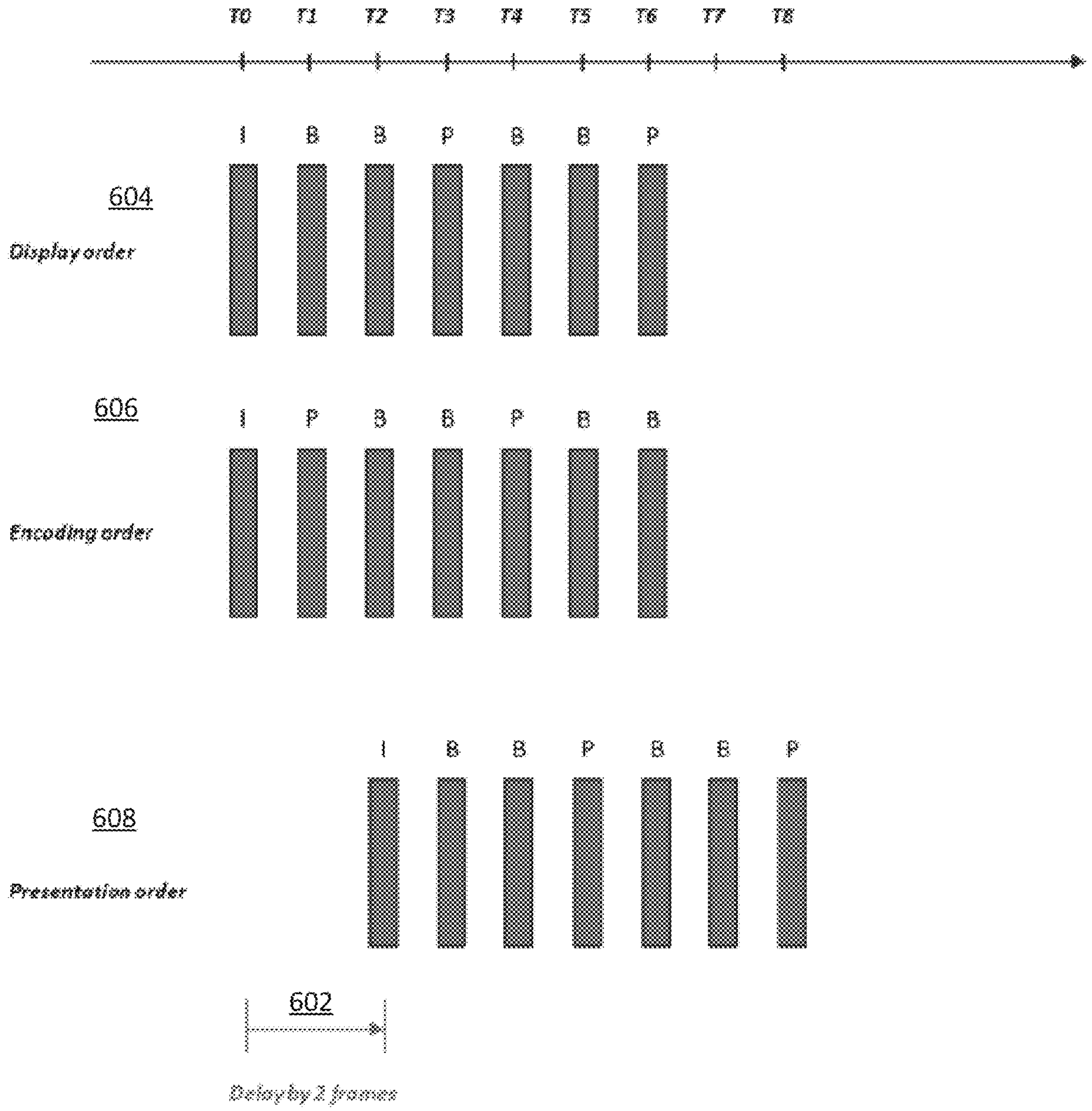
FIG. 6 shows an example of a display order and an encoding/decoding order that may lead to a delay at the start of presenting decoded pictures, in accordance with some embodiments of this disclosure.

FIG. 6 shows an example of a display order and an encoding/decoding order that may lead to a delay at the start of presenting decoded pictures, in accordance with some embodiments of this disclosure. As shown at 602, there may be a delay (e.g., by two frames) at the start of displaying the video, e.g., a spherical media content item, prior to presentation of the video according to presentation order 608. Such delay may be a concern in the case of live encoding for interactive streaming, e.g., video conferencing, where B-frames are not in use.

In some embodiments, the encoding application may utilize B-frames in the compression, which may lead to coding efficiency and reduced bitrate or file size. Picture reordering in FIG. 6 may be due to the use of B-frames in the encoding. For example, while B-frames are shown at time T1 and T2 of the display order, in the encoding order, such B-frames are shown at times T2 and T3, and the P-frame at time T3 of the display order is encoded at time T1 as shown in encoding order 606, prior to the B-frames. Similarly, while B-frames T4 and T5 are shown ahead of the P frame at time T6 in display order 604, such P-frame may be encoded prior to such B-frames, at time T4, as shown in encoding order 606.

Tiles may be treated similar to or the same as frames or picture. The examples of FIG. 6, 7, 8A-8C illustrate, at a higher level of a picture, what also may apply at the tile level. Such example may be applied to mixing and matching of tiles at a picture level, e.g., for a tile within a set of tiles for a sequence of pictures.

In the case of streaming pre-encoded video, the delay can be systematically compensated at the start, assuming that the remaining GOPs are open GOPs (e.g., P-frames or B-frames of a second GOP can use an I-frame in a first GOP for prediction purposes, as opposed to a closed GOP where frames from different GOPs are not able to be used for prediction purposes). In some embodiments, the use of open GOPs also provides improved coding efficiency in comparison with closed GOPs, at the cost of limited random access or segment-based decoding. In the 360-degree video streaming of pre-encoding content, this limit can be mitigated by using a companion stream (e.g., 702 of FIG. 7), which offers random access at a time of switch. As shown in FIG. 6, the display order 604 may not necessarily match the encoding order 606.

Figure 7:
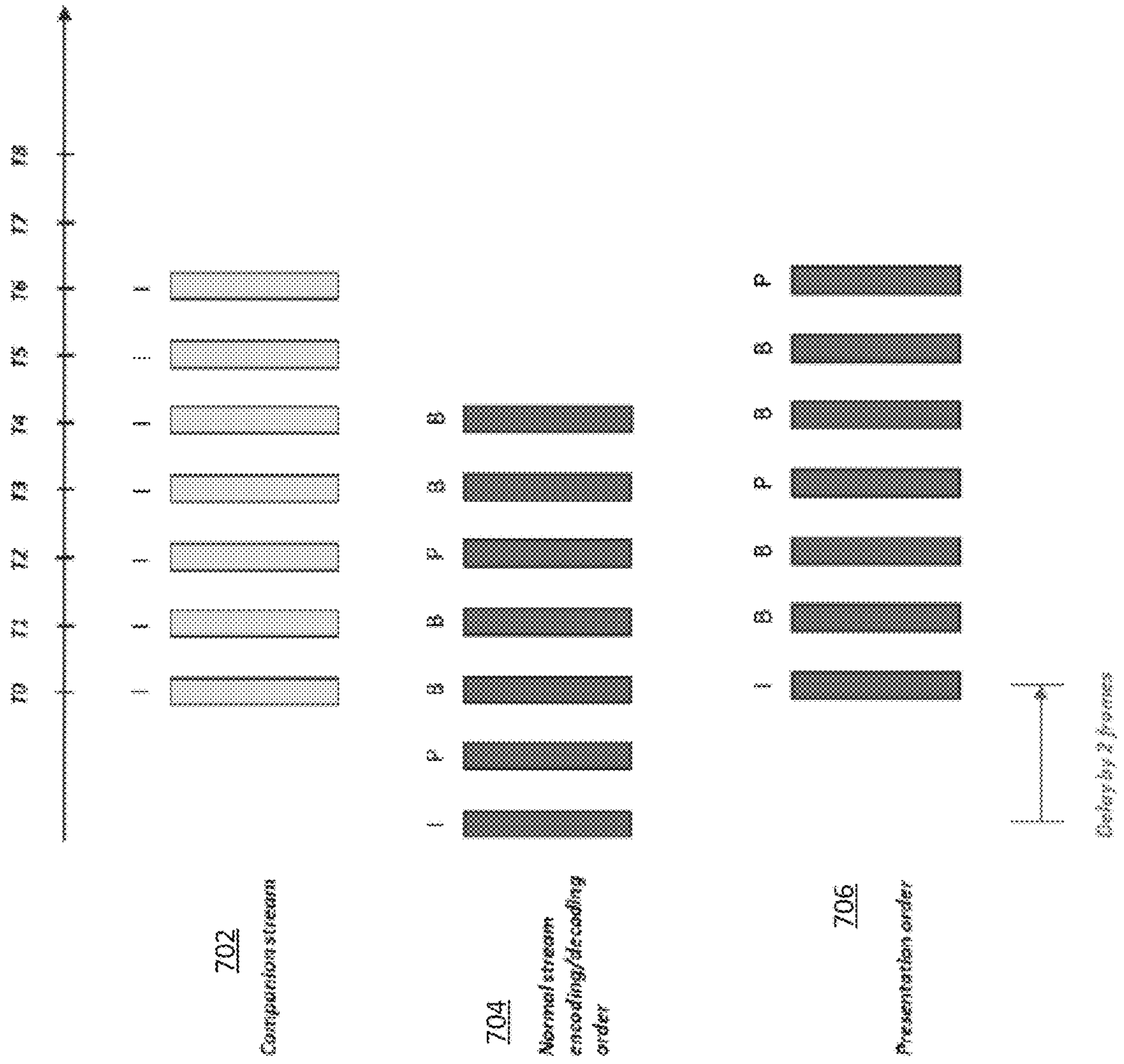
FIG. 7 shows an example of compensating the delay at the start of presenting decoded pictures, in accordance with some embodiments of this disclosure.

FIG. 7 shows an example of compensating the delay at the start of presenting decoded pictures, in accordance with some embodiments of this disclosure. In streaming pre-encoded content, the start of the session can leverage low latency, low bitrate, fast delivery and decoding of initial frames. The initial processing can help minimize the delay in starting the presentation of decoded pictures. Once started, the presentation of decoded pictures from normal stream 704 may proceed, assuming buffering the bitstream of at least two frames in advance. In a manner similar to that shown in FIG. 6, B-frames at T0, T1 and T3, T4 in normal stream 704 may be decoded after, but presented before, P-frames at T3 and T6 of presentation order 706.

Figure 8A:
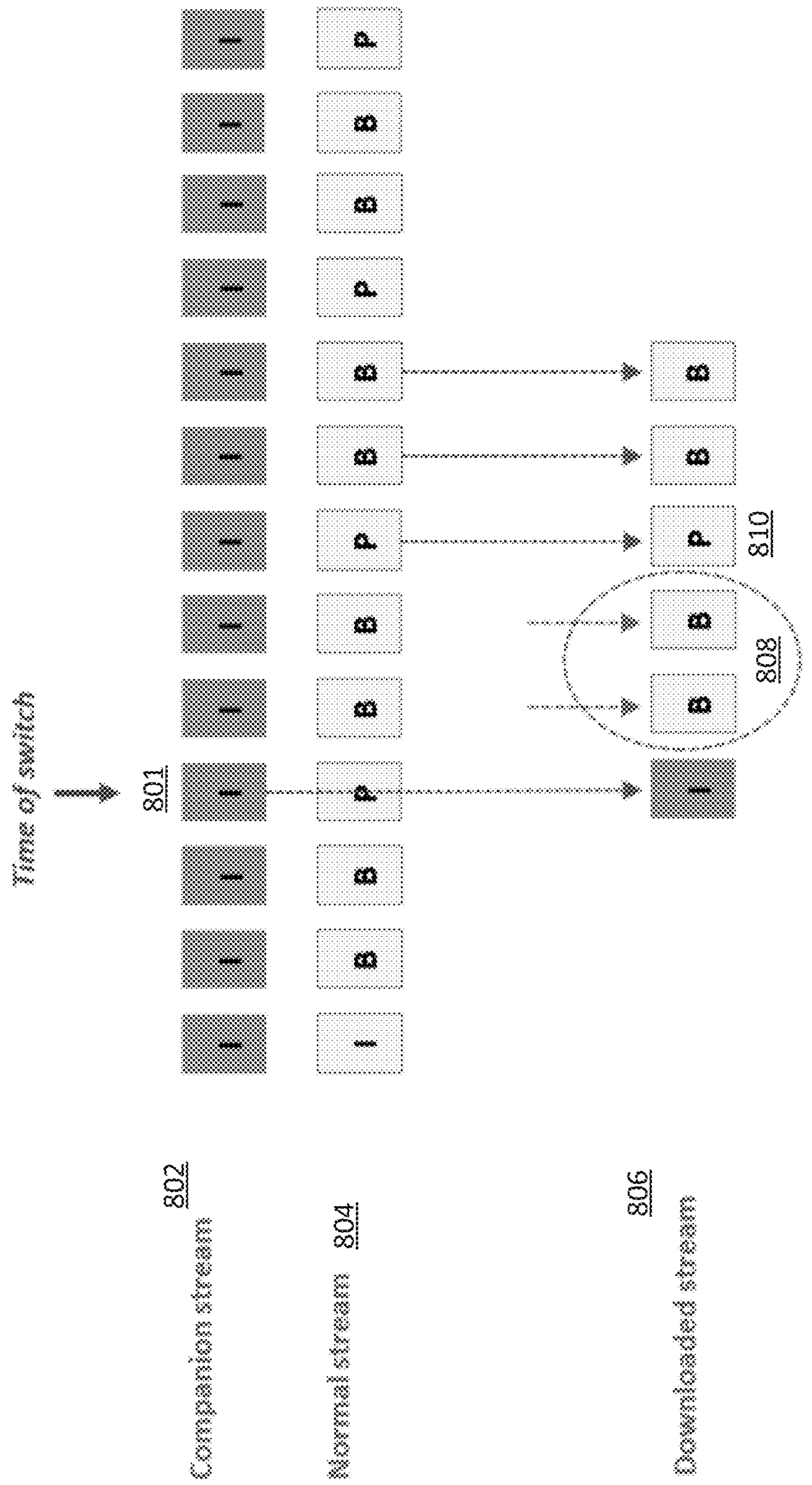
FIG. 8A shows an example of delivering a frame from a companion stream at a time of switch between versions of spherical media content, in accordance with some embodiments of this disclosure.

FIG. 8A shows an example of delivering a frame from a companion stream at a time of switch 801 between versions of spherical media content, in accordance with some embodiments of this disclosure. As shown in FIG. 8A, considering the picture reordering when B-frames are used to improve coding efficiency, the encoding application may cause an anchor frame (the I-frame at the time of switch 801) from the companion stream to be positioned such that decoding may be immediately initiated by the client device. The encoding application may ensure delivery of a frame from companion stream 802, which may be associated with either an I-frame or a P-frame in the normal stream 804. In other words, as shown at downloaded stream 806, the downloading of a frame from the companion stream, that is associated with a B-frame in normal stream 804, may be avoided.

At the time of switch 801, an I-frame from companion stream 802 may be delivered first. For example, the two B-frames from normal stream 804 right after the switch may not be useful in presentation at the client device, even if forced to be decoded, due to a missing reference frame (e.g., P-frame of normal stream 804 at the time of switch, which may be replaced with the I-frame from companion stream 802). P-frame 810 following the two B-frames indicated at 808 can be decoded, as it uses the I-frame as reference for inter-prediction. Therefore, the two B-frames (circled at 808 of downloaded stream 806) can be either removed from transmission (e.g., by a server) or ignored from decoding (e.g., by a client device). A forced decoding of the two B-frames might rely on, e.g., duplicating a (non-actual) reference frame, which usually creates notable artifacts. Note that pictures following the P-frame indicated at 810 can be decoded, since those have reference frames, similar to what has been used in encoding normal stream 804.

Figure 8B:
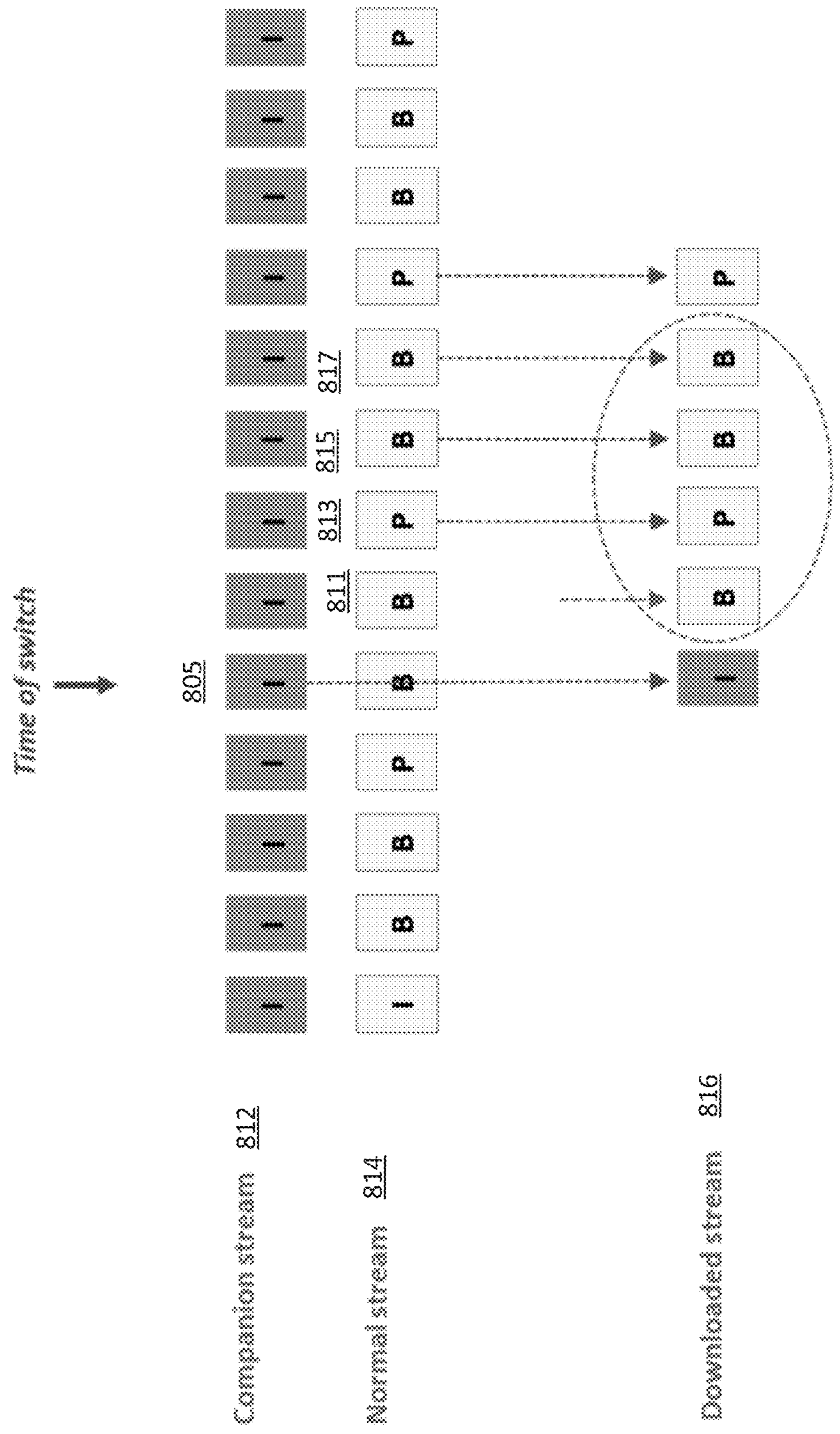
FIG. 8B shows an example illustration of an inappropriate frame from the companion stream at a time of switch between versions of spherical media content.

FIG. 8B shows an example illustration of an inappropriate frame from the companion stream at a time of switch between versions of spherical media content. If the I-frame of companion stream 812 starts being downloaded (as part of downloaded stream 816) at the time of switch 805, the next B-frame 811 of normal stream 814 may not be decodable, and the following P-frame 813 of normal stream 814 also may not be decodable (e.g., without the expected reference frame). Moreover, the two B-frames 815, 817 of normal stream 814 following the P-frame 813 in normal stream 814 may not be decodable either, due to missing appropriate reference frames. This may thus lead to significant drift issues even if forced decoding is enabled, and such drift issues may cause notable quality degradation until the next anchor frame from normal stream 814.

Figure 8C:
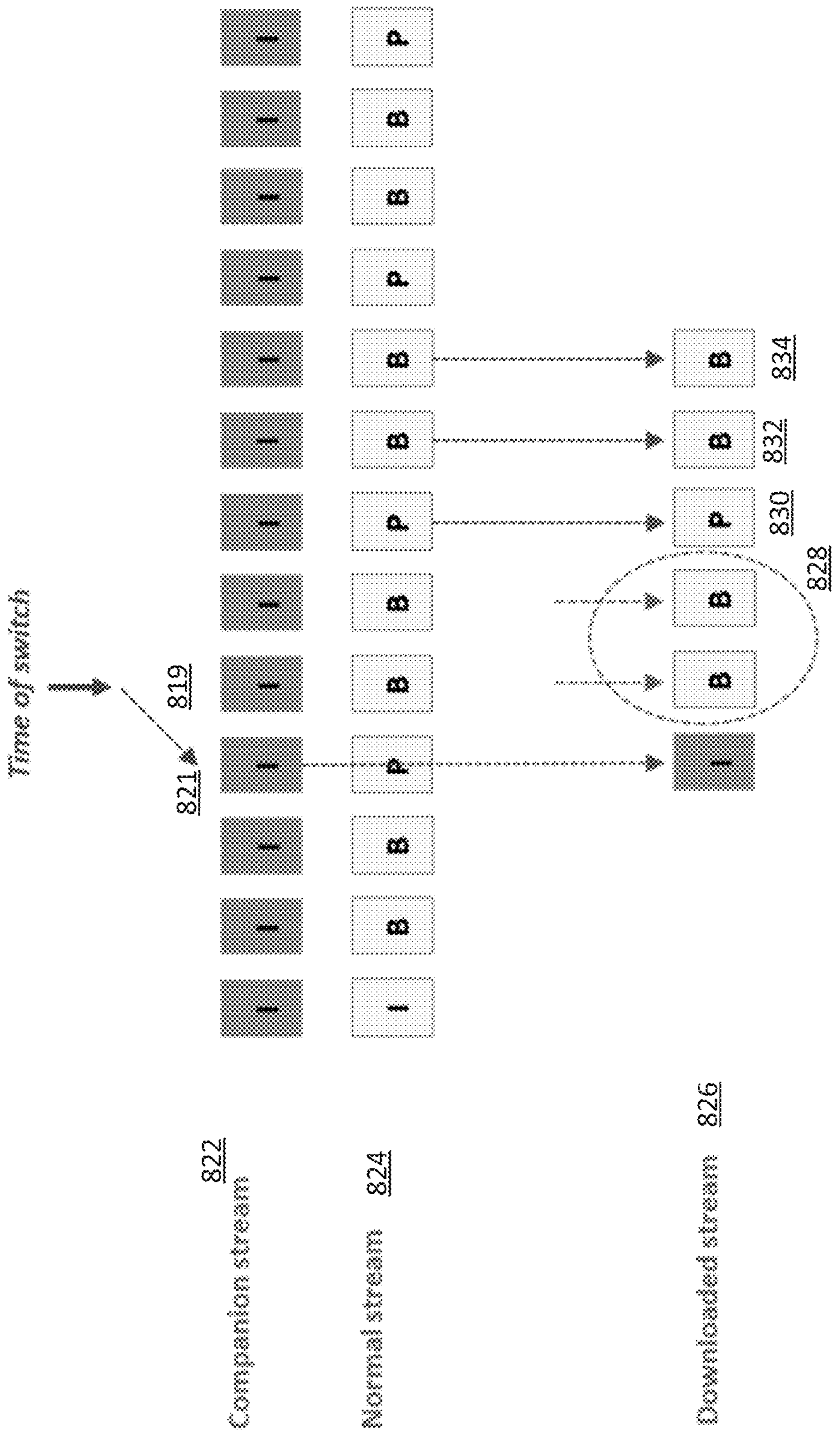
FIG. 8C shows an example of locating a frame from a companion stream at a time of switch between versions of spherical media content, in accordance with some embodiments of this disclosure.

FIG. 8C shows an example of locating a frame from a companion stream at a time of switch between versions of spherical media content, in accordance with some embodiments of this disclosure. If the time of switch occurs at 819 as shown in FIG. 8C, the encoding application can locate the frame, at 821, (preceding the time of switch) from companion stream 822, which observes an I-frame or a P-frame in normal stream 824, to ensure that the anchor from companion stream 822 corresponds to a reference frame used in its encoding. In comparison with FIG. 8B, the P-frames and B-frames 830, 832, and 834 following the circled B-frames 828 can be readily decodable due to being encoded with the appropriate reference frames.

Figure 9:
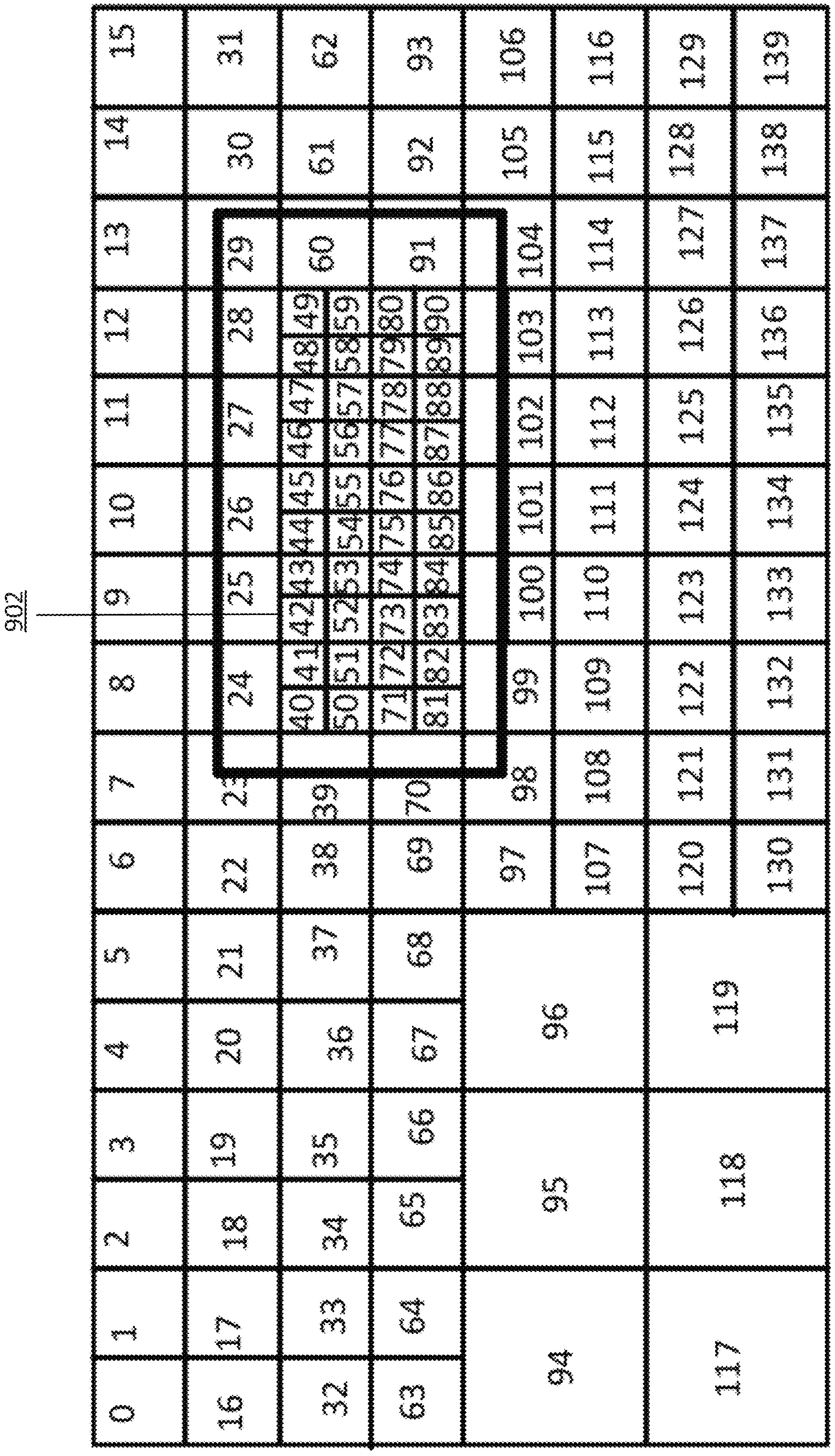
FIG. 9 is an example of a multi resolution/scale tile selection, in accordance with some embodiments of this disclosure.

FIG. 9 is an example of a multi-resolution/scale tile selection, in accordance with some embodiments of this disclosure. In some embodiments, the selection algorithm for selecting resolutions and/or qualities of regions (e.g., tiles) of a frame may be based on bandwidth at a given point in time and/or a determined field of view of a user. Tiles may be assembled based on a viewport change, as described in relation to FIG. 5, using the resolutions in, e.g., FIG. 1. As shown in FIG. 9, region 902, which may be determined as the location of the user's gaze within a spherical media content item, may be provided with the largest number of tiles to facilitate the highest resolution portion within a viewport of an XR device. As the bandwidth changes and/or as the user's view changes, different tiles will have to be selected from encoded qualities and/or resolutions of content, and foveated rendering systems may perform the tile selection for each frame based on the user's view and bandwidth and assemble them into a complete picture to deliver to the client device. For example, the first 39 tiles shown in FIG. 9 may be provided as 4K block intra-tiles (e.g., of version 118 of FIG. 1), as such tiles may not correspond to the ROI, whereas tiles 40-59 and 71-90, determined to correspond to the ROI, may be provided as 8K block intra-tiles of version 114 of FIG. 1. Tiles 94, 95, 96, 117, 118, and 119 may be provided as 2K tiles, based on being distant (e.g., 180 degrees) from the ROI, and the remainder of tiles 97-116 and 120-139 may be provided as 4K block intra-tiles. For example, tile 40 may be provided in an 8K resolution, and may correspond to, e.g., tile 144 in the 8K stream, as shown in FIG. 10B.

Figure 10A:
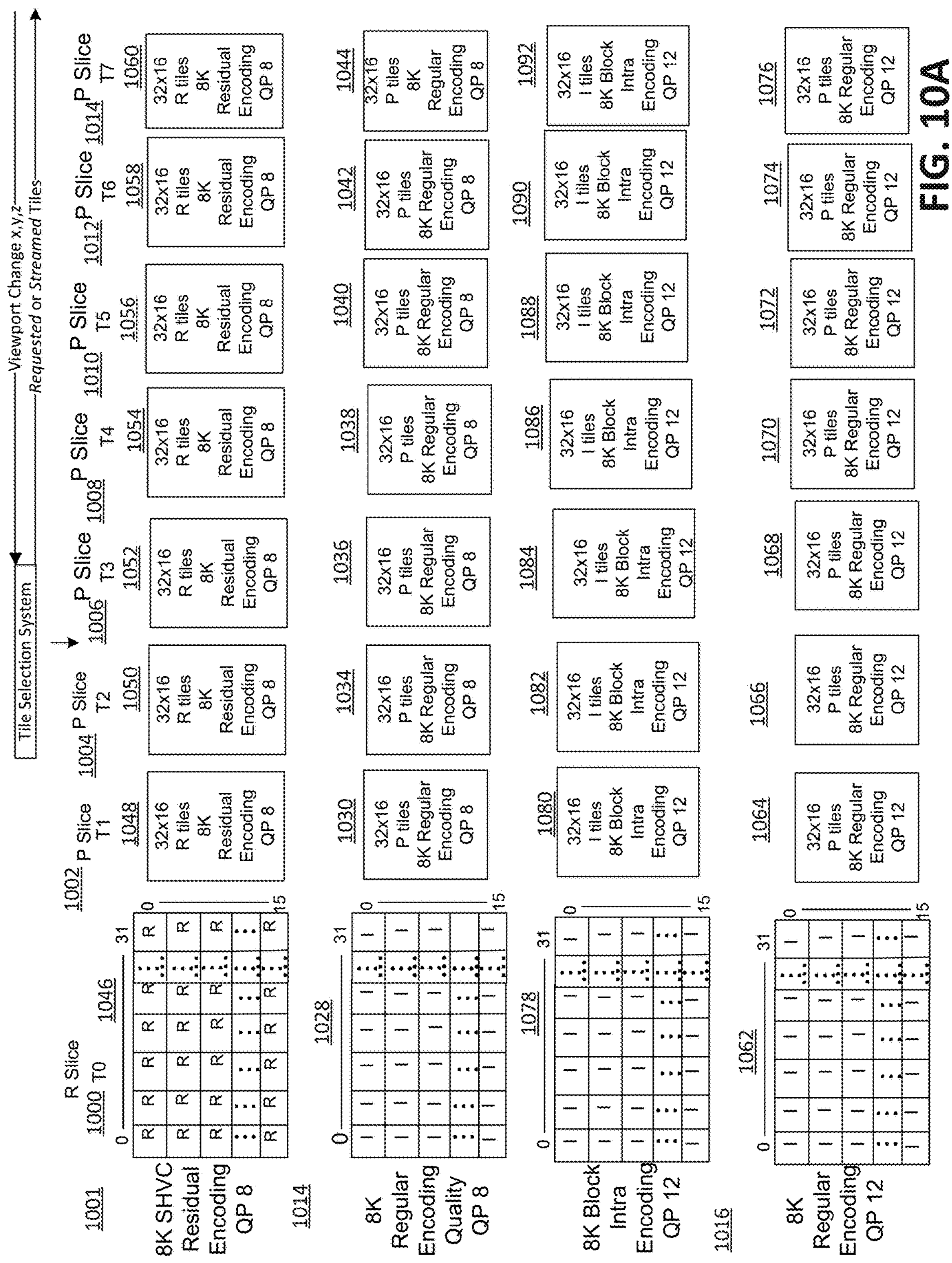
FIG. 10A shows illustrative encoding data 1001 for portions of a spherical media content item, in accordance with some embodiments of this disclosure.
Figure 10A:
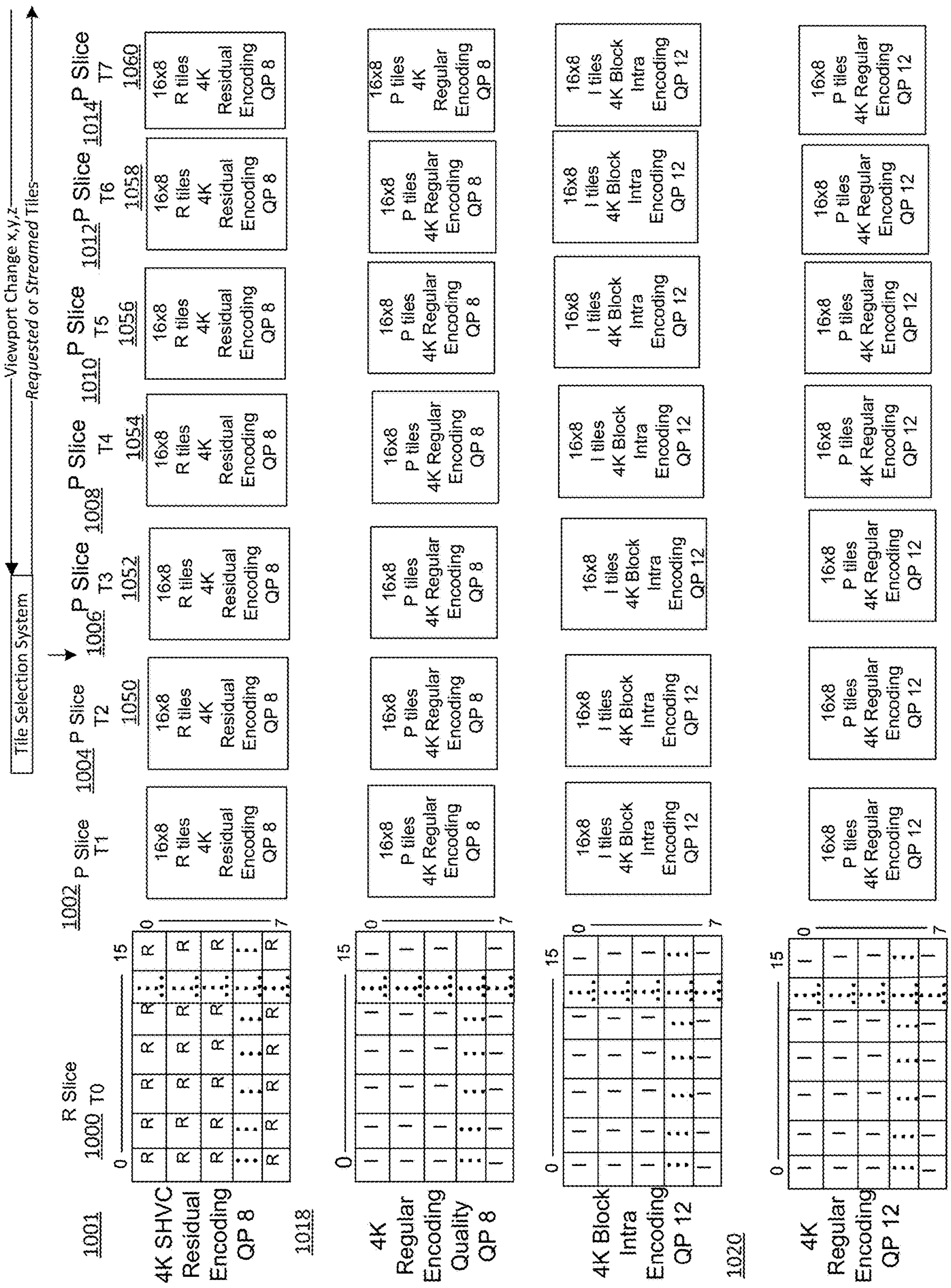
Figure 10A:
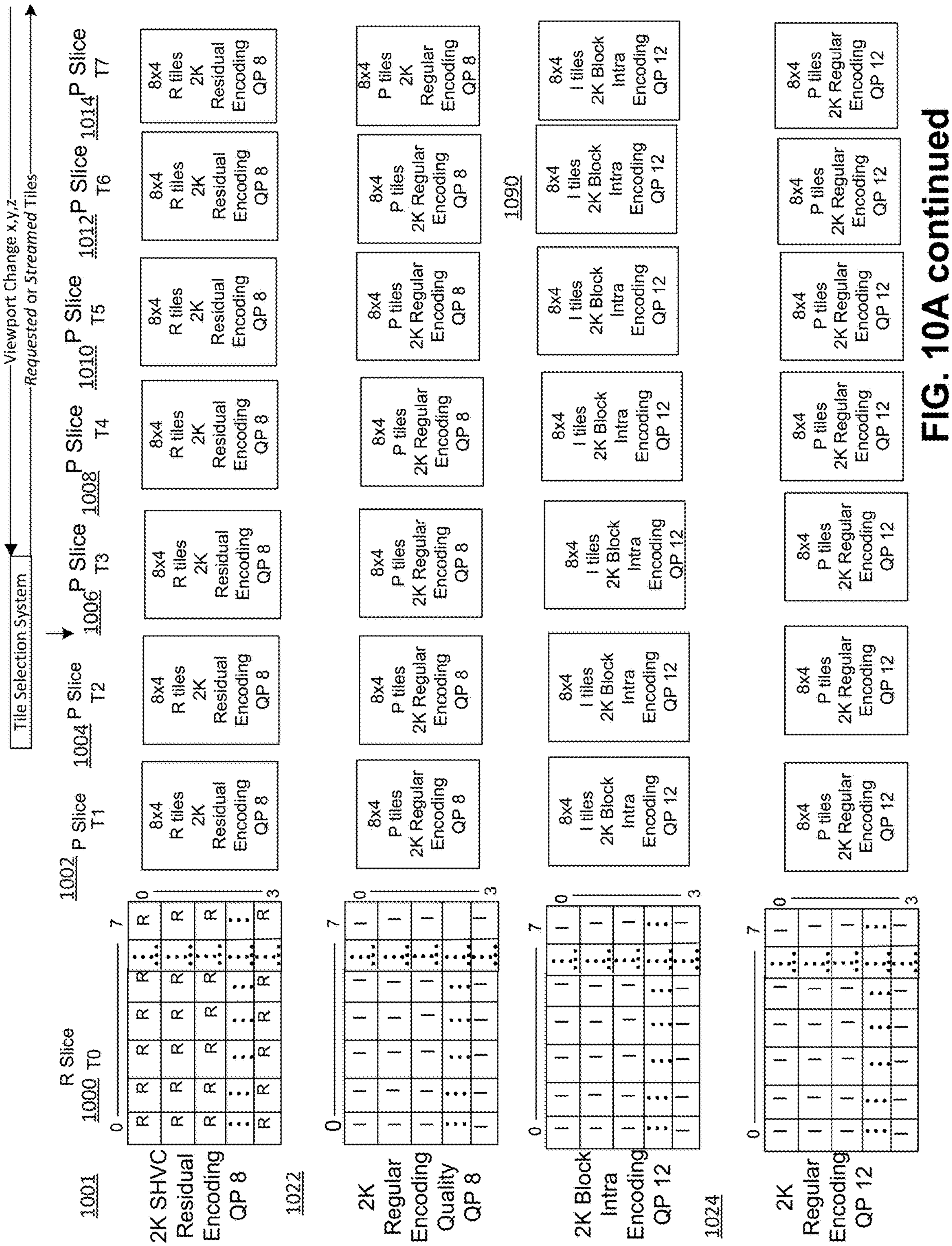

FIG. 10A shows illustrative encoding data 1001 for portions of a spherical media content item, in accordance with some embodiments of this disclosure. In FIG. 10A, the encoding application may provide encoding data 1001 having two qualities from the encoding, with an encoded IP tile structure, e.g., as defined in FIG. 2. Such encoding structure is used in FIGS. 10B-10D to demonstrate how tiles are assembled and sent from a server or requested by a client to form the video of varying qualities across the 360-degree FOV space. FIG. 10A shows 2K, 4K and 8K resolution encodings each having two qualities, QP 12 and QP 8, and an IP GOP structure with a lowest quality all intra encoding for each resolution.

FIG. 10A shows encoding data 1001 for a plurality of frames 1000, 1002, 1004, 1006, 1008, 1010, 1012, and 1014 of a spherical media content item. Each frame may be available in a plurality of versions 1014, 1016, 1018, 1020, 1022, and 1024 coded in one of a plurality of resolutions (e.g., 8 k, 4 k, 2K, and/or any other suitable set of resolutions) and in one of a plurality of qualities, e.g., indicated by QP. In some embodiments, the versions or renditions of the frames or segments or any other suitable portion of the spherical media content item may be indicated in a manifest, and requested by a client device, e.g., an extended reality (XR) device, from one or more servers (e.g., an edge server or an origin server of a content delivery network (CDN) and/or any other suitable server).

Version 1014 may be encoded as 8K residual (R) encoding data having QP 8 and an 8K regular encoding data of QP 8. Such 8K regular encoding data of QP 8 of version 1014 may comprise an IP GOP of I-frame 1030 corresponding to frame 1000; P-frame 1032 corresponding to frame 1002; P-frame 1034 corresponding to frame 1004; P-frame 1036 corresponding to frame 1006; P-frame 1038 corresponding to frame 1008; P-frame 1040 corresponding to frame 1010; P-frame 1042 corresponding to frame 1012; and P-frame 1044 corresponding to frame 1014. As shown in FIG. 10A, the 8K residual encoding data of QP 8 of version 1014 may comprise residual data 1046 for I-frame 1030, residual data 1048 for P-frame 1032, residual data 1050 for P-frame 1034, residual data 1052 for P-frame 1036, residual data 1054 for P-frame 1038, residual data 1056 for P-frame 1040, residual data 1058 for P-frame 1042, and residual data 1060 for P-frame 1044. In some embodiments, residual data 1046, residual data 1048, residual data 1050, residual data 1052, residual data 1054, residual data 1056, residual data 1058, and residual data 1060 may be considered companion streams for I-frame 1030, P-frame 1032, P-frame 1034, P-frame 1036, P-frame 1038, P-frame 1040, P-frame 1042, and P-frame 1044, respectively.

Version 1016 may be encoded as 8K intra encoding data of QP 12 and an 8K regular encoding data of QP 12. Such 8K regular encoding data version 1016 may comprise an IP GOP of I-frame 1062 corresponding to frame 1000; P-frame 1064 corresponding to frame 1002; P-frame 1066 corresponding to frame 1004; P-frame 1068 corresponding to frame 1006; P-frame 1070 corresponding to frame 1008; P-frame 1072 corresponding to frame 1010; P-frame 1074 corresponding to frame 1012; and P-frame 1076 corresponding to frame 1014. As shown in FIG. 10A, the 8K block intra encoding data of QP 12 of version 1016 may comprise I-frames 1078, 1080, 1082, 1084, 1086, 1088, 1090, and 1092 for (e.g., companion streams of) I-frame 1062, P-frame 1064, P-frame 1066, P-frame 1068, P-frame 1070, P-frame 1072, P-frame 1074, and P-frame 1076, respectively.

Version 1018 of FIG. 10A may be implemented in a similar manner to version 1014, except version 1018 may provide content in a 4K resolution instead of an 8K resolution. Version 1020 may be implemented in a similar manner to version 1016, except version 1020 may provide content in a 4K resolution instead of an 8K resolution. Version 1022 of FIG. 10A may be implemented in a similar manner to versions 1014 and 1018, except version 1022 may provide content in a 2K resolution instead of an 8K or 4K resolution. Version 1024 of FIG. 10A may be implemented in a similar manner to versions 1016 and 1020, except version 1024 may provide content in a 2K resolution instead of an 8K or 4K resolution.

In the example of FIG. 10A, a user may change their head pose and/or eye movement, and settle their gaze onto a specific area of the viewport just prior to time T3 in the encoded stream. Such input may be received by a tile selection system, and a set of tiles is selected (requested or streamed) based on, e.g., the viewport center x, y, z position and/or a determined eye tracking position of the user. The set of tiles can be combined and delivered to the client device using the defined encoding/decoding scheme.

FIG. 10B shows an example of a set of tiles of the level of block intra-tiles selected based on the viewport change in FIG. 10A, in accordance with some embodiments of this disclosure. Such viewport change, and the corresponding switch between versions of the spherical media content item, may occur immediately prior to time T3 of FIG. 10A. For example, as shown in FIG. 10B, after the viewport change, and at time T3, tiles 0-39 may be provided using the 4K block intra encoding QP 12 of version 1020, and for tiles 40-59 and 71-90 corresponding to an upgrade due to corresponding to the determined ROI, such tiles 40-59 and 71-90 may be provided using the 8K QP 12 block intra data of version 1016. In this example, no residual tiles are used for the very next frame after the viewport change. Note, the switch between versions of the spherical media content item may additionally or alternatively be a result of changes in bandwidth, resulting in versions that constitute quality upgrades or quality downgrades with respect to the version being provided to the client device prior to the switch.

FIG. 10C shows an example of a set of tiles selected from the tile encodings of FIG. 10A, for upgrading the next picture, after the previous all block intra set of tiles, to decode and render at T4, in accordance with some embodiments of this disclosure. As shown in FIG. 10C, tiles 7-14, 23-30, 39, 42-47, 52-57, 60, 70, 73-78, 83-88, 91, 94, 96, 98-104, 117, and 119 may comprise or receive residual data. In some embodiments, only tiles requiring higher quality (e.g., based on being associated with or in the vicinity of the ROI) than the base quality within a resolution receive the residual allowing for the quality upgrade. FIG. 10C demonstrates a client device decoding multiple resolutions with upgrades to specific tiles because of the change in head pose, eye tracking and/or bandwidth changes.

FIG. 10D shows an example of a set of tiles selected from the tile encodings of FIG. 10A, the next picture to decode and render after T4 which is picture T5, in accordance with some embodiments of this disclosure. In some embodiments, at this point, all tiles may be selected from the regular encoded streams based on a tile selection system, which selects the tiles based on head pose, eye tracking and/or bandwidth changes.

Figure 11A:
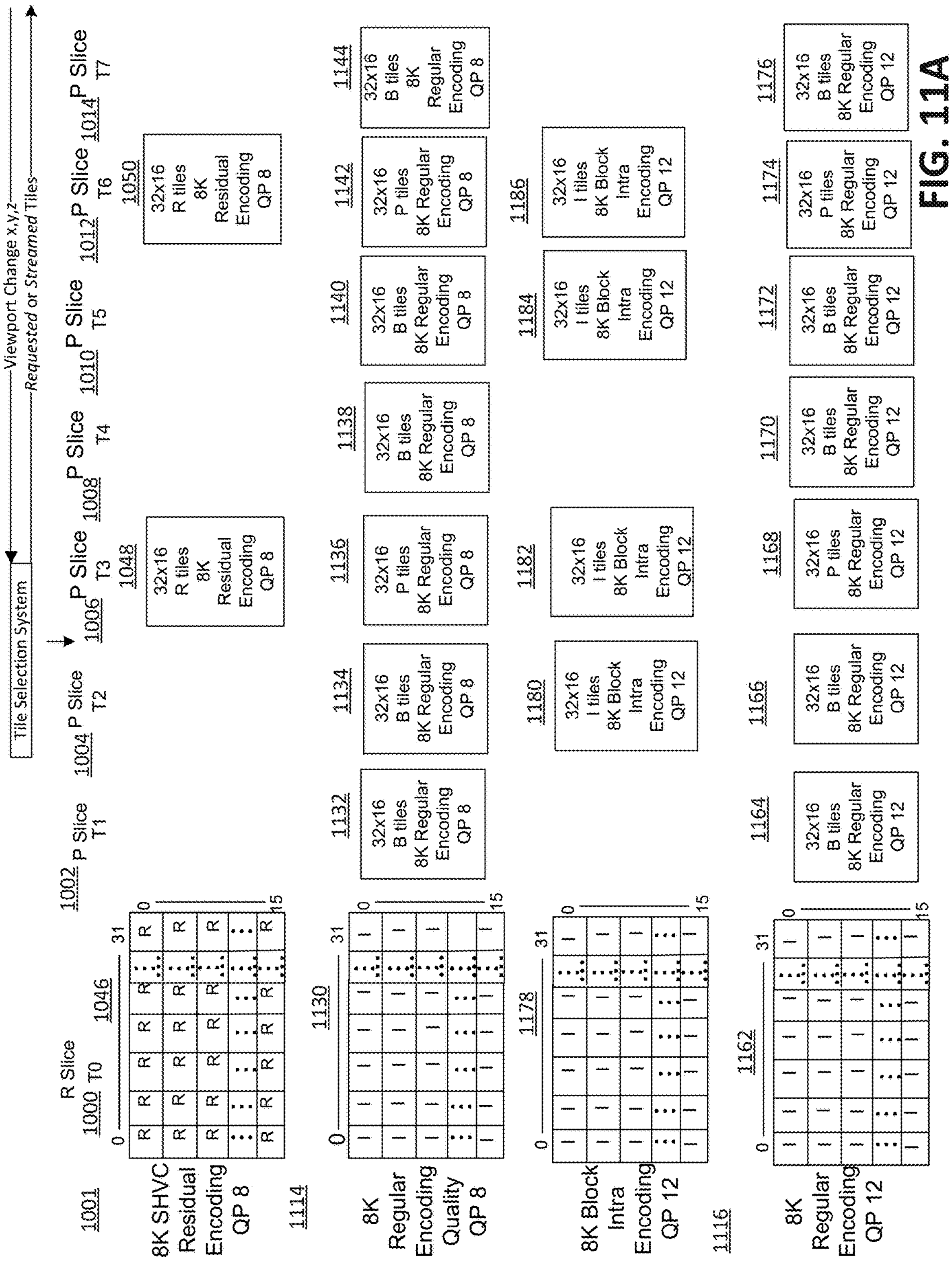
FIG. 11A shows illustrative encoding data for portions of a spherical media content item, in accordance with some embodiments of this disclosure.
Figure 11A:
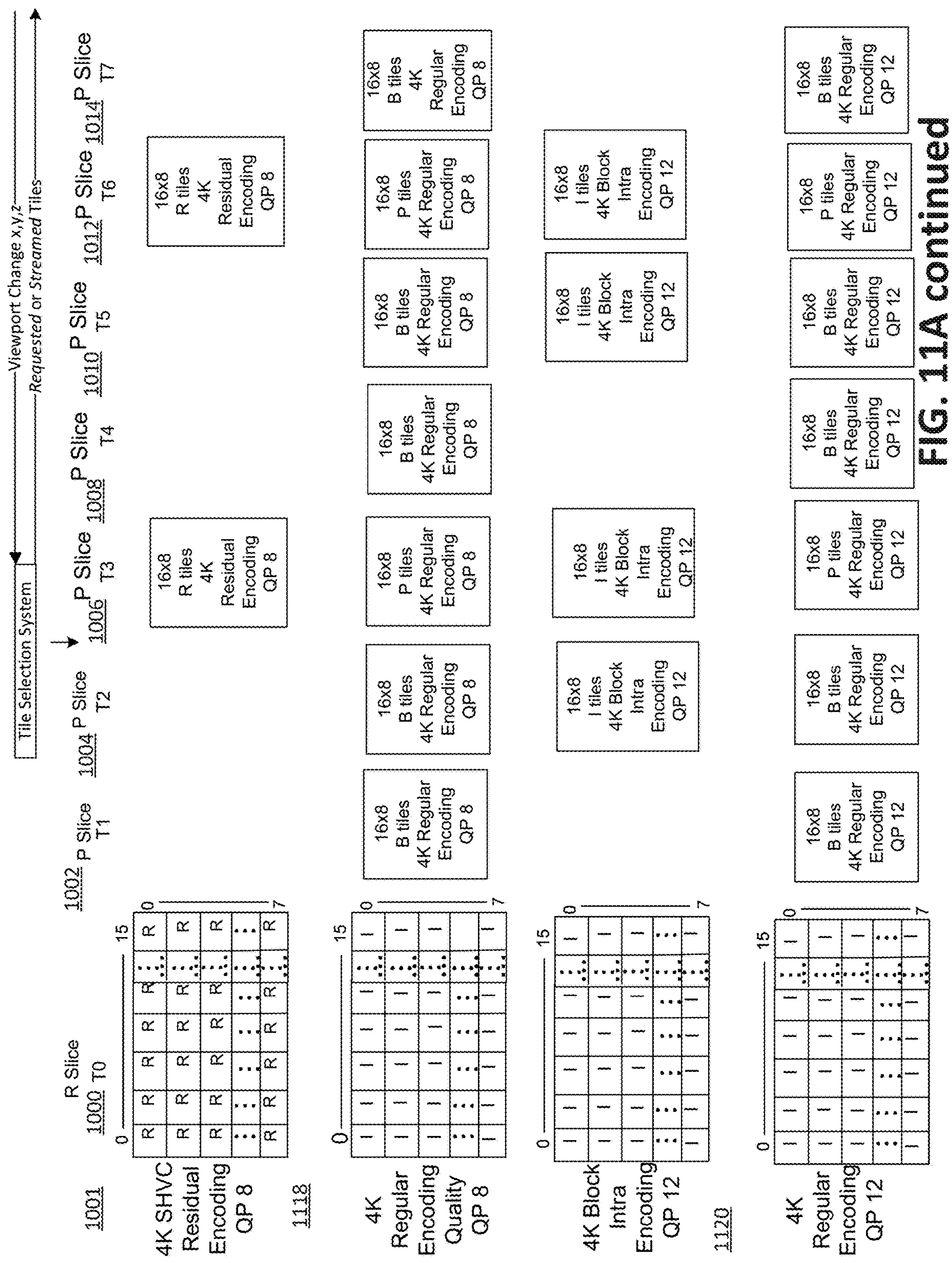
Figure 11A:
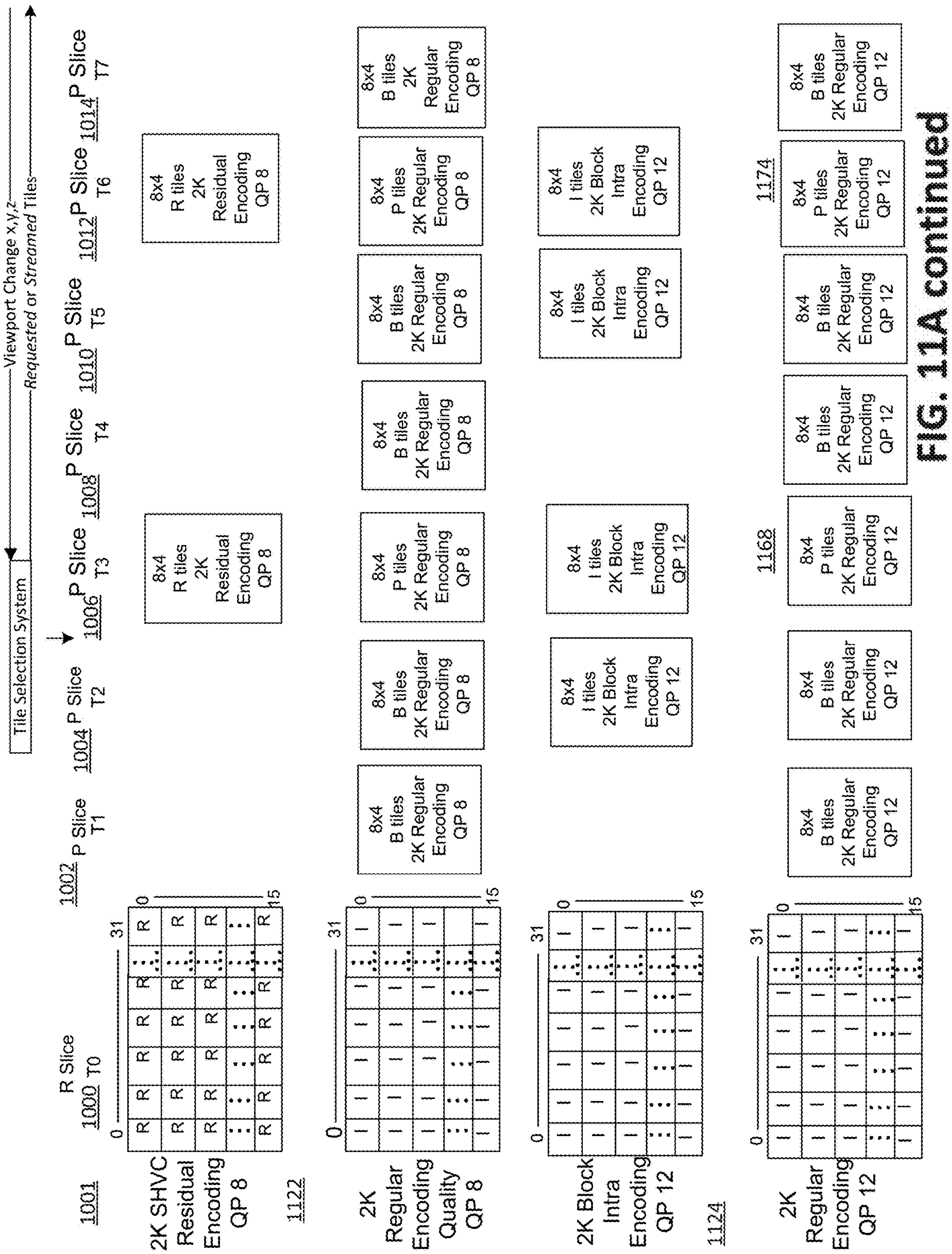

FIG. 11A shows illustrative encoding data 1101 for portions of a spherical media content item, in accordance with some embodiments of this disclosure. In FIG. 11A, the encoding application may provide encoding data 1101 having two qualities from the encoding, with an encoded IP tile structure, e.g., as defined in FIG. 2. Such encoding structure is used in FIGS. 11B-11C to demonstrate how tiles are assembled and sent from a server or requested by a client to form the video of varying qualities across the 360-degree FOV space. FIG. 11A shows 2K, 4K and 8K resolution encodings each having two qualities, QP12 and QP 8, and an IP GOP structure with a lowest quality all intra encoding for each resolution.

FIG. 11A shows encoding data 1101 for a plurality of times T0, T1, T2, T3, T4, T5, T6, and T7 of a spherical media content item. Each frame may be available in a plurality of versions 1114, 1116, 1118, 1120, 1122, and 1124 coded in one of a plurality of resolutions (e.g., 8K, 4 k, 2K, and/or any other suitable set of resolutions) and in one of a plurality of qualities, e.g., quantization parameter (QP). In some embodiments, the versions or renditions of the frames or segments or any other suitable portion of the spherical media content item may be indicated in a manifest, and requested by a client device, e.g., an extended reality (XR) device, from one or more servers (e.g., an edge server or an origin server of a content delivery network (CDN) and/or any other suitable server).

Version 1114 may be encoded as 8K residual (R) encoding data having QP 8 and an 8K regular encoding data of QP 8. Such 8K regular encoding data of QP 8 of version 1116 may comprise an IP GOP of I-frame 1130 corresponding to time TO; B-frame 1132 corresponding to time T1; B-frame 1134 corresponding to time T2; P-frame 1136 corresponding to time T3; B-frame 1138 corresponding to time T4; B-frame 1140 corresponding to time T5; P-frame 1142 corresponding to time T6; and B-frame 1144 corresponding to time T7.

As shown in FIG. 11A, the 8K residual encoding data of QP 8 of version 1114 may comprise residual data 1146 for I-frame 1130, residual data 1148 for P-frame 1136, and residual data 1150 for P-frame 1142. In some embodiments, residual data 1146, residual data 1148, and residual data 1150 may be considered companion streams for I-frame 1130, P-frame 1136, and P-frame 1142, respectively.

Version 1116 may be encoded as 8K intra encoding data of QP 12 and an 8K regular encoding data of QP 12. Such 8K regular encoding data of version 1116 may comprise I-frame 1162 corresponding to time T0; B-frame 1164 corresponding to time T1; B-frame 1166 corresponding to time T2; P-frame 1168 corresponding to time T3; B-frame 1170 corresponding to time T4; B-frame 1172 corresponding to time T5; P-frame 1174 corresponding to time T6; and B-frame 1176 corresponding to time T7. As shown in FIG. 11A, the 8K block intra encoding data of QP 12 of version 1116 may comprise-frames 1178, 1180, 1182, 1184, and 1186 for (e.g., companion streams of) I-frame 1162, B-frame 1166, P-frame 1168, B-frame 1172, and P-frame 1174, respectively.

Version 1118 of FIG. 11A may be implemented in a similar manner to version 1114, except version 1118 may provide content in a 4K resolution instead of an 8K resolution. Version 1120 may be implemented in a similar manner to version 1116, except version 1120 may provide content in a 4K resolution instead of an 8K resolution. Version 1122 of FIG. 11A may be implemented in a similar manner to versions 1114 and 1118, except version 1122 may provide content in a 2K resolution instead of an 8K or 4K resolution. Version 1124 of FIG. 11A may be implemented in a similar manner to versions 1116 and 1120, except version 1124 may provide content in a 2K resolution instead of an 8K or 4K resolution.

In the example of FIG. 11A, the encoding application provides 2K, 4K and 8K resolution encodings with two qualities, QP12 and QP 8, and an IBBP GOP structure with a lowest quality all intra encoding for each resolution. The encoding application provides an encoding with two qualities from the tiled encoding with an IBBP GOP structure, e.g., as defined in FIG. 1. This encoding structure is used to demonstrate in FIGS. 11B-11C how tiles are assembled and sent from the server or requested by the client to form the video of varying qualities across the 360-degree FOV space. For example, the tile selection system may determine that a user changed head pose and/or that eye movement occurred and settled onto a specific area just prior to time T3 in the encoded stream. The input may be received by the tile selection system and a set of tiles is selected (requested or streamed) based on the viewport center x, y, z position.

As shown in FIG. 11B, a set of selected tiles includes a lowest level of block intra-tiles to be selected based on the viewport change at T3 in FIG. 11A. These tiles may be selected from the encoding GOP and tile structure defined in FIG. 11A. The primary difference in this type of encoding is for the next frame to render. For example, in FIG. 11A, the first 39 tiles shown in FIG. 9 may be provided as 4K block intra-tiles (e.g., of version 118 of FIG. 1), as such tiles may not correspond to the ROI, whereas tiles 40-59 and 71-90, determined to correspond to the ROI, may be provided as 8K block intra-tiles of version 1116 of FIG. 1. Tiles 94, 95, 96, 117, 118, and 119 may be provided as 2K tiles, based on being distant (e.g., 180 degrees) from the ROI, and the remainder of tiles 97-116 and 120-139 may be provided as 4K block intra-tiles.

As shown in FIG. 11C, a set of tiles is selected from FIG. 11A tile encodings for upgrading the next picture, after the previous all block intra set of tiles, to decode and render at T6. Since the B-tiles cannot be decoded, the block intra-tiles inserted from the block intra encoding may be leveraged, e.g., by dropping the bidirectional tiles at the time of the switch (or not selected for delivery to the client device). The example of FIG. 11C demonstrates the tile assembly after dropping the B-tiles from T4 and T5. The upgrade may be applied to a next encoded frame with all predicted tiles. In some embodiments, only tiles requiring higher quality above the base quality within a resolution will receive the residual encoded tiles allowing for the quality upgrade. FIG. 11C demonstrates the client device decoding multiple resolutions with upgrades to specific tiles because of the change in head pose, eye tracking and/or bandwidth changes.

For example, as shown in FIG. 11C, at time T6, residual data of 4K QP 8 of version 1118 may be provided for tiles 7-13, and a P-tile from 4K regular encoding data QP 8 of version 1118 may be provided for tile 14. Similarly, at time T6, residual data of 4K QP 8 of version 1118 may be provided for tiles 23-29, and 39, and P-tiles from 4K regular encoding data QP 8 of version 1118 may be provided for tile 30. At time T6, residual data of 8K QP 8 of version 1114 may be provided for tiles 42-47, 52-57, 73-78, 83-88, and 91. At time T6, residual data of 4K QP 8 of version 1122 may be provided for tiles 60, 70, and 98-104, and residual data of 2K QP 8 of version 1118 may be provided for tiles 94, 96, 117, and 119.

FIG. 11D shows an example of the next B-tiles being sent to the client device for decoding, in accordance with some embodiments of this disclosure. If there are no changes in bandwidth or head pose, the tile selection from the resolutions and qualities may be sent to the device based on the GOP structure for those qualities and tiles, and such tiles may be from the T7 encoded tiles, for the next picture to deliver to the client device after the picture associated with FIG. 11C.

Figure 12:
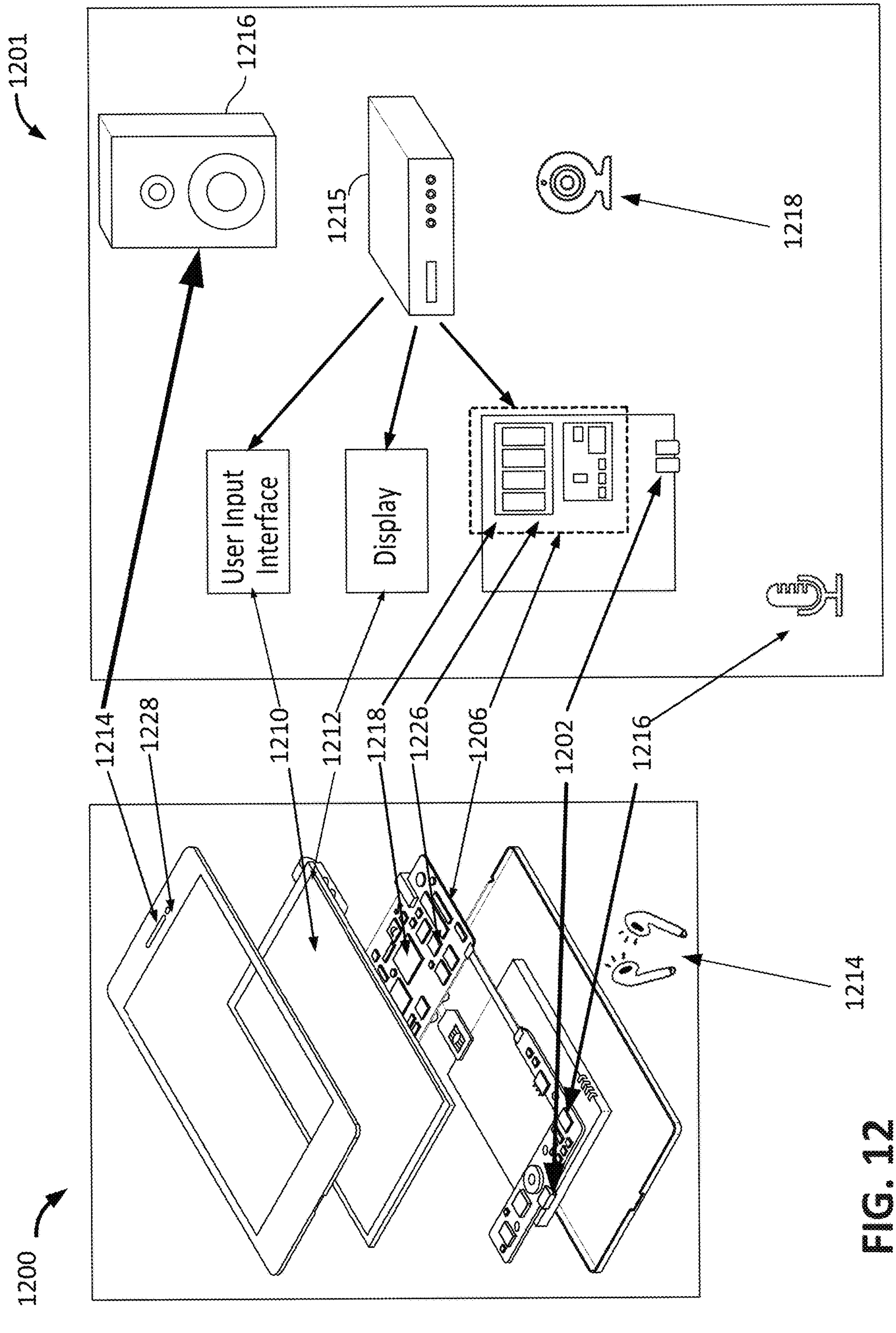
FIGS. 12-13 show illustrative devices and systems for encoding data for portions of a spherical media content item, in accordance with some embodiments of this disclosure.
Figure 13:
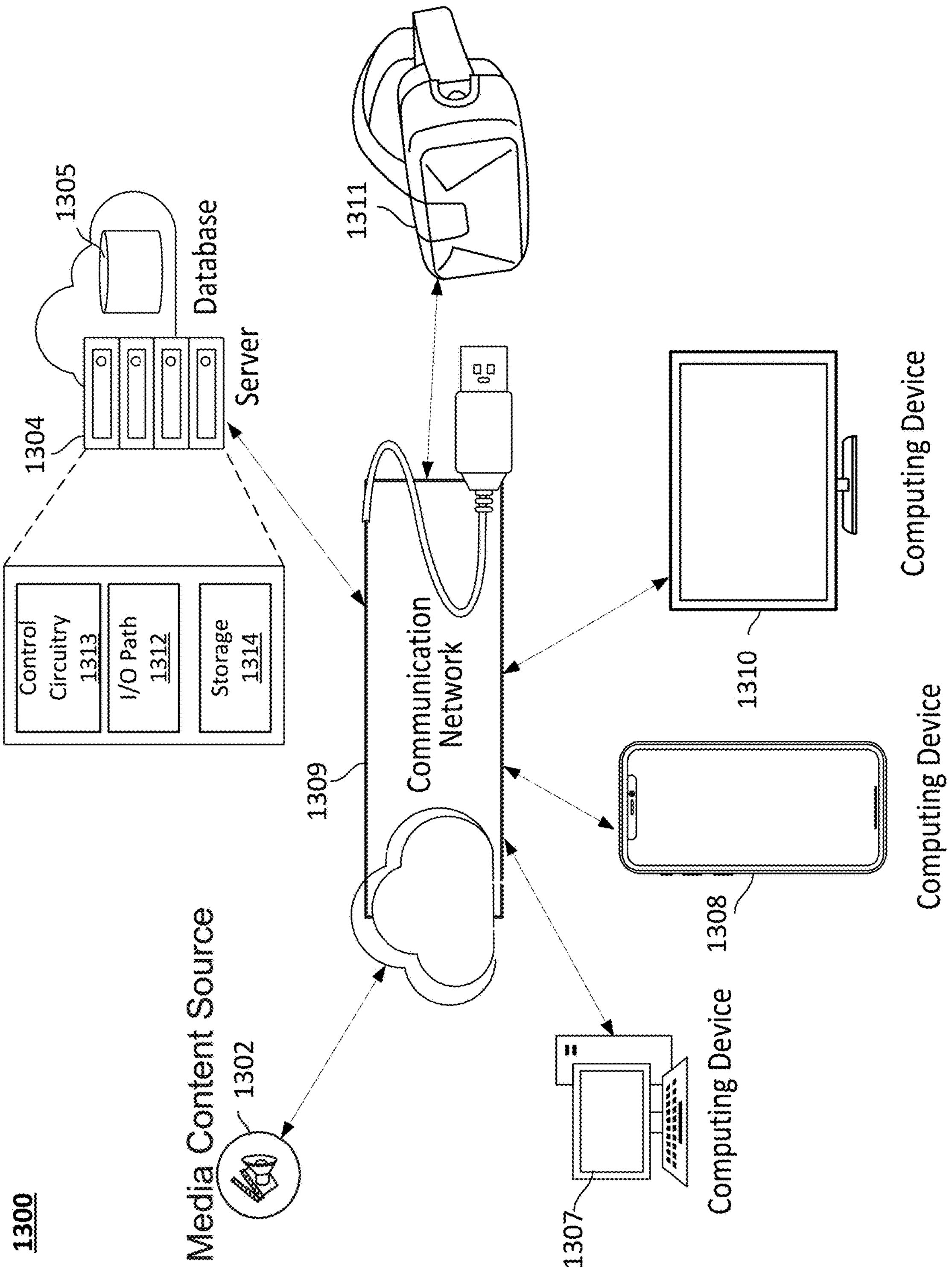

FIGS. 12-13 show illustrative devices, systems, servers, and related hardware for encoding data for portions of a spherical media content item, in accordance with some embodiments of this disclosure. FIG. 12 shows generalized embodiments of illustrative computing devices 1200 and 1201, which may correspond to, e.g., a smart phone; a tablet; a laptop computer; a personal computer; a desktop computer; a smart television; a smart watch or wearable device; smart glasses; a stereoscopic display; a wearable camera; virtual reality (VR) glasses; VR goggles; a stereoscopic display; augmented reality (AR) glasses; an AR head-mounted display (HMD); a VR HMD; or any other suitable computing device; or any combination thereof. In another example, computing device 1201 may be a user television equipment system or device.

User television equipment device 1201 may include set-top box 1215. Set-top box 1215 may be communicatively connected to microphone 1216, Audio output equipment (e.g., speaker or headphones 1214), and display 1212. In some embodiments, microphone 1216 may receive audio corresponding to a voice of a user providing input (e.g., text input 102 of FIG. 1). In some embodiments, display 1212 may be a television display or a computer display. In some embodiments, set-top box 1215 may be communicatively connected to user input interface 1210. In some embodiments, user input interface 1210 may be a remote control device. Set-top box 1215 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing devices are discussed below in connection with FIG. 9. In some embodiments, computing device 1200 may comprise any suitable number of sensors (e.g., gyroscope or gyrometer, or accelerometer, etc.), and/or a GPS module (e.g., in communication with one or more servers and/or cell towers and/or satellites) to ascertain a location of computing device 1200. In some embodiments, computing device 1200 comprises a rechargeable battery that is configured to provide power to the components of the device.

Each one of computing device 1200 and computing device 1201 may receive content and data via input/output (I/O) path 1202. I/O path 1202 may provide content (e.g., broadcast programming, on-demand programming, Internet content, content available over a local area network (LAN) or wide area network (WAN), and/or other content) and data to control circuitry 1204, which may comprise processing circuitry 1206 and storage 1208. Control circuitry 1204 may be used to send and receive commands, requests, and other suitable data using I/O path 1202, which may comprise I/O circuitry. I/O path 1202 may connect control circuitry 1204 (and specifically processing circuitry 1206) to one or more communications paths (described below). I/O functions may be provided by one or more of these communications paths, but are shown as a single path in FIG. 12 to avoid over-complicating the drawing. While set-top box 1215 is shown in FIG. 12 for illustration, any suitable computing device having processing circuitry, control circuitry, and storage may be used in accordance with the present disclosure. For example, set-top box 1215 may be replaced by, or complemented by, a personal computer (e.g., a notebook, a laptop, a desktop), a smartphone (e.g., computing device 1200), an XR device; a tablet; a network-based server hosting a user-accessible client device; a non-user-owned device; any other suitable device; or any combination thereof.

Control circuitry 1204 may be based on any suitable control circuitry such as processing circuitry 1206. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1204 executes instructions for the encoding application stored in memory (e.g., storage 1208). Specifically, control circuitry 1204 may be instructed by the encoding application to perform the functions discussed above and below. In some implementations, processing or actions performed by control circuitry 1204 may be based on instructions received from the encoding application.

In client/server-based embodiments, control circuitry 1204 may include communications circuitry suitable for communicating with a server or other networks or servers. The encoding application may be a stand-alone application implemented on a device or a server. The encoding application may be implemented as software or a set of executable instructions. The instructions for performing any of the embodiments discussed herein of the encoding application may be encoded on non-transitory computer-readable media (e.g., a hard drive, random-access memory on a DRAM integrated circuit, read-only memory on a BLU-RAY disk, etc.). For example, in FIG. 3, the instructions may be stored in storage 1208, and executed by control circuitry 1204 of a device 1200.

In some embodiments, the encoding application may be a client/server application where only the client application resides on device 1200 (e.g., device 1204), and a server application resides on an external server (e.g., server 1304). For example, the encoding application may be implemented partially as a client application on control circuitry 1204 of device 1200 and partially on server 1304 as a server application running on control circuitry 1313. Server 1304 may be a part of a local area network with one or more of devices 1200, 1201 or may be part of a cloud computing environment accessed via the Internet. In a cloud computing environment, various types of computing services for performing searches on the Internet or informational databases, providing video communication capabilities, providing storage (e.g., for a database) or parsing data are provided by a collection of network-accessible computing and storage resources (e.g., server 1304 and/or an edge computing device), referred to as "the cloud." Device 1200 may be a cloud client that relies on the cloud computing capabilities from server 1304 to determine whether processing (e.g., at least a portion of virtual background processing and/or at least a portion of other processing tasks) should be offloaded from the mobile device, and facilitate such offloading. When executed by control circuitry of server 1304, the encoding application may instruct control circuitry 1311 to perform processing tasks for the client device and facilitate the generation of encoding data. The client application may instruct control circuitry 1204 to determine whether processing should be offloaded.

Control circuitry 1204 may include communications circuitry suitable for communicating with a server, edge computing systems and devices, a table or database server, or other networks or servers The instructions for carrying out the above mentioned functionality may be stored on a server (which is described in more detail in connection with FIG. 9. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 9). In addition, communications circuitry may include circuitry that enables peer-to-peer communication of computing devices, or communication of computing devices in locations remote from each other (described in more detail below).

Memory may be an electronic storage device provided as storage 1208 that is part of control circuitry 1204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1208 may be used to store various types of content described herein as well as the encoding application data described above. Nonvolatile memory may also be used (e.g., to launch a boot-up routine and other instructions). Cloud-based storage, described in more detail in relation to FIG. 13, may be used to supplement storage 1208 or instead of storage 1208.

Control circuitry 1204 may include video generating circuitry and tuning circuitry, such as one or more analog tuners, one or more SHVC decoders or SHVC decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to SHVC or any other suitable signals for storage) may also be provided. Control circuitry 1204 may also include scaler circuitry for upconverting and downconverting content into the preferred output format of computing device 1200. Control circuitry 1204 may also include digital-to-analog converter circuitry and analog-todigital converter circuitry for converting between digital and analog signals. The tuning and encoding circuitry may be used by computing device 1200, 1201 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1208 is provided as a separate device from computing device 1200, the tuning and encoding circuitry (including multiple tuners) may be associated with storage 1208.

Control circuitry 1204 may receive instruction from a user by way of user input interface 1210. User input interface 1210 may be any suitable user interface, such as a remote control, mouse, trackball, keypad, keyboard, touch screen, touchpad, stylus input, joystick, voice recognition interface, or other user input interfaces. Display 1212 may be provided as a stand-alone device or integrated with other elements of each one of computing device 1200 and computing device 1201. For example, display 1212 may be a touchscreen or touch-sensitive display. In such circumstances, user input interface 1210 may be integrated with or combined with display 1212. In some embodiments, user input interface 1210 includes a remote-control device having one or more microphones, buttons, keypads, any other components configured to receive user input or combinations thereof. For example, user input interface 1210 may include a handheld remote-control device having an alphanumeric keypad and option buttons. In a further example, user input interface 1210 may include a handheld remote-control device having a microphone and control circuitry configured to receive and identify voice commands and transmit information to set-top box 1215.

Audio output equipment 1214 may be integrated with or combined with display 1212. Display 1212 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1212. Audio output equipment 1214 may be provided as integrated with other elements of each one of computing device 1200 and computing device 1201 or may be stand-alone units. An audio component of videos and other content displayed on display 1212 may be played through speakers (or headphones) of audio output equipment 1214. In some embodiments, audio may be distributed to a receiver (not shown), which processes and outputs the audio via speakers of audio output equipment 1214. In some embodiments, for example, control circuitry 1204 is configured to provide audio cues to a user, or other audio feedback to a user, using speakers of audio output equipment 1214. There may be a separate microphone 1216 or audio output equipment 1214 may include a microphone configured to receive audio input such as voice commands or speech. For example, a user may speak letters or words or terms or numbers that are received by the microphone and converted to text by control circuitry 1204. In a further example, a user may voice commands that are received by a microphone and recognized by control circuitry 1204. Camera 1218 may be any suitable video camera integrated with the equipment or externally connected. Camera 1218 may be a digital camera comprising a charge-coupled device (CCD) and/or a complementary metal-oxide semiconductor (CMOS) image sensor. Camera 1218 may be an analog camera that converts to digital images via a video card.

The encoding application may be implemented using any suitable architecture. For example, it may be a stand-alone application wholly-implemented on each one of computing device 1200 and computing device 1201. In such an approach, instructions of the application may be stored locally (e.g., in storage 1208), and data for use by the application is downloaded on a periodic basis (e.g., from an out-of-band feed, from an Internet resource, or using another suitable approach). Control circuitry 1204 may retrieve instructions of the application from storage 1208 and process the instructions to provide video conferencing functionality and generate any of the displays discussed herein. Based on the processed instructions, control circuitry 1204 may determine what action to perform when input is received from user input interface 1210. For example, movement of a cursor on a display up/down may be indicated by the processed instructions when user input interface 1210 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1204 may allow a user to provide user profile information or may automatically compile user profile information. For example, control circuitry 1204 may access and monitor network data, video data, audio data, processing data, participation data from a conference participant profile. Control circuitry 1204 may obtain all or part of other user profiles that are related to a particular user (e.g., via social media networks), and/or obtain information about the user from other sources that control circuitry 1204 may access. As a result, a user can be provided with a unified experience across the user's different devices.

In some embodiments, the encoding application is a client/server-based application. Data for use by a thick or thin client implemented on each one of computing device 1200 and computing device 1201 may be retrieved on-demand by issuing requests to a server remote to each one of computing device 1200 and computing device 1201. For example, the remote server may store the instructions for the application in a storage device. The remote server may process the stored instructions using circuitry (e.g., control circuitry 1204) and generate the displays discussed above and below. The client device may receive the displays generated by the remote server and may display the content of the displays locally on computing device 1200. This way, the processing of the instructions is performed remotely by the server while the resulting displays (e.g., that may include text, a keyboard, or other visuals) are provided locally on computing device 1200. Computing device 1200 may receive inputs from the user via input interface 1210 and transmit those inputs to the remote server for processing and generating the corresponding displays. For example, computing device 1200 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to computing device 1200 for presentation to the user.

In some embodiments, the encoding application may be downloaded and interpreted or otherwise run by an interpreter or virtual machine (run by control circuitry 1204). In some embodiments, the encoding application may be encoded in the ETV Binary Interchange Format (EBIF), received by control circuitry 1204 as part of a suitable feed, and interpreted by a user agent running on control circuitry 1204. For example, the encoding application may be an EBIF application. In some embodiments, the encoding application may be defined by a series of JAVA-based files that are received and run by a local virtual machine or other suitable middleware executed by control circuitry 1204. In some of such embodiments (e.g., those employing H.265, SHVC or any other suitable digital media encoding schemes), the encoding application may be, for example, encoded and transmitted in using an SHVC with the SHVC audio and video packets of a program.

XR may be understood as virtual reality (VR), augmented reality (AR) or mixed reality (MR) technologies, or any suitable combination thereof. VR systems may project images to generate a three-dimensional environment to fully immerse (e.g., giving the user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

FIG. 13 is a diagram of an illustrative system 1300 for enabling user controlled extended reality, in accordance with some embodiments of this disclosure. Computing devices 1307, 1308, 1310, 1311 (which may correspond to, e.g., computing device 1200 or 1201) may be coupled to communication network 1309. Communication network 1309 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1309) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 13 to avoid overcomplicating the drawing.

Although communications paths are not drawn between computing devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The computing devices may also communicate with each other directly through an indirect path via communication network 1309.

System 1300 may comprise media content source 1302, one or more servers 1304, and/or one or more edge computing devices. In some embodiments, the encoding application may be executed at one or more of control circuitry 1313 of server 1304 (and/or control circuitry of computing devices 1307, 1308, 1310, 1311 and/or control circuitry of one or more edge computing devices). In some embodiments, the media content source and/or server 1304 may be configured to host or otherwise facilitate video communication sessions between computing devices 1307, 1308, 1310, 1311 and/or any other suitable computing devices, and/or host or otherwise be in communication (e.g., over network 1309) with one or more social network services.

In some embodiments, server 1304 may include control circuitry 1313 and storage 1314 (e.g., RAM, ROM, Hard Disk, Removable Disk, etc.). Storage 1314 may store one or more databases. Server 1304 may also include an input/output path 1312. I/O path 1312 may provide video conferencing data, device information, or other data, over a local area network (LAN) or wide area network (WAN), and/or other content and data to control circuitry 1313, which may include processing circuitry, and storage 1314. Control circuitry 1313 may be used to send and receive commands, requests, and other suitable data using I/O path 1312, which may comprise I/O circuitry. I/O path 1312 may connect control circuitry 1313 (and specifically control circuitry) to one or more communications paths.

Control circuitry 1313 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1313 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1313 executes instructions for an emulation system application stored in memory (e.g., the storage 1314). Memory may be an electronic storage device provided as storage 1314 that is part of control circuitry 1313.

Media content source 1302 and/or server 1304 may include, for example, one or more encoders to generate the encoding data described herein. In some embodiments, server 1304 may be included in a CDN, which may include origin servers, data centers, central servers, and/or edge servers, and/or any other suitable components. In some embodiments, spherical media content may be, as ingested, encoded in a particular format, e.g., a pre-encoded media asset. Alternatively, in some embodiments, the spherical media content may be, as ingested, not encoded and/or not compressed, and thus encoding may be performed on an uncompressed and/or raw version after ingest. While a single server 1304 and content source 1302 is shown in FIG. 13, it should be appreciated that any suitable number of servers and content servers (and/or edge servers or any other suitable computing device) may be utilized to perform encoding and/or transcoding, and computing tasks may be distributed across such respective groups of servers. As used herein, "transcoding" refers to manipulating digitally compressed and coded data of at least a portion of media asset, in order to convert such data from a first format (or specification) to a second format (or specification).

Computing devices 1307, 1308, 1310, 1311 may comprise one or more decoders, which may comprise any suitable combination of hardware and/or software configured to convert data in a coded form to a form that is usable as video signals and/or audio signals or any other suitable type of data signal, or any combination thereof. The encoder may comprise any suitable combination of hardware and/or software configured to process data to reduce storage space required to store the data and/or bandwidth required to transmit the image data, while minimizing the impact of the encoding on the quality of the video or one or more images. The encoder and/or decoder may utilize any suitable algorithms and/or compression standards and/or codecs. In some embodiments, the encoder and/or decoder may be a virtual machine that may reside on one or more physical servers that may or may not have specialized hardware, and/or a cloud service may determine how many of these virtual machines to use based on established thresholds. In some embodiments, separate audio and video encoders and/or decoders may be employed.

Figure 14:
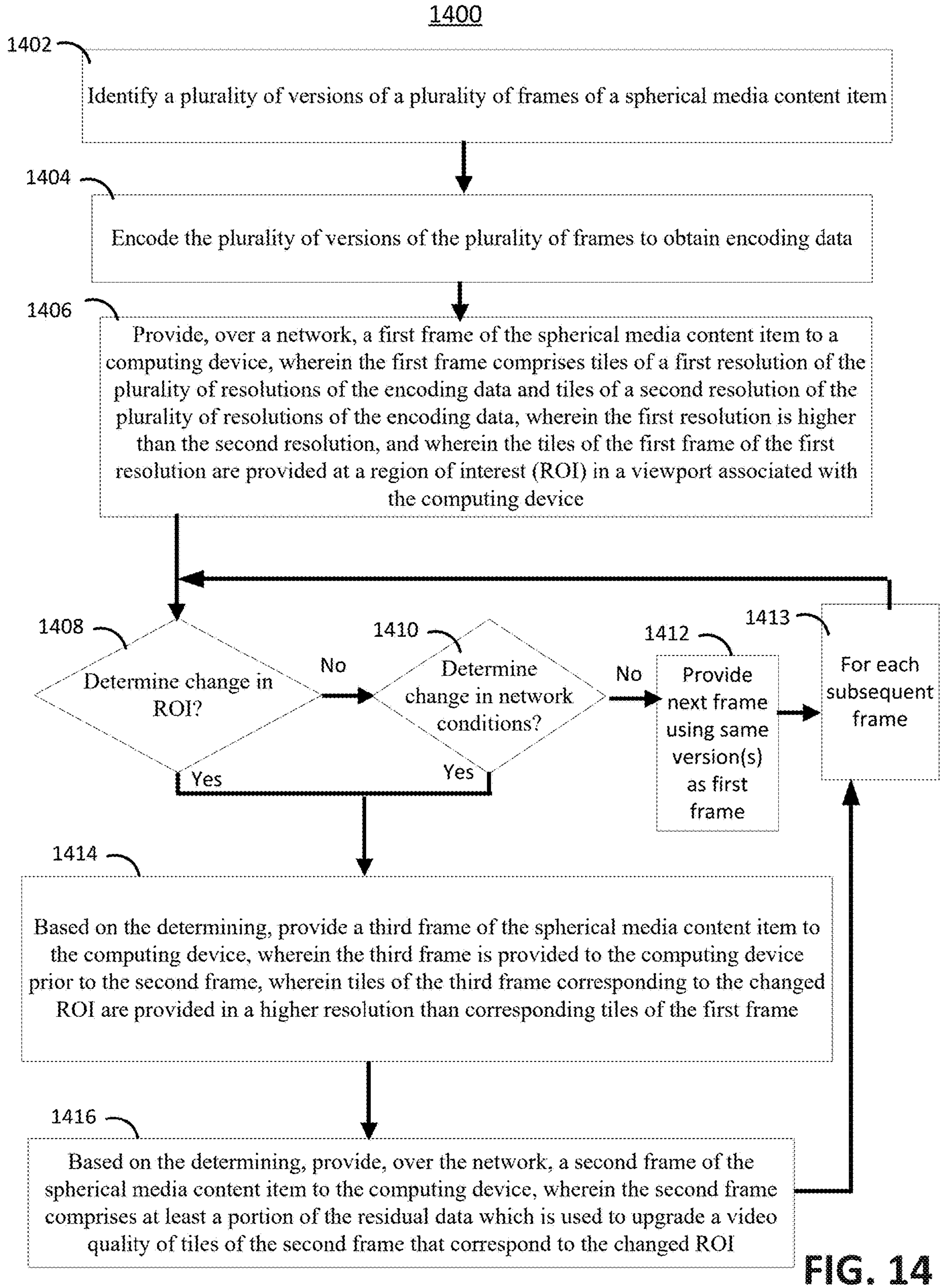
FIG. 14 is a flowchart of a detailed illustrative process for encoding data for portions of a spherical media content item, in accordance with some embodiments of this disclosure.

FIG. 14 is a flowchart of a detailed illustrative process 1400 for encoding data for portions of a spherical media content item, in accordance with some embodiments of this disclosure. In various embodiments, the individual steps of process 1400 may be implemented by one or more components of the devices, methods, and systems of FIGS. 1-13 and may be performed in combination with any of the other processes and aspects described herein. Although the present disclosure may describe certain steps of process 1400 (and of other processes described herein) as being implemented by certain components of the devices, methods, and systems of FIGS. 1-13, this is for purposes of illustration only, and it should be understood that other components of the devices, methods, and systems of FIGS. 1-13 may implement those steps instead.

At 1402, control circuitry (e.g., control circuitry 1206 of computing device 1200 of FIG. 12 and/or control circuitry 1313 of server 1304 of FIG. 13) and/or I/O circuitry (e.g., 1202 and/or 1312 of FIG. 13) may identify a plurality of versions of a plurality of frames of a spherical media content item. For example, the spherical media content item may be coded in a plurality of versions of varying resolutions and/or qualities, as discussed in FIGS. 1-13. In some embodiments, the spherical media content item may be, for example, a live media asset, a media asset available on demand, an XR media asset, a video game, or any other suitable media asset, or any suitable combination thereof. In some embodiments, the encoding discussed at 1404 may include coding and/or identifying the plurality of versions of the plurality of frames of the spherical media content item at 1402.

At 1404, the control circuitry may encode the plurality of versions of the plurality of frames to obtain encoding data. For example, the control circuitry may employ any of the techniques discussed in FIGS. 1-13 (e.g., SHVC and/or any other suitable codecs) to obtain any suitable combination of encoding data, e.g., GOPs, residual, block intra frames and/or tiles. Such encoding may be done ahead of time, e.g., prior to providing content to users, such as in the case of on-demand content, or in real time, e.g., for live content. Frames or pictures of the GOPs may comprise I-tiles, B-tiles, P-tiles, residual data, or any other suitable data, or any suitable combination thereof. As described in FIG. 1, the control circuitry may cause certain portions, e.g., B-frames, not to have residual data in a corresponding companion stream (e.g., B-frames 130, 132 lacking companion streams, while I-frame 128 and P-frame 134 of the GOP include residual data 142 and 144, respectively). As described in FIG. 1, the control circuitry may cause certain portions, e.g., B-frames 150 and 156 preceding another B-frame, not to have block intra data, whereas other portions, e.g., B-frames 152 and 158 preceding a P-frame, may be provided with a companion stream. In some embodiments, the lowest quality of each resolution may include block intra as a companion stream, whereas the higher quality and/or other higher qualities may be provided with residual data as a companion stream, e.g., in accordance with SHVC.

At 1406, the control circuitry may receive a request (e.g., from a client device), and provide, over a network (e.g., communication network 1309 of FIG. 13), a first frame (e.g., frames 100, 102, and/or 104 of FIG. 1, which may correspond to times T0, T1, T2, respectively, of FIG. 11A) of a spherical media content item to a computing device (e.g., device 1311 of FIG. 13). In some embodiments, the first frame may be assembled based on tiles from multiple resolutions and qualities, e.g., selected using foveated rendering techniques, such that tiles included in and otherwise associated with (e.g., within a threshold distance or angle of) an ROI associated with a viewport of the computing device may be provided relatively higher quality and/or resolution as compared to other tiles of the frame, e.g., as shown in FIGS. 5 and 9. In some embodiments, the tiles for the first frame may be selected from encodings of the same quality. For example, the ROI of frame 100 may be provided in, e.g., 4K, as version 118 and quality 1, based on current bandwidth conditions and/or based on a user's current gaze within the viewport of the computing device, and other portions of the ROI may be provided in, e.g., 4K and quality n as in version 120, or in 2K, e.g., version 122 or 124 of FIG. 1. In some embodiments, different portions of frame 100 may be provided as different versions, e.g., higher resolution and/or quality tiles may be provided for portions of the spherical media content items the user is gazing at, whereas lower resolution and/or quality tiles may be provided for portions of the spherical media content item that, for example, the user is not gazing at, are a largest distance away from the portion the user is gazing at, and/or are 180 degrees from the user's direct view (e.g., region 510 of FIG. 5).

At 1408, the control circuitry may determine whether a change in ROI has occurred; if so, processing may proceed to 1414. Otherwise, processing may proceed to 1410. At 1410, the control circuitry may determine whether a change in network conditions (e.g., bandwidth) of the communication network between server and client device has occurred. If so, processing may proceed to 1414; otherwise processing may proceed to 1412. At 1412, the control circuitry may determine that, since neither a user's gaze or other ROI indication nor the network conditions has changed, the same version(s), e.g., same quality and/or resolutions for the tiles provided at 1402, may continue to be provided for upcoming frame(s). Processing may proceed to 1413 to process each subsequent frame of the spherical media content item based on steps 1408-1416, unless the spherical media content has ended, in which case processing may conclude.

At 1414, the control circuitry may, based on the determination of a change in the ROI and/or network conditions, provide a third frame of the spherical media content item to the computing device. In some embodiments, the third frame provided at 1414 may be the very next frame after the first frame provided at 1406, or otherwise subsequent to the first frame. For example, the third frame may correspond to frame 144 of FIG. 1, which may be received at T3 of FIG. 10A. In some embodiments, the third frame may comprise the tile arrangement shown in FIG. 10B, or a similar tile arrangement. For example, the third frame provided at 1408 may be the very next frame after change in the ROI associated with the viewport, and may comprise all block intra-tiles from a lowest quality for each respective resolution of the versions included in the third frame. Certain portions of the third frame may be provided in a higher resolution (e.g., tiles 40-59 in 8K), based on being associated with the changed ROI, than other portions, e.g., not associated with the ROI, which may be provided in lower resolutions, such as, for example, 4K or 2K, as shown in FIG. B. Portions of prior frames that correspond to the portions of the frame provided in a higher resolution (e.g., tiles 40-59 in 8K) may have previously been provided, in prior frame(s), in a lower resolution and/or quality, based at least in part on not having been associated with the ROI in the prior frame(s).

At 1416, the control circuitry may provide, based on the determination of a change in the ROI and/or network conditions, provide a second frame of the spherical media content item to the computing device. In some embodiments, the second frame provided at 1416 may be the very next frame after the third frame provided at 1414, or otherwise subsequent to the third frame. The second frame may comprise at least a portion of the residual data which is used to upgrade a video quality of tiles of the second frame that correspond to the changed ROI. For example, as shown in FIG. 10C, residual data may be provided to upgrade tiles 7-14 from video quality QP 12 to video quality QP 8. In some embodiments, assembling the second frame may comprise causing a subset of the encoding data, such as, for example, at least a portion of the residual data, to be applied to, e.g., P-tiles of the GOP, to provide the upgrade of video quality, where the GOP may be included in a base layer of SHVC, and the residual data is included in a residual layer encoding differences between the base layer and an enhancement layer of SHVC. In some embodiments, assembling the second frame may further comprise not providing tiles with residual data that are not included in the changed ROI, or that are associated with B-tiles.

In some embodiments, if the encoding data comprises B-frames or B-tiles, the encoding order (e.g., 606 of FIG. 6) may differ from the presentation order (e.g., 608 of FIG. 6). In some embodiments, the encoding data for the second frame may enable an upgrade to a higher quality within the same resolution as in the previous frame for the corresponding tile. In some embodiments, the encoding data for the second frame may enable an upgrade to a higher resolution as compared to a previous frame for the corresponding tile. In some embodiments, encoding data for certain tiles (e.g., outside the changed ROI) may enable downgrading of a resolution and/or quality for such tiles. In some embodiments, the resolution of the tiles of the third frame corresponding to the changed ROI matches the resolution of the tiles of the second frame corresponding to the changed ROI, with the upgrading being in the form of adjusting the video quality to a higher video quality from the third frame to the second frame. Such features enable providing encoding data that enables a client device to transition between multiple qualities/resolutions, where the initial change (e.g., in the third frame at 1414) may include changing resolutions, and subsequently changing quality within the resolutions (e.g., in the second frame at 1416) if ROI and/or bandwidth changes between 1414 to 1416 are minimal.

In some embodiments, companion streams (e.g., block intra encoding data, such as shown at 162, 164, 166, 168, and 170 of FIG. 1, or residual data, such as shown at 142, 144, and 146 of FIG. 1) may be employed at the time of the change of ROI, depending on the version being requested by the client and/or being transmitted by the server, as shown in FIGS. 10B-10D, and 11B-D. For example, as shown in FIG. 8A, at the time of switch 801, an I-frame from companion stream 802 (or residual data from a residual data stream) may be provided to replace the corresponding P-frame in normal stream 804, due to a missing reference frame. In some embodiments, as shown in FIG. 8C, if the time of switch occurs at 819, the control circuit can locate the frame, at 821, (preceding the time of switch) from companion stream 822, which observes an I-frame or a P-frame in normal stream 824, to ensure that the anchor from companion stream 822 corresponds to a reference frame used in its encoding, and the P-frame(s) and B-frame(s) 830, 832, and 834 following the circled B-frames 828 can be readily decodable due to being associated with the appropriate reference frames. In some embodiments, the residual data may act as an EL on top of a base layer, to provide a higher resolution or higher quality version, e.g., of an ROI. Processing may proceed to 1413 to process each subsequent frame of the spherical media content item based on steps 1408-1414, unless the spherical media content has ended, in which case processing may conclude.

What is claimed is:

1. A computer-implemented method, comprising:

identifying a plurality of versions of a plurality of frames of a spherical media content item, wherein each version of the plurality of versions is associated with one of a plurality of resolutions and one of a plurality of video qualities;

encoding the plurality of versions of the plurality of frames to obtain encoding data, wherein;

the encoding data comprises, for each resolution of the plurality of resolutions, a respective version comprising:

a group of pictures (GOP) comprising intra-tiles and predictive tiles; and residual data; and the encoding comprises:

causing a first portion of the GOP to comprise intra-tiles;

causing a second portion of the GOP to comprise bidirectional predictive tiles;

causing a third portion of the GOP to comprise predictive tiles; and causing the residual data to comprise companion streams for the first portion of the GOP comprising intra-tiles and the third portion of the GOP comprising predictive tiles, respectively, and to not comprise a companion stream for the second portion of the GOP comprising bidirectional predictive tiles;

providing, over a network, a first frame of the spherical media content item to a computing device, wherein the first frame comprises tiles of a first resolution of the plurality of resolutions of the encoding data and tiles of a second resolution of the plurality of resolutions of the encoding data, wherein the first resolution is higher than the second resolution, and wherein the tiles of the first frame of the first resolution are provided at a region of interest (ROI) in a viewport associated with the computing device;

determining a change in the region of interest (ROI); and based on the determining, providing, over the network, a second frame of the spherical media content item to the computing device, wherein the second frame comprises at least a portion of the residual data which is used to upgrade a video quality of tiles of the second frame that correspond to the changed ROI.

2. The method of claim 1, further comprising:

based on the determining, providing a third frame of the spherical media content item to the computing device, wherein the third frame is provided to the computing device prior to the second frame, wherein tiles of the third frame corresponding to the changed ROI are provided in a higher resolution, of the plurality of resolutions of the encoding data, than corresponding tiles of the first frame, and wherein the resolution of the tiles of the third frame corresponding to the changed ROI matches the resolution of the tiles of the second frame corresponding to the changed ROI.

3. A computer-implemented method, comprising:

identifying a plurality of versions of a plurality of frames of a spherical media content item, wherein each version of the plurality of versions is associated with one of a plurality of resolutions and one of a plurality of video qualities;

encoding the plurality of versions of the plurality of frames to obtain encoding data, wherein the encoding data comprises, for each resolution of the plurality of resolutions, a respective version comprising:

a group of pictures (GOP) comprising intra-tiles and predictive tiles; and residual data;

providing, over a network, a first frame of the spherical media content item to a computing device, wherein the first frame comprises tiles of a first resolution of the plurality of resolutions of the encoding data and tiles of a second resolution of the plurality of resolutions of the encoding data, wherein the first resolution is higher than the second resolution, and wherein the tiles of the first frame of the first resolution are provided at a region of interest (ROI) in a viewport associated with the computing device;

determining a change in the region of interest (ROI); and based on the determining, providing, over the network, a second frame of the spherical media content item to the computing device, wherein the second frame comprises at least a portion of the residual data which is used to upgrade a video quality of tiles of the second frame that correspond to the changed ROI; and based on the determining, providing a third frame of the spherical media content item to the computing device, wherein the third frame is provided to the computing device prior to the second frame, wherein tiles of the third frame corresponding to the changed ROI are provided in a higher resolution, of the plurality of resolutions of the encoding data, than corresponding tiles of the first frame, and wherein the resolution of the tiles of the third frame corresponding to the changed ROI matches the resolution of the tiles of the second frame corresponding to the changed ROI, wherein the tiles of the third frame comprise only intra-tiles for a lowest video quality of the resolution of the tiles of the third frame.

4. The method of claim 1, further comprising:

assembling the second frame to comprise:

the at least a portion of the residual data for the tiles that correspond to the changed ROI, wherein the at least a portion of the residual data is combined with at least a portion of the GOP, wherein the GOP is included in a base layer, and wherein the residual data is included in a residual layer encoding differences between the base layer and an enhancement layer; and tiles that are not provided with residual data based on not being included in the changed ROI.

5. The method of claim 1, wherein the encoding data comprises the first portion of the GOP or the third portion of the GOP.

6. The method of claim 1, further comprising:

determining that at least a portion of the bidirectional predictive tiles of the GOP are associated with a time within the spherical media content of the determined change of the ROI; and based on the determining that the bidirectional predictive tiles of the GOP are associated with the time of the determined change of the ROI, removing the at least a portion of the bidirectional predictive tiles from the encoding data or causing the computing device to not decode the at least a portion of the bidirectional predictive tiles of the encoding data.

7. The method of claim 6, wherein:

determining that the at least a portion of the bidirectional predictive tiles of the GOP are associated with the time within the spherical media content of the determined change of the ROI comprises identifying a predictive tile in the GOP that corresponds to the time of the determined change of the ROI and that immediately precedes a bidirectional tile in the GOP; and the method further comprises causing the encoding data to include an intra-tile from a companion stream corresponding to the GOP, instead of the predictive tile.

8. The method of claim 6, wherein:

determining that the at least a portion of the bidirectional predictive tiles of the GOP are associated with the time within the spherical media content of the determined change of the ROI comprises identifying a predictive tile in the GOP that immediately precedes a bidirectional tile in the GOP and that immediately precedes the time of the determined change of the ROI; and the method further comprises causing the encoding data to include an intra-tile from a companion stream corresponding to the GOP, instead of the predictive tile.

9. The method of claim 1, wherein the encoding data is first encoding data, the method further comprising:

for each respective resolution of the plurality of resolutions, identifying a lowest video quality version; and encoding each lowest video quality version to obtain, for each respective lowest video quality version, second encoding data comprising:

a GOP comprising intra-tiles and predictive tiles; and a GOP comprising only intra-tiles.

10. The method of claim 9, wherein for a respective resolution, each version other than the lowest video quality version is encoded to obtain:

a respective group of pictures (GOP) comprising intra-tiles and predictive tiles; and respective residual data.

11. The method of claim 9, wherein the second encoding data does not comprise residual data.

12. The method of claim 9, wherein the encoding further comprises:

causing the GOP of the second encoding data to comprise:

a first portion comprising intra-tiles;

a second portion comprising bidirectional predictive tiles;

a third portion comprising predictive tiles; and causing the GOP of the second encoding data comprising only intra-tiles to be associated with:

a companion stream of intra-tiles for the first portion; and a companion stream of intra-tiles for the third portion;

wherein the GOP of the second encoding data comprising only intra-tiles does not comprise a companion stream for at least one of the bidirectional predictive tiles of the second portion.

13. The method of claim 12, further comprising:

identifying a first bidirectional predictive frame of the second portion that precedes a second bidirectional predictive frame of the second portion;

determining that the second bidirectional predictive frame precedes a predictive frame; and causing the first bidirectional predictive frame not to be associated with a companion stream, and causing the second bidirectional predictive frame to be associated with a companion stream of intra-tiles.

14. The method of claim 1, further comprising:

using an open GOP to compensate for delay at a beginning of the spherical media content item.

15. The method of claim 1, wherein the plurality of video qualities comprises at least one of different bitrates or different quantization parameters (QPs).

16. A system, comprising:

control circuitry configured to:

identify a plurality of versions of a plurality of frames of a spherical media content item, wherein each version of the plurality of versions is associated with one of a plurality of resolutions and one of a plurality of video qualities;

encode the plurality of versions of the plurality of frames to obtain encoding data, wherein;

the encoding data comprises, for each resolution of the plurality of resolutions, a respective version comprising:

a group of pictures (GOP) comprising intra-tiles and predictive tiles; and residual data; and the control circuitry, in performing the encoding, is configured to:

cause a first portion of the GOP to comprise intra-tiles;

cause a second portion of the GOP to comprise bidirectional predictive tiles;

cause a third portion of the GOP to comprise predictive tiles; and cause the residual data to comprise companion streams for the first portion of the GOP comprising intra-tiles and the third portion of the GOP comprising predictive tiles, respectively, and to not comprise a companion stream for the second portion of the GOP comprising bidirectional predictive tiles;

provide, over a network, a first frame of the spherical media content item to a computing device, wherein the first frame comprises tiles of a first resolution of the plurality of resolutions of the encoding data and tiles of a second resolution of the plurality of resolutions of the encoding data, wherein the first resolution is higher than the second resolution, and wherein the tiles of the first frame of the first resolution are provided at a region of interest (ROI) in a viewport associated with the computing device;

determine a change in the region of interest (ROI); and based on the determining, provide, over the network, a second frame of the spherical media content item to the computing device, wherein the second frame comprises at least a portion of the residual data which is used to upgrade a video quality of tiles of the second frame that correspond to the changed ROI.

17. The system of claim 16, wherein the control circuitry is further configured to:

based on the determining, provide a third frame of the spherical media content item to the computing device, wherein the third frame is provided to the computing device prior to the second frame, wherein tiles of the third frame corresponding to the changed ROI are provided in a higher resolution, of the plurality of resolutions of the encoding data, than corresponding tiles of the first frame, and wherein the resolution of the tiles of the third frame corresponding to the changed ROI matches the resolution of the tiles of the second frame corresponding to the changed ROI.

18. The system of claim 17, wherein the tiles of the third frame comprise only intra-tiles for a lowest video quality of the resolution of the tiles of the third frame.

19. The system of claim 16, wherein the control circuitry is further configured to:

assemble the second frame to comprise:

the at least a portion of the residual data for the tiles that correspond to the changed ROI, wherein the at least a portion of the residual data is combined with at least a portion of the GOP, wherein the GOP is included in a base layer, and wherein the residual data is included in a residual layer encoding differences between the base layer and an enhancement layer; and tiles that are not provided with residual data based on not being included in the changed ROI.

20. The system of claim 16, wherein, wherein the encoding data comprises the first portion of the GOP or the third portion of the GOP.

* * * * *